United States Patent
Lei et al.

(10) Patent No.: US 12,531,700 B2
(45) Date of Patent: Jan. 20, 2026

(54) VALIDATION FOR PRE-CONFIGURED UPLINK RESOURCE

(71) Applicant: QUALCOMM Incorporated, San Diego, CA (US)

(72) Inventors: Jing Lei, San Diego, CA (US); Yongjun Kwak, San Diego, CA (US); Linhai He, San Diego, CA (US); Yuchul Kim, San Diego, CA (US); Hwan Joon Kwon, San Diego, CA (US); Ruiming Zheng, Beijing (CN)

(73) Assignee: Qualcomm Incorporated, San Diego, CA (US)

( * ) Notice: Subject to any disclaimer, the term of this patent is extended or adjusted under 35 U.S.C. 154(b) by 406 days.

(21) Appl. No.: 18/040,994

(22) PCT Filed: Sep. 15, 2021

(86) PCT No.: PCT/CN2021/118550
§ 371 (c)(1),
(2) Date: Feb. 8, 2023

(87) PCT Pub. No.: WO2022/057835
PCT Pub. Date: Mar. 24, 2022

(65) Prior Publication Data
US 2024/0014979 A1    Jan. 11, 2024

Related U.S. Application Data

(60) Provisional application No. 63/079,412, filed on Sep. 16, 2020.

(51) Int. Cl.
*H04L 5/00* (2006.01)
*H04L 5/16* (2006.01)
(Continued)

(52) U.S. Cl.
CPC .......... *H04L 5/0053* (2013.01); *H04L 5/0092* (2013.01); *H04L 5/16* (2013.01);
(Continued)

(58) Field of Classification Search
CPC ....... H04L 5/0053; H04L 5/0092; H04L 5/16; H04L 27/26025; H04L 5/1469;
(Continued)

(56) References Cited

U.S. PATENT DOCUMENTS 10,111,190 B2    10/2018    Pelletier et al.
10,117,229 B2    10/2018    Tseng et al.
(Continued)

FOREIGN PATENT DOCUMENTS

WO    2020034571 A1    2/2020
WO    2020065619 A1    4/2020
(Continued)

OTHER PUBLICATIONS

Huawei et al., "Feature lead summary of Support for transmission in preconfigured UL resources", 3GPP TSG RAN WG1 Meeting #94b, R1-1811697, Chengdu, China, Oct. 8-12, 2018, Total pp. 13 (Year: 2018).*

(Continued)

*Primary Examiner* — Shah M Rahman
(74) *Attorney, Agent, or Firm* — Loza & Loza, LLP

(57) ABSTRACT

Aspects relate to validating a pre-configured uplink resource (PUR) occasion. For example, prior to using a PUR occasion for an uplink transmission, a user equipment (UE) may perform a validation procedure for the PUR occasion. A validation procedure for a PUR occasion may involve ensuring that the UE will be able to reliably transmit during the PUR occasion. A base station may send a PUR configuration to the UE that the UE can use for the validation procedure. The PUR configuration may include timing advance (TA)

(Continued)

validation information and PUR validation information that depend on at least on capability of the UE.

30 Claims, 22 Drawing Sheets

(51) Int. Cl.
*H04W 72/231* (2023.01)
*H04W 56/00* (2009.01)
*H04W 72/1268* (2023.01)

(52) U.S. Cl.
CPC ........ *H04W 72/231* (2023.01); *H04W 56/001* (2013.01); *H04W 72/1268* (2013.01)

(58) Field of Classification Search
CPC ............. H04W 56/0045; H04W 72/23; H04W 72/231; H04W 72/51; H04W 56/001; H04W 56/0055; H04W 72/0457; H04W 72/1268; H04W 72/535; H04W 8/24
See application file for complete search history.

(56) References Cited

U.S. PATENT DOCUMENTS

| | | | |
|---|---|---|---|
| 10,869,272 | B2 | 12/2020 | Shu et al. |
| 2020/0322981 | A1 | 10/2020 | Choe et al. |
| 2021/0037530 | A1* | 2/2021 | Shih ................ H04W 72/21 |
| 2021/0099917 | A1* | 4/2021 | Keating ............ H04W 76/11 |
| 2021/0112559 | A1* | 4/2021 | Ou .................. H04W 72/21 |
| 2021/0321413 | A1* | 10/2021 | Shin ................. H04W 72/23 |
| 2022/0045736 | A1* | 2/2022 | Hu .................... H04L 1/1896 |
| 2022/0085942 | A1* | 3/2022 | Kim ................ H04W 72/04 |
| 2022/0201636 | A1* | 6/2022 | Liu ................. H04W 56/0045 |
| 2022/0217565 | A1* | 7/2022 | Thangarasa ...... H04W 56/0015 |
| 2022/0232600 | A1* | 7/2022 | Kim ................ H04W 72/1273 |
| 2022/0232659 | A1* | 7/2022 | Kim ................ H04W 76/27 |
| 2022/0232668 | A1* | 7/2022 | Park ................. H04W 76/20 |
| 2022/0256568 | A1* | 8/2022 | Choe ................ H04W 56/0045 |
| 2023/0120096 | A1* | 4/2023 | Kim ................. H04W 48/20 370/329 |
| 2023/0189213 | A1* | 6/2023 | Kim ................. H04W 72/04 455/458 |
| 2023/0397195 | A1* | 12/2023 | Shin ................. H04W 72/1268 |

FOREIGN PATENT DOCUMENTS

| | | |
|---|---|---|
| WO | 2020068947 A1 | 4/2020 |
| WO | 2020114289 A1 | 6/2020 |
| WO | 2020167098 A1 | 8/2020 |
| WO | 2020167100 A1 | 8/2020 |

OTHER PUBLICATIONS

Kim et al., "Preconfigured Uplink Resource for Mobile Terminated Service", U.S. Appl. No. 63/062,326, Aug. 6, 2020, Total pp. 90 (Year: 2020).*
Ou et al., "Method and Apparatus for Timing Advance Validation in a Wireless Communication System", U.S. Appl. No. 62/912,880, Oct. 9, 2019, Total pp. 26 (Year: 2019).*
Ericsson: "Support for Transmission in Preconfigured UL Resources in NB-IoT" 3GPP TSG-RAN WG1 Meeting #94bis, R1-1810195, Oct. 12, 2018(Oct. 12, 2018), pp. 1-8, The whole document.
International Search Report and Written Opinion—PCT/CN2021/118550—ISA/EPO—Dec. 15, 2021.
Ericsson: "Report on Email Discussion [106#60] D-PUR TA Validation Criteria", 3GPP Draft, 3GPP TSG-RAN WG2 #107, Tdoc R2-1910435, 3rd Generation Partnership Project (3GPP), Mobile Competence Centre, 650, Route Des Lucioles, F-06921 Sophia-Ant, vol. RAN WG2, No. Prague, Czech Republic, Aug. 26, 2019-Aug. 30, 2019, Aug. 15, 2019, XP051768214, 27 pages, pp. 6-7.
Qualcomm Incorporated: "Miscellaneous Rel-16 eMTC Corrections", 3GPP TSG-RAN Meeting #88, RP-201192, RAN2 CRs to Additional MTC enhancements for LTE, 3G PP TSG-RAN2 Meeting # 110-e, R2-2005827, 3rd Generation Partnership Project, Mobile Competence Centre, 650, Route Des Lucioles, F-06921 Sophia-Antipolis Cedex, France, vol. RAN WG2, No. Online, Jun. 1, 2020-Jun. 12, 2020, Jun. 25, 2020, XP052338356, Jun. 29, 2020-Jul. 3, 2020, 226 pages, pp. 116-117, 204-205.
Supplementary European Search Report—EP21868657—Search Authority—The Hague—Sep. 16, 2024.

* cited by examiner

VALIDATION FOR PRE-CONFIGURED UPLINK RESOURCE

The present application for patent is the U.S. national stage of PCT patent application number PCT/CN2021/118550 filed on Sep. 15, 2021. PCT patent application number PCT/CN2021/118550_claims priority to and the benefit of U.S. Provisional Application No. 63/079,412, titled "VALIDATION FOR PRE-CONFIGURED UPLINK RESOURCE" filed Sep. 16, 2020, and assigned to the assignee hereof and hereby expressly incorporated by reference herein as if fully set forth below in its entirety and for all applicable purposes.

TECHNICAL FIELD

The technology discussed below relates generally to wireless communication and, more particularly, to techniques for validating a pre-configured uplink resource (PUR) occasion.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second base station. A base station may schedule access to a cell to support access by multiple UEs. For example, a base station may allocate different resources (e.g., time domain and frequency domain resources) for different UEs operating within a cell of the base station.

Technologies relating to the Internet of Things (IoT) have become more widely used in recent years. The 3rd Generation Partnership Project (3GPP) has specified cellular solutions for operations in licensed spectrum including machine-type communication (MTC), narrowband IoT (NB-IoT) communication, and extended-coverage for IoT. Unlike short-range technologies and low-power wide-area (LPWA) technologies operating in unlicensed spectrum, these 3GPP solutions operate in licensed spectrum and can provide a guaranteed quality of service (QoS). Corresponding applications include, for example, sensors, surveillance cameras, wearable devices, smart meters and smart meter sensors.

SUMMARY

The following presents a summary of one or more aspects of the present disclosure, to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a method for wireless communication at a user equipment is disclosed. The method may include receiving a pre-configured uplink resource (PUR) configuration including PUR validation information and timing advance (TA) validation information for a plurality of PUR occasions. In some aspects, the PUR validation information and the TA validation information may depend on at least one capability of the user equipment. The method may also include performing a validation procedure for a first PUR occasion of the plurality of PUR occasions according to the PUR validation information and the TA validation information, and selectively transmitting an uplink transmission during the first PUR occasion according to the validation procedure.

In some examples, a user equipment may include a transceiver, a memory, and a processor coupled to the transceiver and the memory. The processor may be configured to receive, via the transceiver, a pre-configured uplink resource (PUR) configuration including PUR validation information and timing advance (TA) validation information for a plurality of PUR occasions. In some aspects, the PUR validation information and the TA validation information may depend on at least one capability of the user equipment. The processor may be also configured to perform a validation procedure for a first PUR occasion of the plurality of PUR occasions according to the PUR validation information and the TA validation information, and selectively transmit, via the transceiver, an uplink transmission during the first PUR occasion according to the validation procedure.

In some examples, a user equipment may include means for receiving a pre-configured uplink resource (PUR) configuration including PUR validation information and timing advance (TA) validation information for a plurality of PUR occasions. In some aspects, the PUR validation information and the TA validation information may depend on at least one capability of the user equipment. The user equipment may also include means for performing a validation procedure for a first PUR occasion of the plurality of PUR occasions according to the PUR validation information and the TA validation information, and means for selectively transmitting an uplink transmission during the first PUR occasion according to the validation procedure.

In some examples, an article of manufacture for use by a user equipment includes a non-transitory computer-readable medium having stored therein instructions executable by one or more processors of the user equipment to receive a pre-configured uplink resource (PUR) configuration including PUR validation information and timing advance (TA) validation information for a plurality of PUR occasions. In some aspects, the PUR validation information and the TA validation information may depend on at least one capability of the user equipment. The computer-readable medium may also have stored therein instructions executable by one or more processors of the user equipment to perform a validation procedure for a first PUR occasion of the plurality of PUR occasions according to the PUR validation information and the TA validation information, and selectively transmit an uplink transmission during the first PUR occasion according to the validation procedure.

In some examples, a computer program is described. The computer program may include instructions, which are executable by one or more processors of a user equipment. The computer program may be stored on a computer-readable medium. The computer program, when executed, causes one or more processors of the user equipment to receive a pre-configured uplink resource (PUR) configuration including PUR validation information and timing advance (TA) validation information for a plurality of PUR occasions. In some aspects, the PUR validation information and the TA validation information may depend on at least one capability of the user equipment. The computer program may also cause the one or more processors of the user equipment to perform a validation procedure for a first PUR occasion of the plurality of PUR occasions according to the PUR validation information and the TA validation information, and selectively transmit an uplink transmission during the first PUR occasion according to the validation procedure.

In some examples, a method for wireless communication at a base station is disclosed. The method may include receiving an indication of at least one capability of a user equipment, and generating a pre-configured uplink resource (PUR) configuration including PUR validation information and timing advance (TA) validation information for a plurality of PUR occasions. In some aspects, the PUR validation information and the TA validation information may depend on the at least one capability of the user equipment. The method may also include transmitting the PUR configuration to the user equipment, and receiving an uplink transmission from the user equipment during at least one of the plurality of PUR occasions.

In some examples, a base station may include a transceiver, a memory, and a processor coupled to the transceiver and the memory. The processor may be configured to receive, via the transceiver, an indication of at least one capability of a user equipment, and generate a pre-configured uplink resource (PUR) configuration including PUR validation information and timing advance (TA) validation information for a plurality of PUR occasions. In some aspects, the PUR validation information and the TA validation information may depend on the at least one capability of the user equipment. The processor may also be configured to transmit, via the transceiver, the PUR configuration to the user equipment, and receive, via the transceiver, an uplink transmission from the user equipment during at least one of the plurality of PUR occasions.

In some examples, a base station may include means for receiving an indication of at least one capability of a user equipment, and means for generating a pre-configured uplink resource (PUR) configuration including PUR validation information and timing advance (TA) validation information for a plurality of PUR occasions. In some aspects, the PUR validation information and the TA validation information may depend on the at least one capability of the user equipment. The base station may also include means for transmitting the PUR configuration to the user equipment, and means for receiving an uplink transmission from the user equipment during at least one of the plurality of PUR occasions.

In some examples, an article of manufacture for use by a base station includes a non-transitory computer-readable medium having stored therein instructions executable by one or more processors of the base station to receive an indication of at least one capability of a user equipment, and generate a pre-configured uplink resource (PUR) configuration including PUR validation information and timing advance (TA) validation information for a plurality of PUR occasions. In some aspects, the PUR validation information and the TA validation information may depend on the at least one capability of the user equipment. The computer-readable medium may also have stored therein instructions executable by one or more processors of the base station to transmit the PUR configuration to the user equipment, and receive an uplink transmission from the user equipment during at least one of the plurality of PUR occasions.

In some examples, a computer program is described. The computer program may include instructions, which are executable by one or more processors of a base station. The computer program may be stored on a computer-readable medium. The computer program, when executed, causes one or more processors of the base station to receive an indication of at least one capability of a user equipment, and generate a pre-configured uplink resource (PUR) configuration including PUR validation information and timing advance (TA) validation information for a plurality of PUR occasions. In some aspects, the PUR validation information and the TA validation information may depend on the at least one capability of the user equipment. The computer program may also cause the one or more processors of the base station to transmit the PUR configuration to the user equipment, and receive an uplink transmission from the user equipment during at least one of the plurality of PUR occasions.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
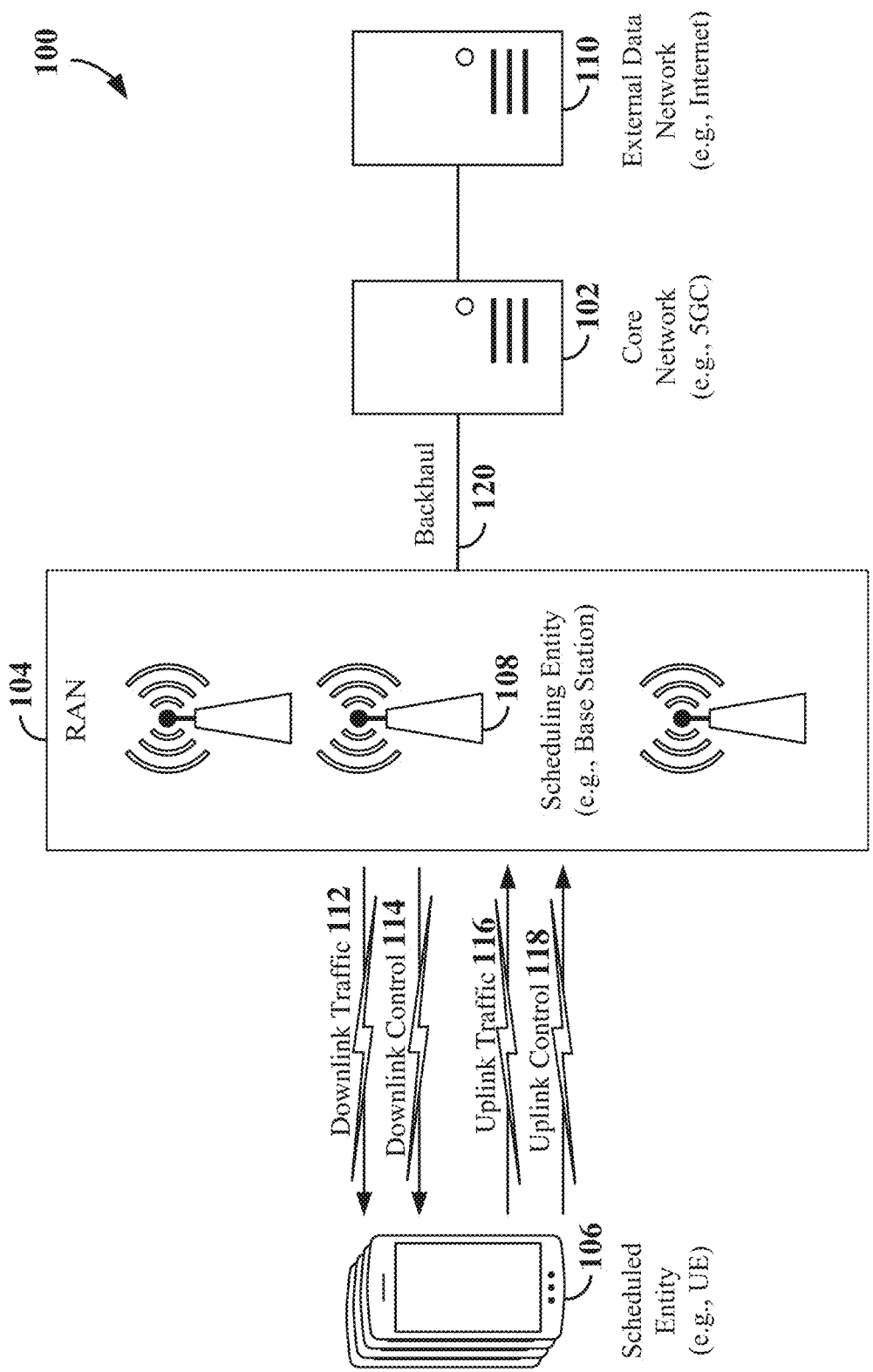
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

A base station may pre-configure an uplink resource that can be used by a user equipment (UE) (e.g., an IoT device, a reduced capability UE, a regular UE, etc.) to transmit a small data transmission (SDT) and the like. For example, the base station may transmit a configuration to a UE that is or will be operating in an inactive mode or an idle mode, where the configuration identifies a particular pre-configured uplink resource (PUR) that the UE can use for an uplink transmission. In some examples, the base station sends this configuration in response to a request from the UE (e.g., a UE that has data to transmit to the base station may request the base station to pre-configure an uplink resource for an uplink transmission).

The UE may transmit uplink data on the PUR without establishing a connection to the base station (e.g., without switching to a connected mode). Thus, the UE may use less signaling overhead and/or processing overhead for this uplink transmission as compared to an uplink transmission during a connected mode. Moreover, conducting transmissions without establishing a connection to the base station may result in reduced energy consumption at the UE which may be important for an IoT wireless device or other types of UEs, especially those that regularly have small data transmissions.

In some examples, a PUR may correspond to a set of PUR occasions that are spaced out over time. For example, the base station may schedule several periodic PUR occasions or several aperiodic PUR occasions for a UE.

The disclosure relates in some aspects to a validation procedure for validating a PUR occasion. For example, prior to using a PUR occasion for an uplink transmission, a UE may perform a timing advance (TA) validation procedure and a PUR validation procedure for the PUR occasion.

In some examples, a validation rule may specify that a validation procedure is to be performed within a defined time window. For example, the start of the time window may be defined to ensure that a UE has a sufficient amount of time to switch from an uplink transmission (e.g., for a previous PUR occasion) to a downlink reception (e.g., for the validation procedure) prior to commencing a validation procedure. As another example, the length of the time window may be defined to ensure that the UE has a sufficient amount of time to perform the validation procedure. As yet another example, the end of the time window may be defined to ensure that a UE has a sufficient amount of time to switch from a downlink reception (e.g., for the validation procedure) to an uplink transmission for the PUR occasion.

In some examples, a validation procedure for a PUR occasion may involve ensuring that the UE will be able to transmit during the PUR occasion. For example, a PUR occasion may be deemed invalid if a UE does not have a sufficient amount of time to switch from receiving a downlink reception to transmitting an uplink transmission for the PUR occasion. As another example, a PUR occasion may be deemed invalid if an uplink symbol for the PUR occasion does not align with a slot format for a time division duplex (TDD) mode of operation or align with an uplink-downlink resource configuration for a half-duplex-frequency division duplex (HD-FDD) mode of operation. As a further example, a PUR occasion may be deemed invalid if an uplink symbol for the PUR occasion falls within a slot of another uplink transmission by the UE. As yet another example, a PUR occasion may be deemed invalid if a UE does not have a sufficient amount of time to switch from transmitting a first type of uplink transmission to transmitting a second type of uplink transmission for the PUR occasion. In some examples, the first type of uplink transmission may involve transmitting using a first subcarrier spacing and/or a first bandwidth part configuration, while the second type of uplink transmission may involve transmitting using a second subcarrier spacing and/or a second bandwidth part configuration.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automobile or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink control information 118 and/or downlink control information 114 and/or downlink traffic 112 and/or uplink traffic 116 information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 millisecond (ms). Multiple subframes or slots may be grouped together to form a single frame or radio frame. Within the present disclosure, a frame may refer to a predetermined duration (e.g., 10 milliseconds) for wireless transmissions, with each frame consisting of, for example, 10 subframes of 1 millisecond (ms) each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
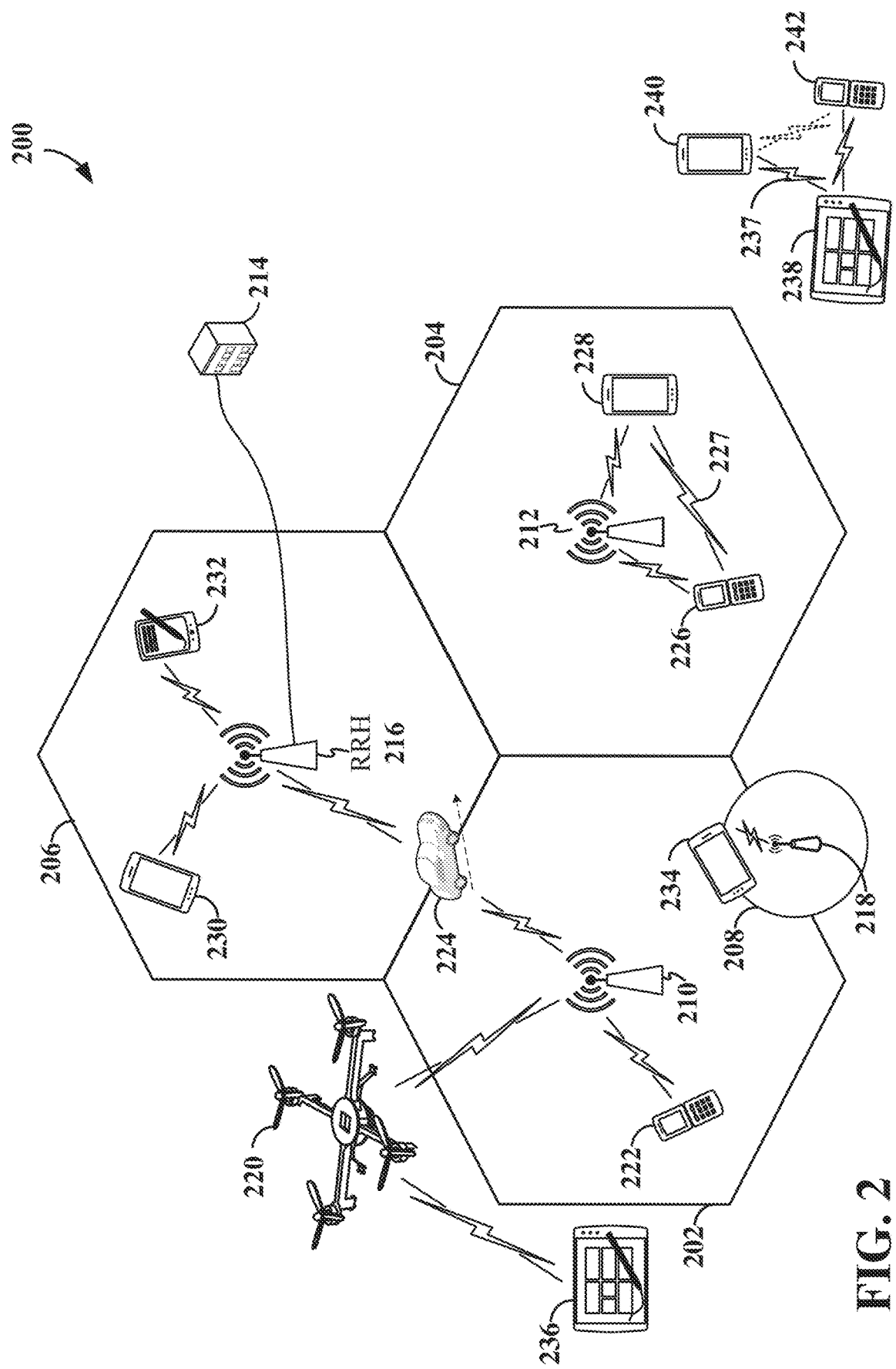
FIG. 2 is a conceptual illustration of an example of a radio access network according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and the UAV 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with a mobile base station, such as the UAV 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a deviceto-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full-duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
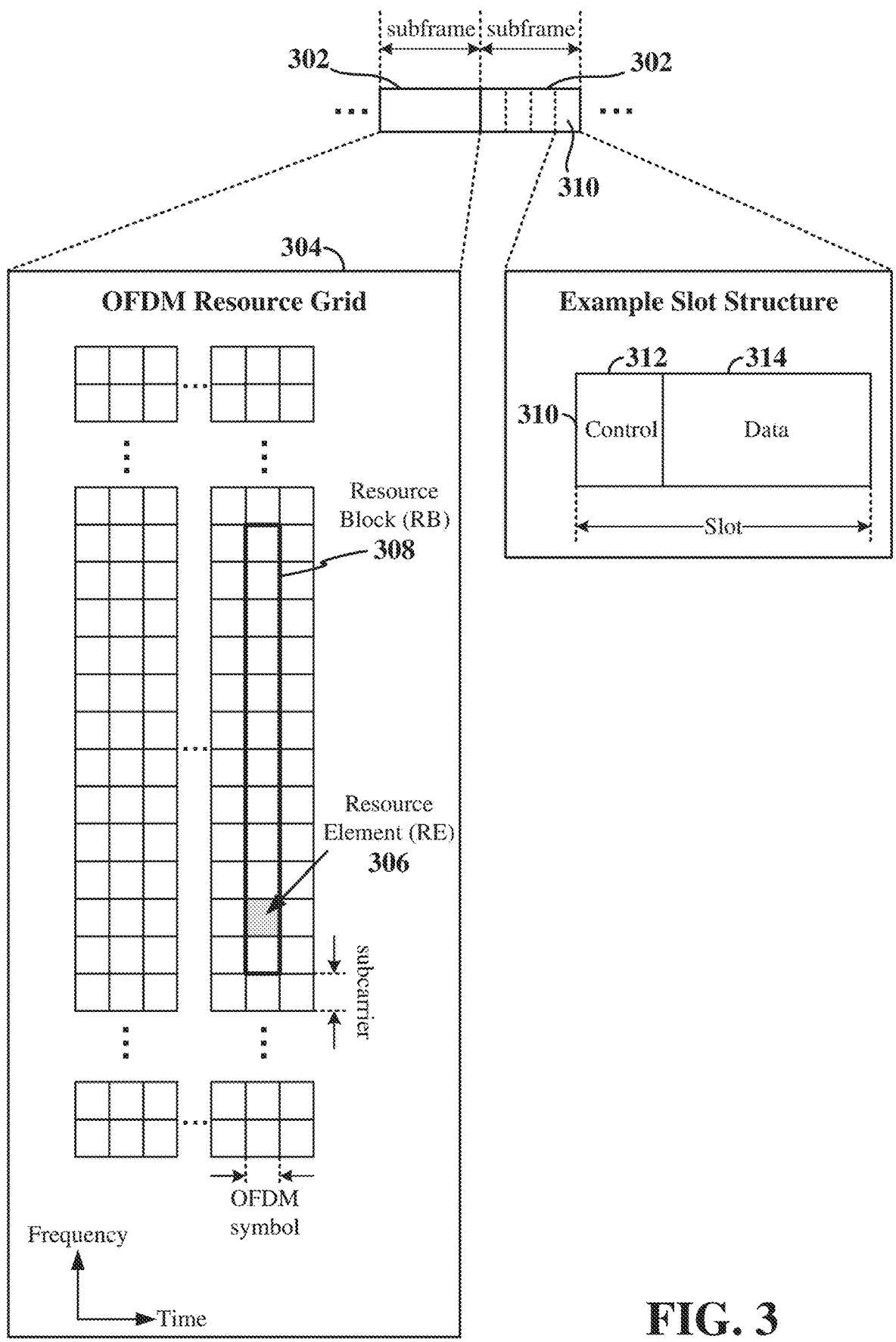
FIG. 3 is a schematic illustration of an example of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding number of multiple resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The terms Uu interface, Uu signaling, and the like refer generally to a wireless communication interface or wireless communication signaling between a RAN (e.g., an eNB, a gNB, etc.) and a wireless communication device (e.g., a UE, a IoT device, and so on). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET)(e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., receive (Rx) V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

A UE under the coverage area of a RAN may operate in one of several defined operating states (also referred to as modes). In some examples, these states include an idle state, an inactive state, and a connected state. In 5G NR, these operating states are defined as radio resource control (RRC) states: RRC_IDLE, RRC_INACTIVE, and RRC_CONNECTED.

A UE will be in an idle state (e.g., RRC_IDLE) when it first powers up. The UE may transition to a connected state (e.g., RRC_CONNECTED) with a RAN by performing a random access procedure with that RAN. In the connected state, the UE may communicate with the RAN via dedicated signaling (e.g., dedicated channels). A UE may switch to idle state or inactive state (e.g., RRC_INACTIVE) under certain circumstances. For example, a UE that does not have data to send to the RAN and that is not receiving data from the RAN may elect to switch to the idle state or the inactive state to conserve battery power. In these states, since the UE is not actively communicating with the RAN, the UE may power off some of its components (e.g., radio components). That is, the UE enters a lower power state.

The UE will periodically wake up from the low power state to monitor for signaling from the RAN (e.g., to determine whether the RAN has data to send to the UE). This periodicity is based on a discontinuous reception (DRX) cycle specified by the RAN. A DRX cycle may include paging time windows that are separated in time according to a DRX cycle period. Each paging time window corresponds to a time period during which time the UE wakes up from the lower power state to receive paging messages from the RAN. If the RAN has data to send to the UE or if the RAN needs to communicate with the UE for other reasons, the RAN will page the UE according to the DRX cycle (i.e., during the paging time windows when the UE periodically wakes up from the lower power state). The RAN sends a paging message via a paging channel (e.g., via a paging frame). In addition, the RAN may define different paging opportunities that can be used by different UEs to receive a paging message. That is, UEs remain in the lower power state until their own paging opportunities occur. The use of different paging opportunities for different UEs allows the RAN to direct paging to a particular UE or a small subset of UEs. This reduces the likelihood that a UE will need to expend battery power to process paging that is directed to another UE. Upon receiving a paging message indicating that the network will be sending data (or other information) that a UE needs to receive, the UE may resume full operations (e.g., turn on all radio components) and, if needed, reestablish a connected state with the RAN.

The physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

As mentioned above, a wireless network may employ a scheduler (e.g., executing scheduling algorithms) to dynamically allocate radio resources to users, taking into consideration the QoS requirements of the users. The scheduler may also take into account the CSI and a target block error rate (BLER) to allocate the channel resources for transmitting buffered data. Link adaptation based on adaptive modulation and coding can be employed to improve the spectral efficiency associated with these transmissions. The scheduler can multiplex the transmissions performing per-user allocation of the available time-frequency resources. Scheduling algorithms executed by the scheduler may ensure efficient use of the channel and fairness for serving the multiple users while meeting any QoS requirements. For 5G NR, scheduling prioritization for traffic may be allocated in short transmission time intervals (TTIs) so that service requirements may be met.

In the downlink, resource allocation and dynamic link adaptation can be promptly provided by DCI transmitted in the same transmission time interval (TTI) as the data. The UE may thereby quickly process the control information with the indicated parameters and then decode the data accordingly.

Figure 4:
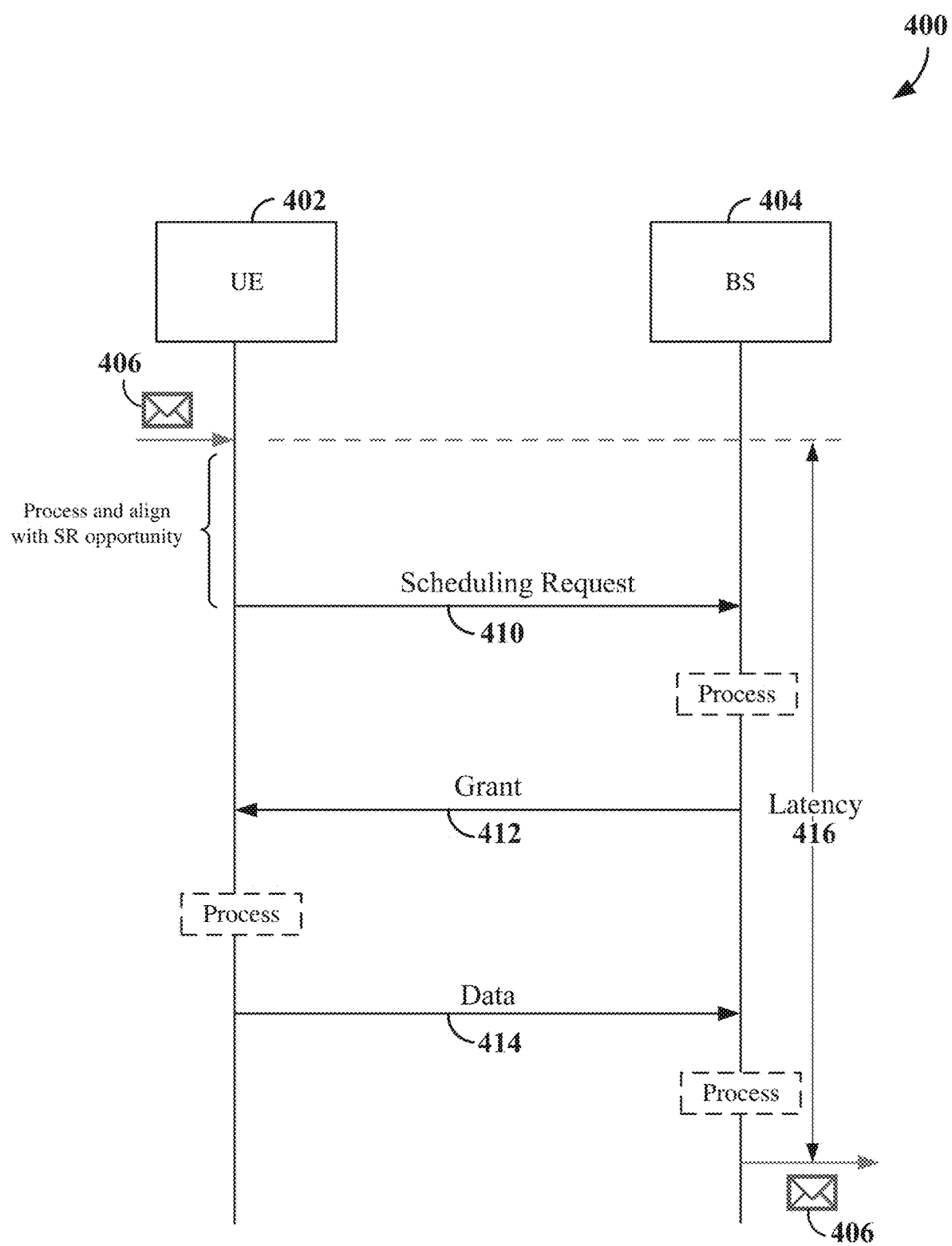
FIG. 4 is a signaling diagram illustrating an example of a grant-based procedure between a user equipment (UE) and a base station (BS) according to some aspects.

In the uplink, however, a grant-based procedure is typically used for resource allocation. FIG. 4 is a signaling diagram 400 illustrating a grant-based procedure between a user equipment (UE) 402 and a base station (BS) 404 according to some aspects. In some examples, the UE 402 may correspond to any of the UEs or scheduled entities shown in any of FIGS. 1, 2, 6-10, and 17. In some examples, the BS 404 may correspond to any of the base stations or scheduling entities shown in any of FIGS. 1, 2, 6-10, and 20.

When data 406 is available for transmission at the UE 402 (e.g., the data 406 arrives in the transmission buffer of the UE 402), the UE 402 processes the data and waits for a specific opportunity to transmit a scheduling request (SR) 410 to the BS 404. The BS 404 processes the SR 410 and sends a scheduling grant 412 to the UE 402 via a DCI, where the DCI contains the allocation and transmission parameters. The UE 402 processes the scheduling grant 412 and transmits the data 414 using the granted resources to the BS 404, which processes and receives the data 406. As can be seen in FIG. 4, the latency 416 for this procedure is shown as the period of time from which the data 406 is received in the buffer of the UE 402, to the period of time in which the BS 404 receives the data 406.

Figure 5:
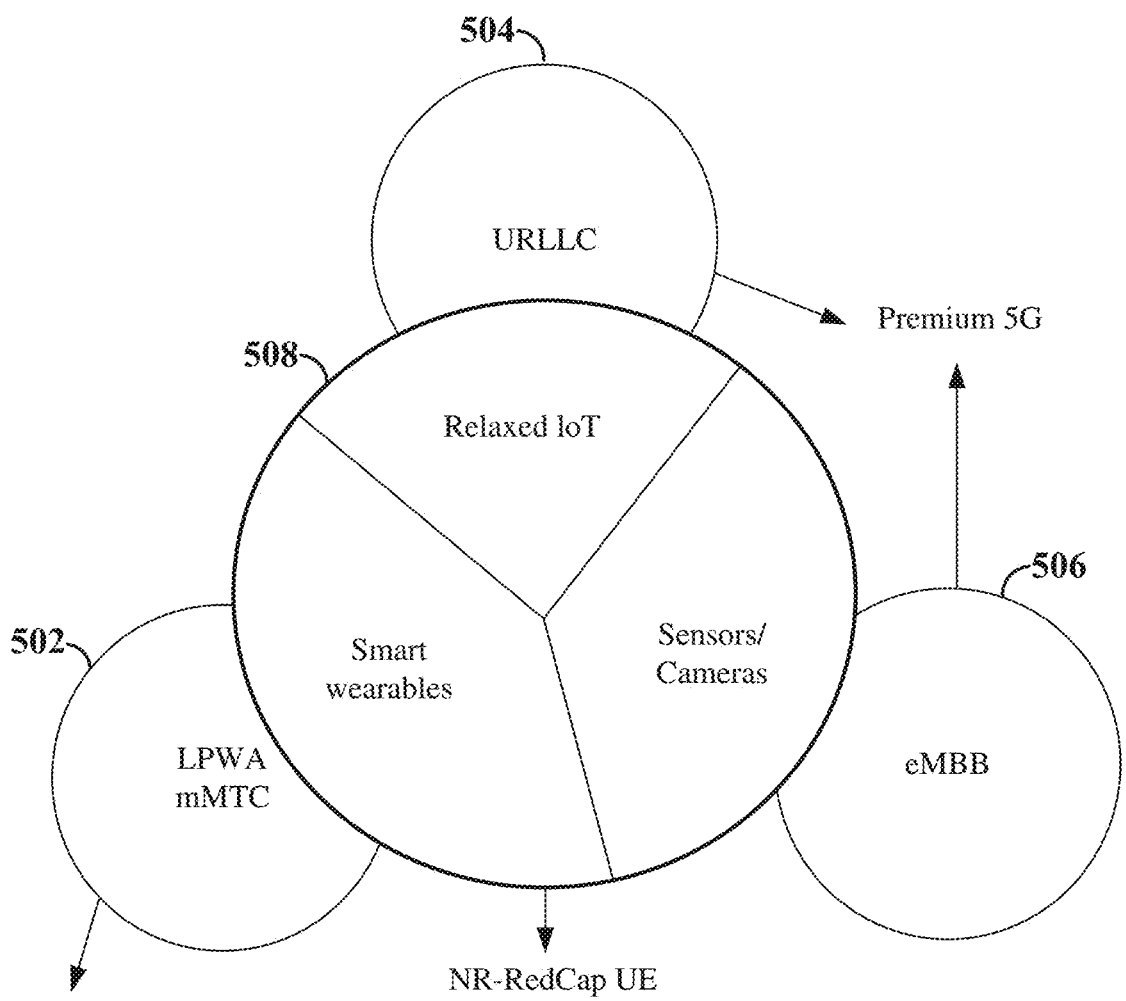
FIG. 5 is a conceptual illustration of an example of UE use cases according to some aspects.

Referring to FIG. 5, LTE includes support for advanced services 502 such as low-power wide-area (LPWA) communication and massive machine type communication (mMTC). In addition, previous 3GPP releases for NR (e.g., Rel-15 and Rel-16) include support for high-performance features (premium 5G) such as ultra-reliable low-latency communication (URLLC) 504, enhance mobile broadband (eMBB) 506, and vehicle to anything (V2X) communication (not shown).

NR also supports scalability and deployments that are more efficient and cost-effective. Consequently, a new UE type with reduced capabilities (a RedCap UE 508) has been defined. A RedCap UE may have one or more of a lower peak throughput requirement, a relaxed latency requirement, or a relaxed reliability requirement. Examples of RedCap UEs include, without limitation, sensors, cameras, IoT devices with relaxed requirements, and smart wearables. In some examples, a RedCap UE may be battery powered. For a RedCap UE, resource allocation may be scalable, coverage enhancements may be provided for the DL and the UL, additional power saving may be provided in all radio resource control (RRC) states, and co-existence with NR premium UEs may be supported.

Thus, in an operating environment that supports RedCap UEs (also known as "NR Light"), RedCap UEs may be configured with lower device complexity and reduced energy consumption as compared to what can be provided by traditional NR devices (e.g., traditional NR UEs). For example, traditional NR devices may have higher requirements in terms of data rates and latency compared to what can be provided with, for example, LTE machine-type communication (MTC) and narrowband internet of things (NB-IoT) communication. In terms of reduced device complexity, RedCap UEs may be configured with support for reduced number of transmit and/or receive (TX/RX) antennas at the device side, reduction of the minimum required device bandwidth and/or support for devices that are only capable of half-duplex operation (e.g., devices that do not support simultaneous TX/RX) in paired spectrum. In terms of reduced device energy consumption, RedCap UEs may be configured with reduced complexity in PDCCH monitoring by reducing the number of required blind decodings, and may be configured with extended discontinuous reception (DRX) functionality. One having ordinary skill in the art will appreciate that the examples in the present disclosure are suited for applications utilizing RedCap UEs, although they may be equally applied in traditional NR configurations as well.

In some examples, a RedCap UE may have relatively small uplink transmission requirements. For example, a sensor might only occasionally transmit a small amount of data when a sensed condition occurs. Given the relatively complex signaling and the relatively long latency involved in the grant-based uplink transmission procedure of FIG. 4, it is desirable to avoid this signaling overhead and latency for a RedCap UE (e.g., to increase the battery life and improve the performance of the RedCap UE).

To this end, a UE (e.g., a RedCap UE) may be configured to transmit a small data transmission during a two-step or a four-step random access channel (RACH) procedure in an initial bandwidth part (BWP) or an active BWP. For example, a UE may select a preamble configured for uplink small data transmission during a RACH. Advantageously, a UE may transmit the data while in an RRC_INACTIVE mode. Thus, the UE does not need to transition to an RRC_CONNECTED mode to transmit the data.

Figure 6:
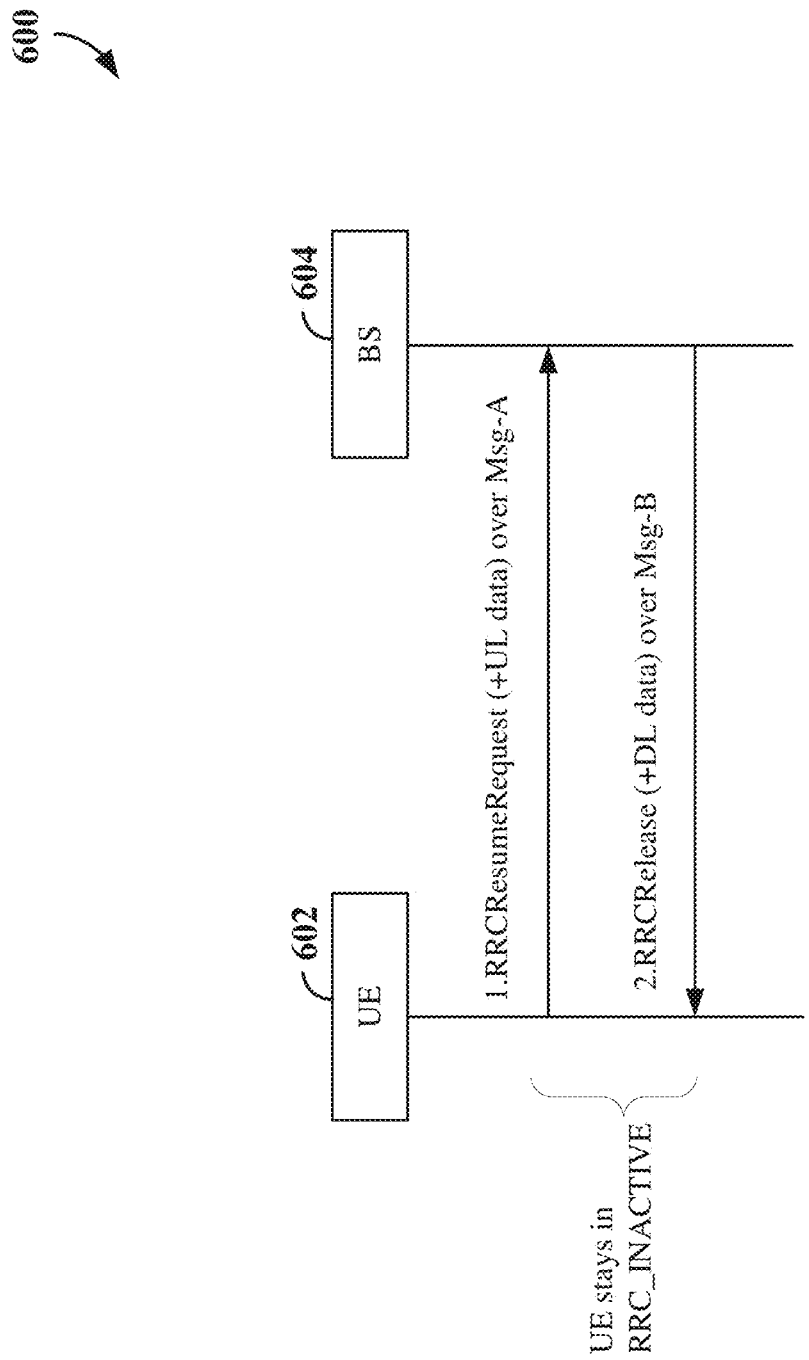
FIG. 6 is a signaling diagram illustrating an example of a small data transmission during two-step random access procedure between a UE and a BS according to some aspects.

FIG. 6 is a signaling diagram 600 illustrating a two-step RACH procedure between a UE 602 and a BS 604 according to some aspects. In some examples, the UE 602 may correspond to any of the UEs or scheduled entities shown in any of FIGS. 1, 2, 7-10, and 17. In some examples, the BS 604 may correspond to any of the base stations or scheduling entities shown in any of FIGS. 1, 2, 7-10, and 20. In this example, at 1, the UE 602 may transmit a small amount of data (mobile originated (MO) UL data) to the BS 604 in Msg-A of the two-step RACH procedure. In addition, at 2, the BS 604 may transmit a small amount of data (DL data) to the UE 602 in Msg-B of the two-step RACH procedure. As indicated in FIG. 6, the UE may remain in the RRC_INACTIVE mode to transmit the UL data and receive the DL data.

Figure 7:
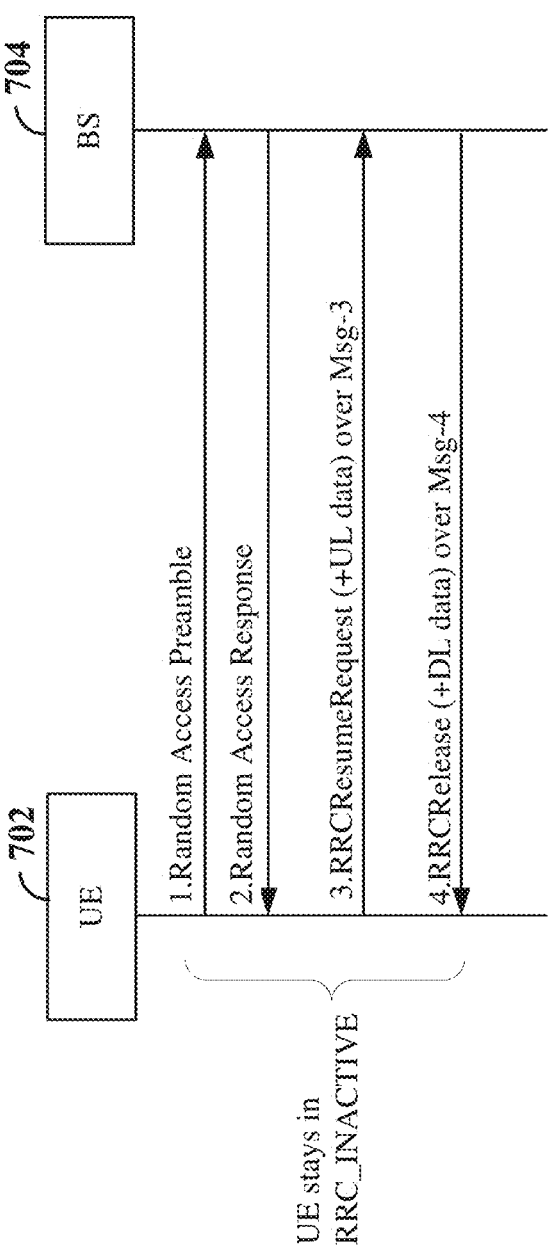
FIG. 7 is a signaling diagram illustrating an example of a small data transmission during a four-step random access procedure between a UE and a BS according to some aspects.

FIG. 7 is a signaling diagram 700 illustrating a four-step RACH procedure between a UE 702 and a BS 704 according to some aspects. In some examples, the UE 702 may correspond to any of the UEs or scheduled entities shown in any of FIGS. 1, 2, 6, 8-10, and 17. In some examples, the BS 704 may correspond to any of the base stations or scheduling entities shown in any of FIGS. 1, 2, 6, 8-10, and 20. To begin the four-step RACH procedure, at 1, the UE 702 transmits a first message including a physical random access channel (PRACH) preamble to the BS 704. The transmission of the PRACH preamble may be referred to as Msg-1 of the four-step RACH procedure. At 2, the BS 704 responds with a second message including a random access response (RAR) (also referred to as a RACH Response). The second message may be referred to as Msg-2 of the four-step RACH procedure and may include both a PDCCH, which may be referred to as Msg-2 (PDCCH), and a PDSCH carrying the RAR, which may be referred to as Msg-2 (PDSCH). In this example, at 3, the UE 702 may transmit a small amount of data (mobile originated (MO) UL data) to the BS 704 in Msg-3 of the four-step RACH procedure. In addition, at 4, the BS 604 may transmit a small amount of data (DL data) to the UE 602 in Msg-4 of the four-step RACH procedure. As indicated in FIG. 7, the UE may remain in the RRC_INACTIVE mode to transmit the UL data and receive the DL data.

As an alternative to the RACH-based procedures of FIGS. 6 and 7, a UE may be pre-configured with uplink resources. This type of resource allocation procedure may be referred to as a grant-free procedure. By providing pre-configured uplink resources, the use of Msg-1 and Msg-2, as well as the need to perform a legacy connection establishment procedure, may be avoided. Moreover, the UE may transmit more data to the base station using less signaling as compared to the RACH-based procedures. In some examples, the UE may be configured with uplink resources via dedicated RRC signaling while in a connected state (e.g., thereby obtaining UE-specific radio resources to use for uplink transmissions, a radio network temporary identifier (RNTI) to be used for the uplink transmissions, etc.).

Figure 8:
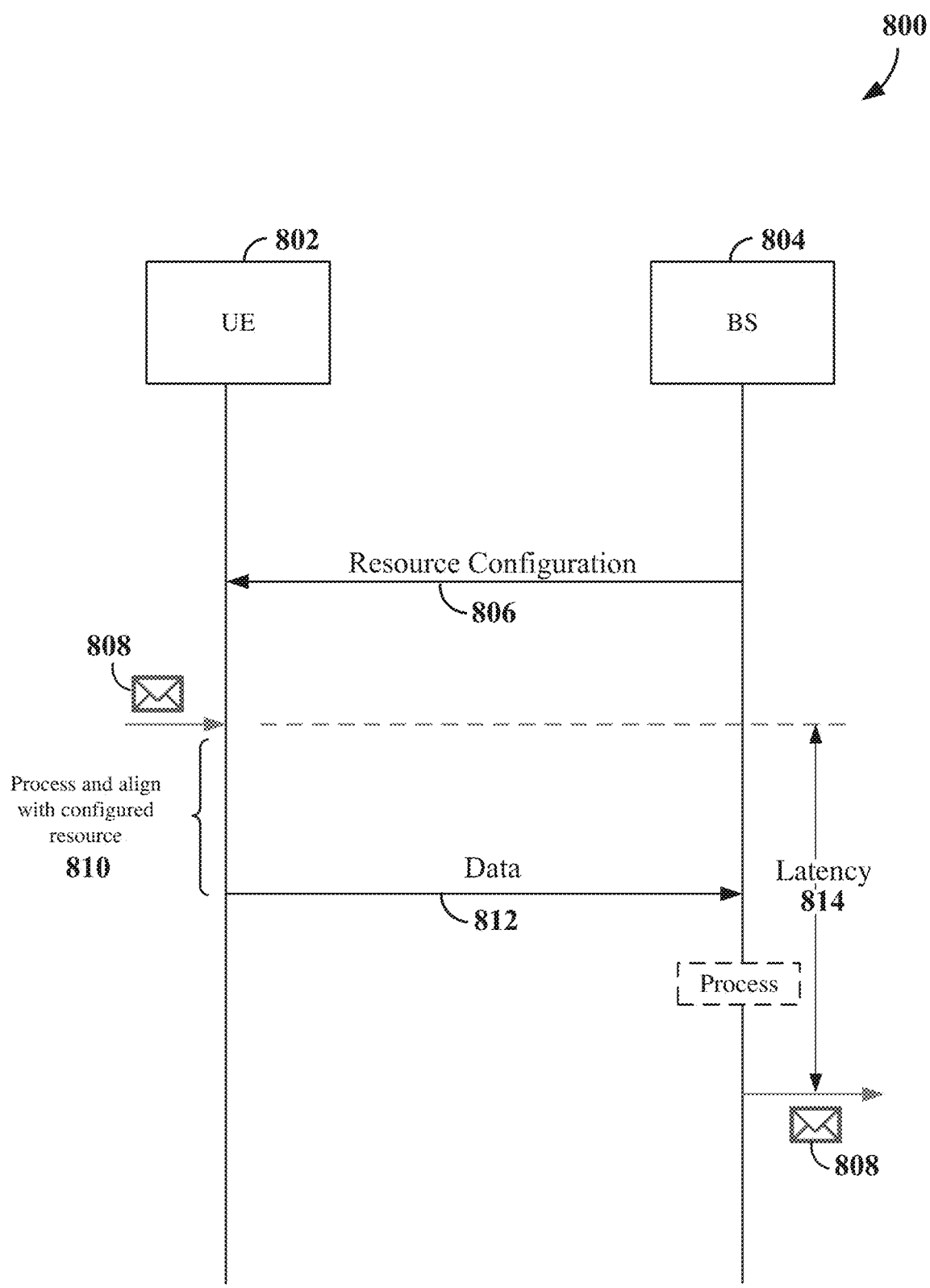
FIG. 8 is a signaling diagram illustrating an example of a grant-free procedure between a UE and a BS according to some aspects.

FIG. 8 is a signaling diagram 800 illustrating an example of a grant-free procedure between a UE 802 and a BS 804 according to some aspects. In some examples, the UE 802 may correspond to any of the UEs or scheduled entities shown in any of FIGS. 1, 2, 6, 7, 9, 10, and 17. In some examples, the BS 804 may correspond to any of the base stations or scheduling entities shown in any of FIGS. 1, 2, 6, 7, 9, 10, and 20.

The BS 804 pre-configures the UE 802 with an uplink resource allocation and uplink transmission parameters via a resource configuration 806. When data 808 (e.g., a packet) is available for transmission at the UE 802, the UE processes the data and aligns it with the configured resource 810 and transmits the data 812 using the pre-allocated resources, whereby the BS 804 receives and processes the data 808. Of note, in this case, the UE 802 does not need to send a scheduling request to the BS 804 as in the grant-based procedure of FIG. 4. Accordingly, the procedure of FIG. 8 may have lower control channel overhead and reduced dependence on the control signaling (which may be prone to errors and cause delays) as compared to the grant-based procedure of FIG. 4. Moreover, as indicated in FIG. 8, the latency 814 of this procedure is shorter compared to the latency 416 of the grant-based procedure of FIG. 4.

Figure 9:
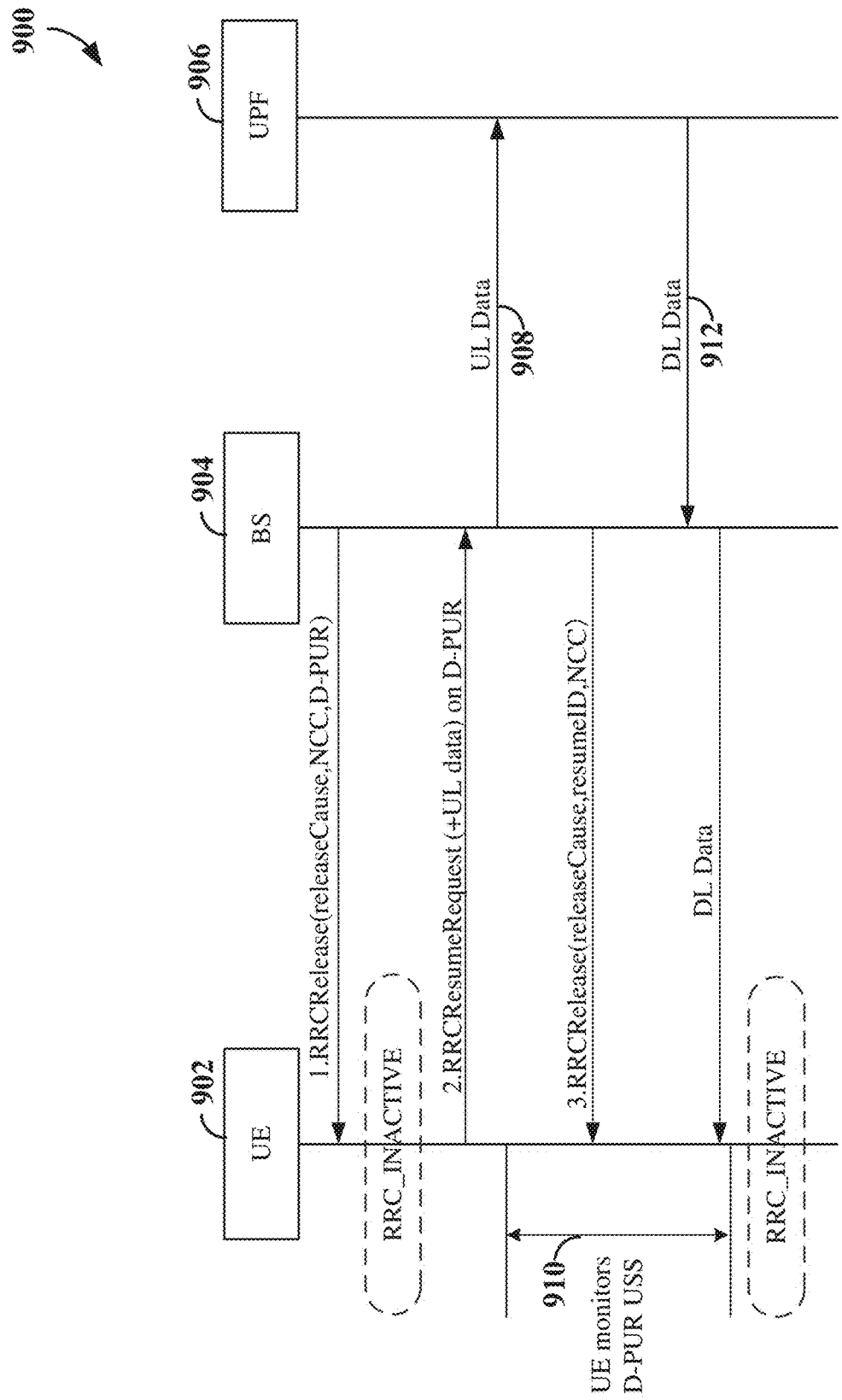
FIG. 9 is a signaling diagram illustrating an example of a small data transmission via a pre-configured uplink resource (PUR) according to some aspects.

FIG. 9 is a signaling diagram 900 illustrating an example of a mobile originated (MO) small data transmission (SDT) between a UE 902 and a BS 904 over a dedicated pre-configured uplink resource (PUR) according to some aspects. In some examples, the UE 902 may correspond to any of the UEs or scheduled entities shown in any of FIGS. 1, 2, 6-8, 10, and 17. In some examples, the BS 904 may correspond to any of the base stations or scheduling entities shown in any of FIGS. 1, 2, 6-8, 10, and 20.

In some examples, a pre-configured uplink resource can be configured when the UE 902 is in an RRC_CONNECTED mode. For example, the BS 904 may pre-configure uplink resources for the UE 902 in a similar manner as discussed above in conjunction with FIG. 8 (not shown in FIG. 9). This pre-configured uplink resource can then be used for subsequent uplink small data transmissions (SDTs) when the UE 902 is in an RRC_INACTIVE mode. For example, in FIG. 9, the UE 902 may enter the RRC_INACTIVE mode after receiving an RRCRelease message from the BS 904 at 1. At 2, the UE 902 may send an SDT to the BS 904 in an RRCResumeRequest message. The BS 904 may then forward this uplink data 908 to a user plane function (UPF) 906 (e.g., of a core network node). Also, in response to the RRCResumeRequest message, the BS 904 may send an RRCRelease message to the UE 902 at 3, thereby keeping the UE 902 in the RRC-INACTIVE mode. As shown in FIG. 9, the UE 902 may also monitor 910 for DL data 912 forwarded by the BS 904. The UE 902 may send the UL data and receive the DL data in other messages in other examples. As indicated in FIG. 9, the UE may remain in the RRC_INACTIVE mode to transmit the UL data and receive the DL data.

From the above it may be seen that the use of a PUR-based small data transmission may conserve UE power and reduce signaling overhead in a wireless communication network. PUR occasions may be configured for regular UEs and RedCap UEs. The use of a PUR may be particularly useful for a RedCap UE, which may require coverage enhancement for DL signaling and may require higher power efficiency.

Intra-slot and/or inter-slot repetitions for PUSCH may be used for a RedCap UE in PUR configurations. For example, such repetitions may be used to compensate for coverage loss incurred by a RedCap UE due to reduced capabilities of the RedCap UE. These reduced capabilities may include, in some examples, reduced bandwidth, a reduced number of TX/RX antennas, reduced antenna efficiency (e.g., due to device size limitations), or a combination thereof.

If a UE is configured with PUR resources, in some examples, the UE validates the timing advance (TA) before transmitting on a PUR occasion to avoid interfering with UL transmissions (e.g., PUSCH, PUCCH, SRS, PRACH) by other UEs. Due to factors such as the UL/DL switching gap that may be required for TDD communication and HD-FDD communication, potential numerology changes of the UL waveform, and potential BWP switching, not every PUR occasion is a valid one for a UE.

The disclosure relates in some aspects to a PUR validation procedure for a UE. The PUR validation procedures may be applicable to both regular UEs and RedCap UEs. PUR occasion validation may be done jointly or separately from TA validation. In some examples, if TA validation is performed before PUR validation, and the TA validation fails, the UE may skip the validation of the PUR occasion as well as the transmission on the PUR occasion. In some examples, if TA validation is performed before PUR validation and the TA validation succeeds, the UE may perform PUR occasion validation, based on the rules discussed below. In some examples, if PUR occasion validation is performed before TA validation, and the PUR validation fails, the UE may skip the TA validation as well as the transmission on the PUR occasion. In some examples, if PUR occasion validation is performed before TA validation, and the PUR validation succeeds, the UE may perform TA validation, based on the rules of TA validation.

A timer can be configured for a UE to validate the TA and the PUR. The starting time and length of this timer can be configured by RRC signaling in some examples. If a UE transmits on a PUR occasion, the UE may be required to finish both TA validation and PUR validation before the timer expires in some examples. The timer configuration can be cell-specific (e.g., independent of the UE capabilities) or cell and UE specific (e.g., at least dependent on one or more of the UE's capabilities).

Several examples of rules for PUR occasions validation follow. Other rules may be used in other examples.

In a first example, if a UE is configured with PUR resources and operates in TDD or HD-FDD mode, a valid PUR occasion needs to satisfy the rule: The PUR occasion must be at least N symbols away from the last DL symbols, N>0, where N depends on the sub-carrier spacing (SCS) of the PUR occasion. The parameter N may be hard coded in the UE (e.g., specified by a standard) or determined by the base station. The parameter N may be configured as a function of UE capability (e.g., a UE processing capability, a UE UL/DL switching time, a UE PUR capability, or some other UE capability).

In a second example, one or more of the following rules may be applied. (1) The UL symbols used by the PUR occasion have to align with the slot format of TDD. (2) The UL symbols used by the PUR occasion have to align with the DL-UL resource configuration allocated for HD-FDD across different carriers. (3) The UL symbols used by the PUR occasion cannot share the same slot with a preceding transmission of other UL signals/channels by the UE.

In a third example, the PUR occasion must be at least K symbols away from the preceding UL signals/channels. K>0. The parameter K may depend on the SCS of the PUR occasion. The parameter K may be hard coded in the UE (e.g., specified by a standard) or determined by the base station. The parameter K may be configured as a function of UE capability (e.g., processing capability).

Figure 10:
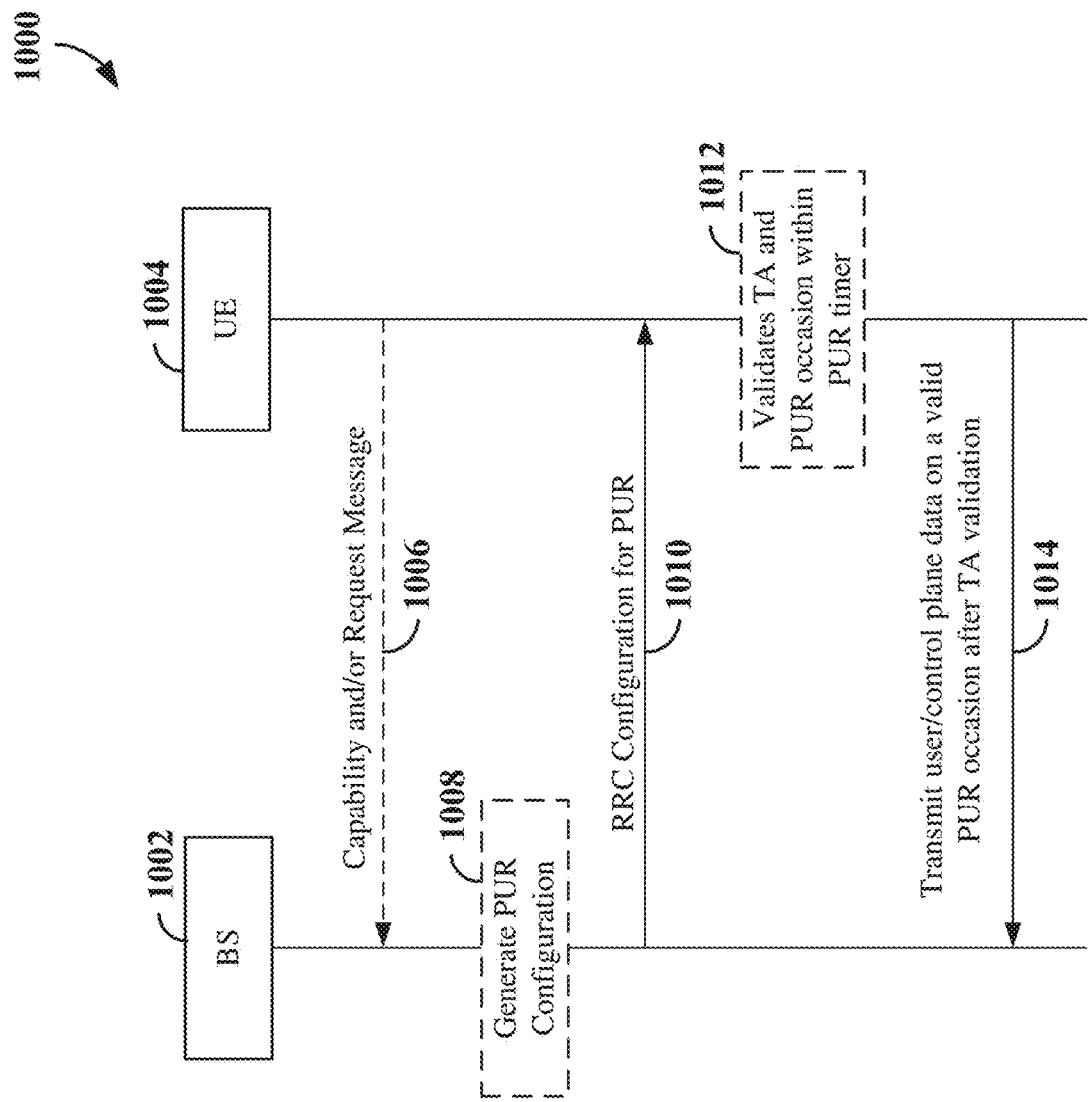
FIG. 10 is a signaling diagram illustrating an example of a PUR validation procedure according to some aspects.

FIG. 10 is a signaling diagram 1000 illustrating an example of a PUR validation procedure in a communication system including a BS 1002 and a UE 1004 according to some aspects. In some examples, the BS 1002 may correspond to any of the base stations or scheduling entities shown in any of FIGS. 1, 2, 6-9, and 20. In some examples, the UE 1004 may correspond to any of the UEs or scheduled entities shown in any of FIGS. 1,2,6-9, and 17.

At 1006, the UE 1004 sends a capability message and/or a PUR configuration request message to the BS 1002. A capability message may include an indication of one or more capabilities (e.g., PUR capabilities) of the UE 1004. In some example, this UE capability information may include information indicative of a power headroom (PH) for the UE 1004, a buffer status report (BSR), and a channel state information (CSI) report. A PUR configuration request message may include, for example, an indication of the traffic pattern for the UE's upcoming UL transmissions, the periodicity of the UL transmissions, and the amount of data to be transmitted. In some examples, the PUR configuration request may include UE capability information.

At 1008 and 1010, the BS 1002 generates a PUR configuration for the UE 1004, and transmits an RRC configuration including the PUR configuration to the UE 1004. In some example, the PUR configuration may be based on at least one capability of the UE. In some examples, the PUR configuration may include one or more of a PUR timer configuration for a UE's validation of a TA and a PUR occasion, a PUR resource allocation, MCS or TBS configurations for PUR, power control parameters for PUR, a PUR response (PDCCH) monitoring window and search space configuration, a transmission configuration indicator (TCI) state for a PUR response, or a PUR RNTI of the UE. In some examples, the PUR configuration may include information and/or parameters for the suspension and/or resume procedures associated with a PUR and TA validation failure. A PUR resource allocation may be, for example, a single PUSCH slot, aggregated PUSCH slots, a regular slot, a mini-slot, or some other suitable allocation. In some examples, the BS 1002 may allocate periodic and/or aperiodic PUR resources for the UE 1004.

At 1012, for each PUR occasion, the UE 1004 validates the TA for the PUR occasion and validates the PUR occasion. For example, to validate the TA, the UE 1004 may measure the timing DL reference signals (e.g., synchronization signal blocks (SSB) signals) from the BS 1002 and determine whether the timing of the UE 1004 is close enough (e.g., substantially synchronized to) to the timing (e.g., sub-frame timing) of the BS 1002. In some examples, the UE 1004 may measure received reference signal power (RSRP) to determine whether the UE 1004 has moved relative to the BS 1002 as compared to a previous measurement when the UE 1004 was synchronized with the BS 1002 (e.g., when the UE 1004 received a TA command from the BS 1002 such as during a RACH procedure).

If a TA validation procedure for a PUR occasion and/or a PUR validation procedure for the PUR occasion fails, the UE 1004 may suspend that PUR occasion. For example, the UE 1004 may refrain from transmitting data on that PUR occasion.

In some examples (e.g., due to limited UE capabilities), a UE might not successfully conduct the measurements required by TA validation. For example, when an SSB overlaps with an UL transmission and the UE capability is half-duplex only, the UE is not able to make SSB-based DL measurements for TA validation. Since the UE does not have DL measurements available for TA validation in this case, the TA validation may be deemed to have failed, thereby resulting in suspension of the PUR occasion.

At 1014, for each validated PUR occasion, the UE 1004 transmits user plane data and/or control plane data to the BS 1002 via the corresponding PUR occasion. As discussed herein, the UE 1004 may transmit on a PUR occasion when the UE 1004 is in IDLE mode or INACTIVE mode (or some other mode).

Figure 11:
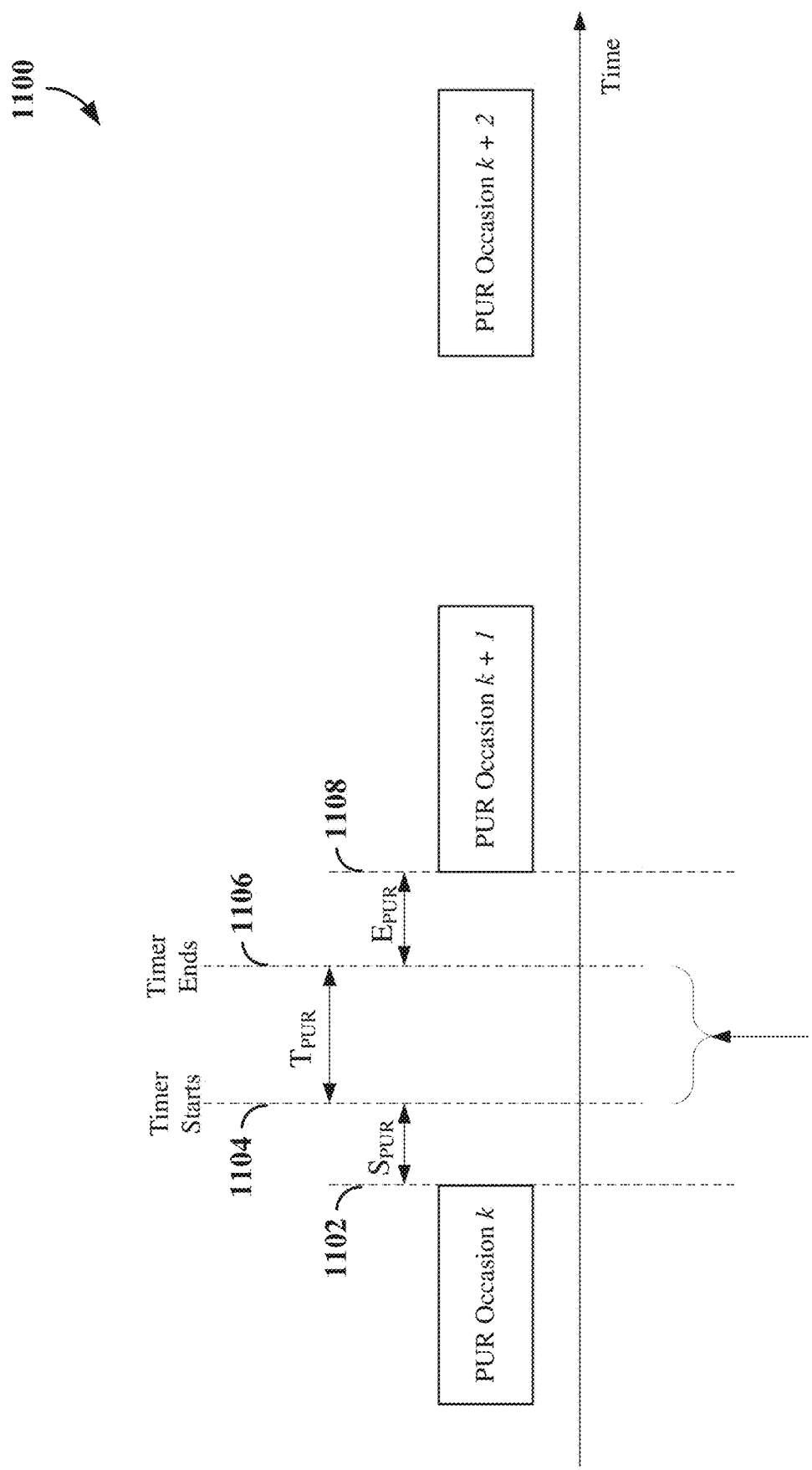
FIG. 11 is a diagram illustrating an example of PUR validation timing according to some aspects.

FIG. 11 illustrates an example of PUR validation timing 1100 including a PUR validation period that may be used for validating a PUR occasion (e.g., PUR occasion k+1). In this example, the PUR timer configuration for the UE's validation of the TA and the PUR occasion includes the time period $T_{PUR}$ and at least one of time periods $S_{PUR}$ or $E_{PUR}$. The PUR occasion validation procedure is performed during the time period $T_{PUR}$. The time period $S_{PUR}$ defines a period of time before the start of the time period $T_{PUR}$. The time period $E_{PUR}$ defines a period of time after the end of the time period $T_{PUR}$. The timer configuration can be cell specific or UE specific (dependent on at least one UE capability).

In the example of FIG. 11, the PUR validation period ($T_{PUR}$) for PUR occasion k+1 starts a defined period of time ($S_{PUR}$) after the end of the previous PUR occasion k. In addition, the PUR validation period ($T_{PUR}$) ends a defined period of time ($E_{PUR}$) before the beginning of the PUR occasion k+1. As shown in the example of FIG. 11, SPR starts at a first time 1102 and ends at a second time 1104 (the start of the validation period $T_{PUR}$). In addition, $E_{PUR}$ starts at a third time 1106 (the end of the validation period $T_{PUR}$) and ends at a fourth time 1108 (the beginning of the PUR occasion K+1).

Figure 12:
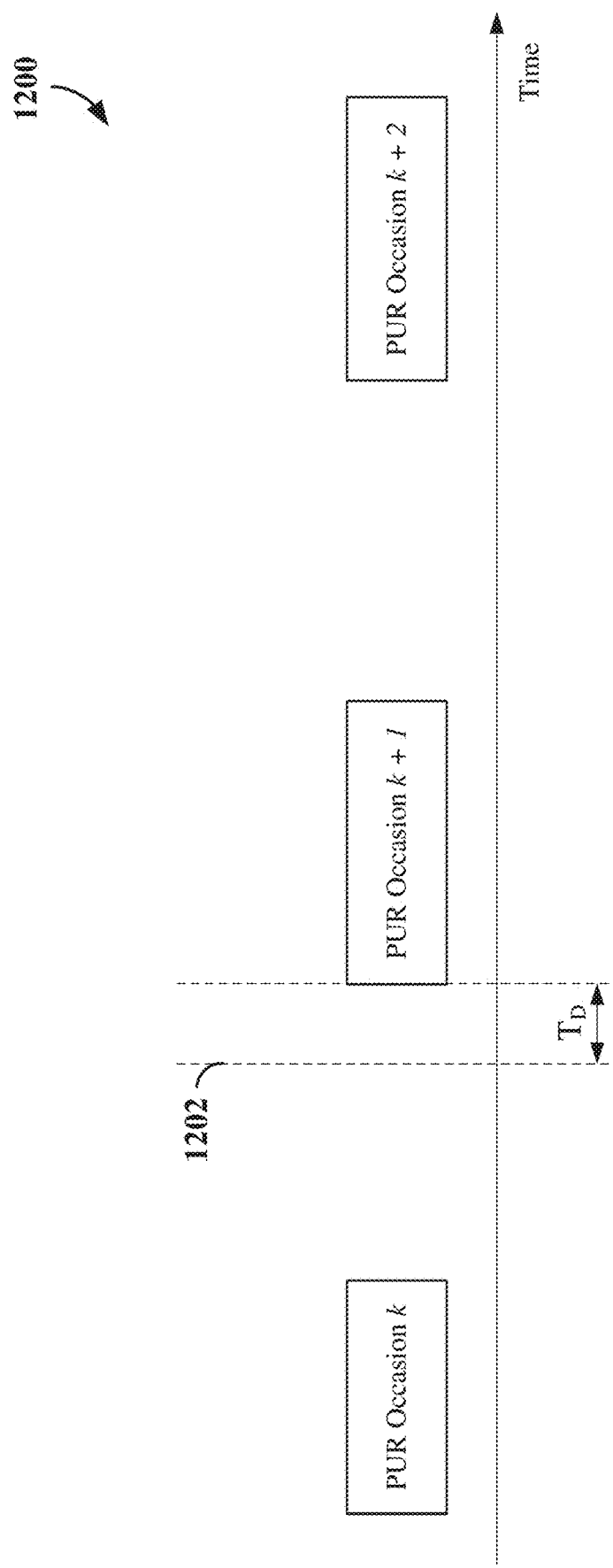
FIG. 12 is a diagram illustrating another example of PUR validation timing according to some aspects.

FIG. 12 illustrates an example of PUR validation timing 1200 including a PUR validation requirement for a PUR occasion k+1. For example, the PUR validation procedure performed during the time period $T_{PUR}$ of FIG. 11 (as discussed above) may determine whether the PUR validation requirement of FIG. 12 is met for PUR occasion k+1. Here, for the PUR occasion k+1 to be valid, the period of time $T_D$ from the time 1202 of the last downlink (DL) symbol (not shown) to the PUR occasion k+1 must be greater than or equal to N·Tμ ($T_D \geq N \cdot T_\mu$). In some examples, the time 1202 is the time of the last DL symbol before a PUR occasion. The DL symbol can belong to a TDD slot, or may be on the DL carrier of an HD-FDD operation. The parameter N [symbol] is the minimum gap between the last DL symbol (before PUR) and a valid PUR occasion. $T_\mu$ stands for the PUSCH symbol duration of the PUR occasion, where the SCS is given by $15 \times 2^\mu$ kHz and μ=0, 1, 2, . . . .

Figure 13:
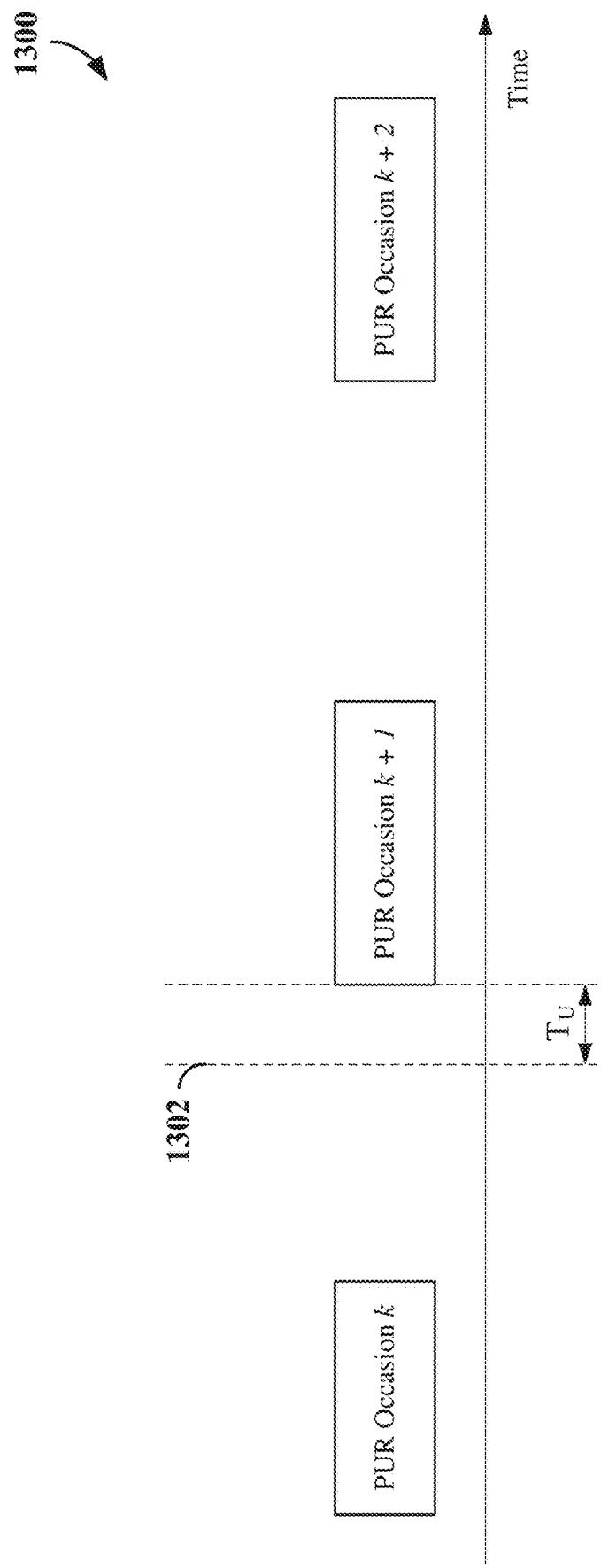
FIG. 13 is a diagram illustrating another example of PUR validation timing according to some aspects.

FIG. 13 illustrates another example of PUR validation timing 1300 including a PUR validation requirement for a PUR occasion k+1. For example, the PUR validation procedure performed during the time period $T_{PUR}$ of FIG. 11 (as discussed above) may determine whether the PUR validation requirement of FIG. 13 is met for PUR occasion k+1. Here, for the PUR occasion k+1 to be valid, the period of time $T_U$ from the time 1302 of the last uplink (UL) symbol (not shown) before the PUR occasion k+1 to the time of the PUR occasion k+1 must be greater than or equal to K·Tμ ($T_U \geq K \cdot T_\mu$). The parameter K [symbol] is the minimum gap between the last UL symbol (before PUR) and a valid PUR occasion. $T_\mu$ stands for the PUSCH symbol duration of the PUR occasion, where the SCS is given by $15 \times 2^\mu$ kHz and μ=0, 1, 2, . . . .

Figure 14:
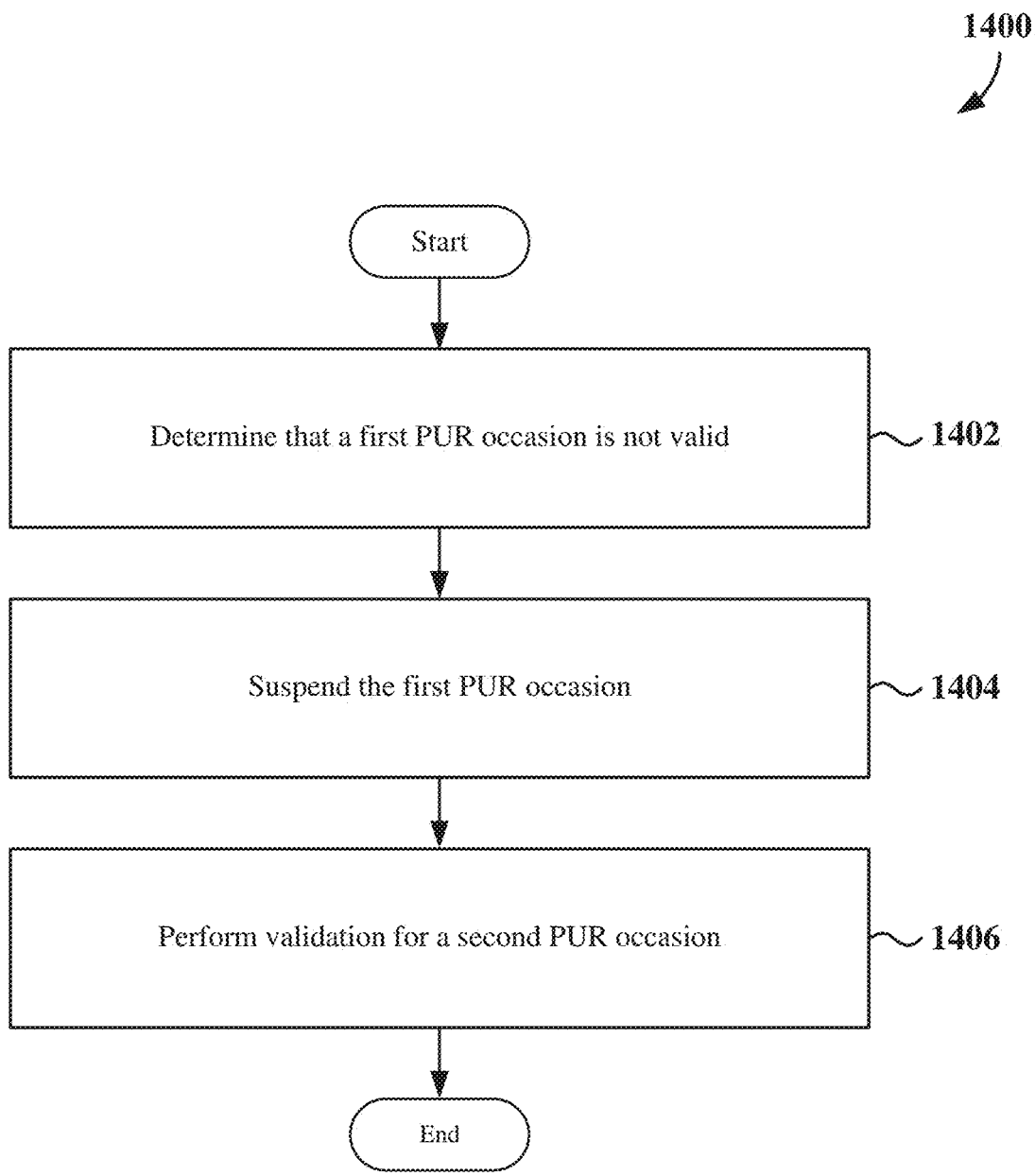
FIG. 14 is a flow chart of an example method for PUR validation according to some aspects.
Figure 15:
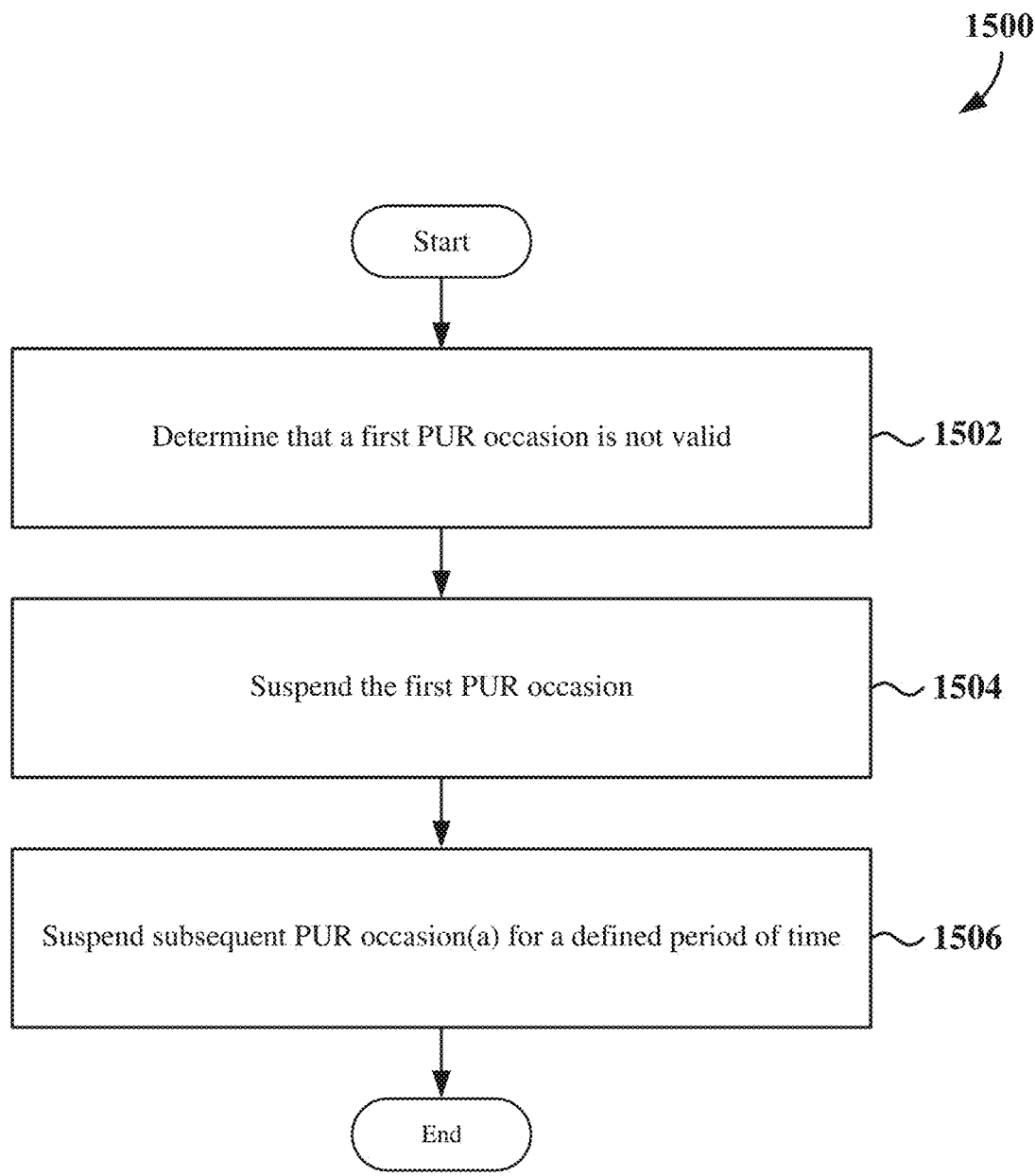
FIG. 15 is a flow chart of another example method for PUR validation according to some aspects.
Figure 16:
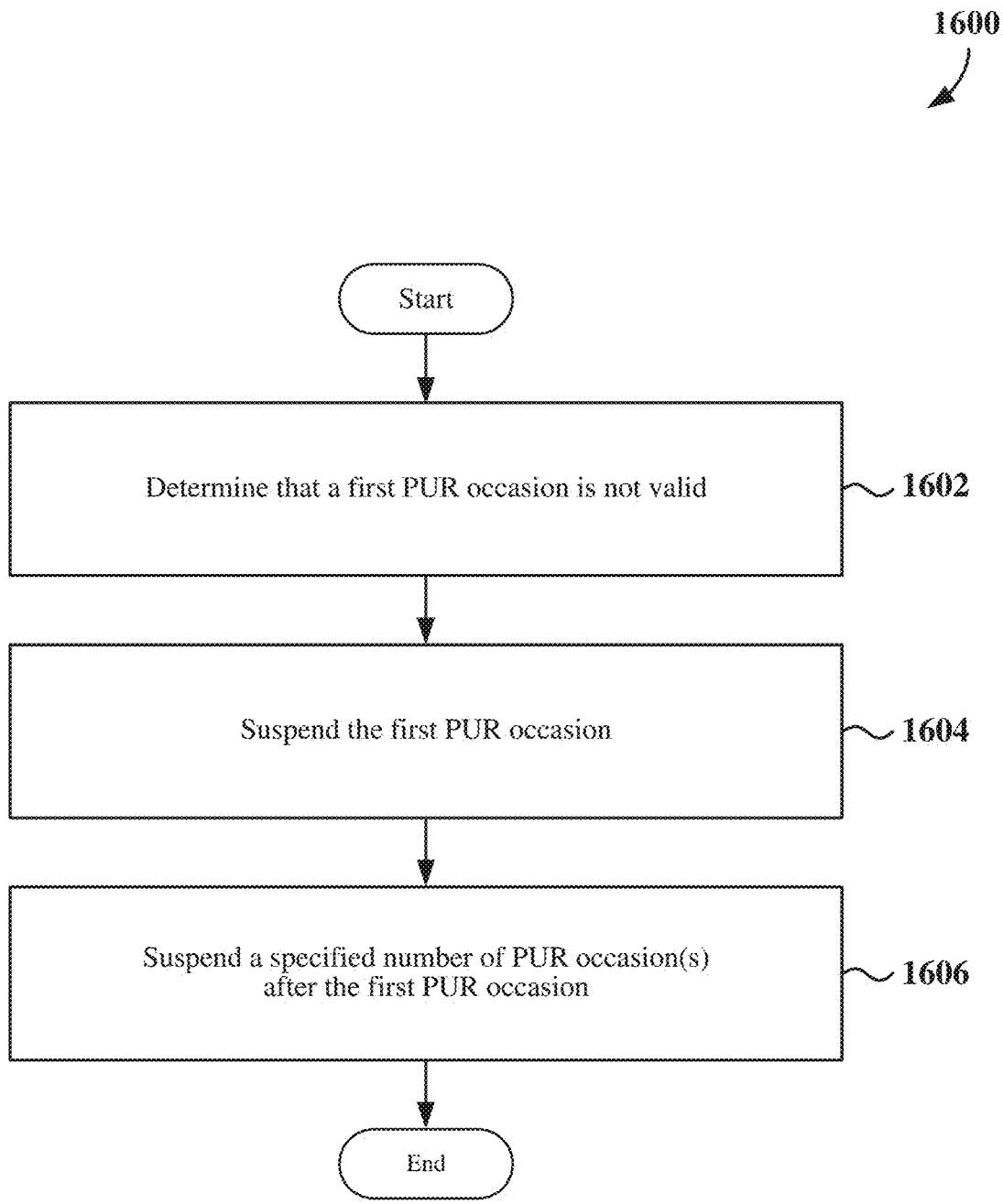
FIG. 16 is a flow chart of another example method for PUR validation according to some aspects.

In the event a particular PUR occasion is deemed invalid (e.g., the PUR occasion is suspended), a user equipment may take different actions for subsequent PUR occasions in different examples. In some examples, if a UE suspends a first PUR occasion, the UE may resume PUR validation and TA validation at the next PUR occasion. In some examples, if a UE suspends a first PUR occasion, the UE may suspend subsequent PUR occasions, based on pre-configured counter or timer (which may be controlled by a threshold). In this case, the UE may resume PUR validation and TA validation after the counter or timer expires. In some example, if a UE suspends a first PUR occasion, the UE may suspend all subsequent PUR occasions of a configured set of PUR occasions. As mentioned above, the information and/or parameters to be used by a user equipment for the suspension and/or resume procedures associated with PUR and TA validation failure may be indicated in a PUR configuration. FIG. 14-16 illustrates examples of user equipment procedures that may be used in the event a PR occasion is suspended.

FIG. 14 is a flow chart illustrating an example method 1400 for wireless communication in accordance with some aspects of the disclosure. The method 1400 illustrates an example of a scenario where, after suspending a first PUR occasion, the UE resumes PUR validation and TA validation at the next PUR occasion. As described below, some or all illustrated features may be omitted in a particular implementation within the scope of the present disclosure, and some illustrated features may not be required for implementation of all examples. In some examples, the method 1400 may be carried out by the UE 1700 illustrated in FIG. 17. In some examples, the method 1400 may be carried out by any suitable apparatus or means for carrying out the functions or algorithm described below.

At block 1402, a user equipment may determine that a first PUR occasion is not valid. For example, the TA validation and/or the PUR validation (e.g., performed at 1012 of FIG. 10) may have failed for a particular PUR occasion of an allocated set of PUR occasions.

At block 1404, the user equipment may suspend the first PUR occasion. For example, the user equipment may refrain from using the first PUR occasion for transmitting data.

At block 1406, the user equipment may perform validation for a second PUR occasion. For example, even though the first PUR occasion failed validation, the user equipment may still perform validation on a second PUR occasion (e.g., the next PUR occasion that follows the first PUR occasion) of the set of PUR occasions (e.g., instead of simply suspending all of the PUR occasions). If the validation for the second PUR occasion passes, the user equipment may use the second PUR occasion for transmitting data. Conversely, if the validation for the second PUR occasion does not pass, the user equipment will not use the second PUR occasion for transmitting data. In some examples, the operations of FIG. 14 may be performed for the second PUR occasion in the event the second PUR occasion is not valid. For example, if the second PUR occasion is not valid, the UE may still perform validation for a third PUR occasion, and so on.

FIG. 15 is a flow chart illustrating an example method 1500 for wireless communication in accordance with some aspects of the disclosure. The method 1500 illustrates an example of a scenario where, after suspending a first PUR occasion, the UE may suspend subsequent PUR occasions for a period of time. As described below, some or all illustrated features may be omitted in a particular implementation within the scope of the present disclosure, and some illustrated features may not be required for implementation of all examples. In some examples, the method 1500 may be carried out by the UE 1700 illustrated in FIG. 17. In some examples, the method 1500 may be carried out by any suitable apparatus or means for carrying out the functions or algorithm described below.

At block 1502, a user equipment may determine that a first PUR occasion is not valid. For example, the TA validation and/or the PUR validation (e.g., performed at 1012 of FIG. 10) may have failed for a particular PUR occasion of an allocated set of PUR occasions.

At block 1504, the user equipment suspend the first PUR occasion. For example, the user equipment may refrain from using the first PUR occasion for transmitting data.

At block 1506, the user equipment may suspend subsequent PUR occasion(s) for a defined period of time. For example, upon suspension of the first PUR occasion, the user equipment may start a timer and, while the timer is running, the user equipment suspends (does not transmit on) any PUR occasions of the set of PUR occasions that occur during that time. Once the timer expires (or the timer reaches a threshold), the user equipment may perform validation on any subsequent PUR occasions of the set of PUR occasions.

FIG. 16 is a flow chart illustrating an example method 1600 for wireless communication in accordance with some aspects of the disclosure. The method 1600 illustrates an example of a scenario where, after suspending a first PUR occasion, the UE may suspend one or more subsequent PUR occasions. As described below, some or all illustrated features may be omitted in a particular implementation within the scope of the present disclosure, and some illustrated features may not be required for implementation of all examples. In some examples, the method 1600 may be carried out by the UE 1700 illustrated in FIG. 17. In some examples, the method 1600 may be carried out by any suitable apparatus or means for carrying out the functions or algorithm described below.

At block 1602, a user equipment may determine that a first PUR occasion is not valid. For example, the TA validation and/or the PUR validation (e.g., performed at 1012 of FIG. 10) may have failed for a particular PUR occasion of an allocated set of PUR occasions.

At block 1604, the user equipment suspend the first PUR occasion. For example, the user equipment may refrain from using the first PUR occasion for transmitting data.

At block 1606, the user equipment may suspend a specified number of PUR occasion(s) after the first PUR occasion. For example, upon suspension of the first PUR occasion, the user equipment may start a counter and, prior to the counter reaching a specified threshold count, the user equipment suspends (does not transmit on) any PUR occasions of the set of PUR occasions. Once the counter reaches a threshold count, the user equipment may perform validation on any subsequent PUR occasions of the set of PUR occasions.

Figure 17:
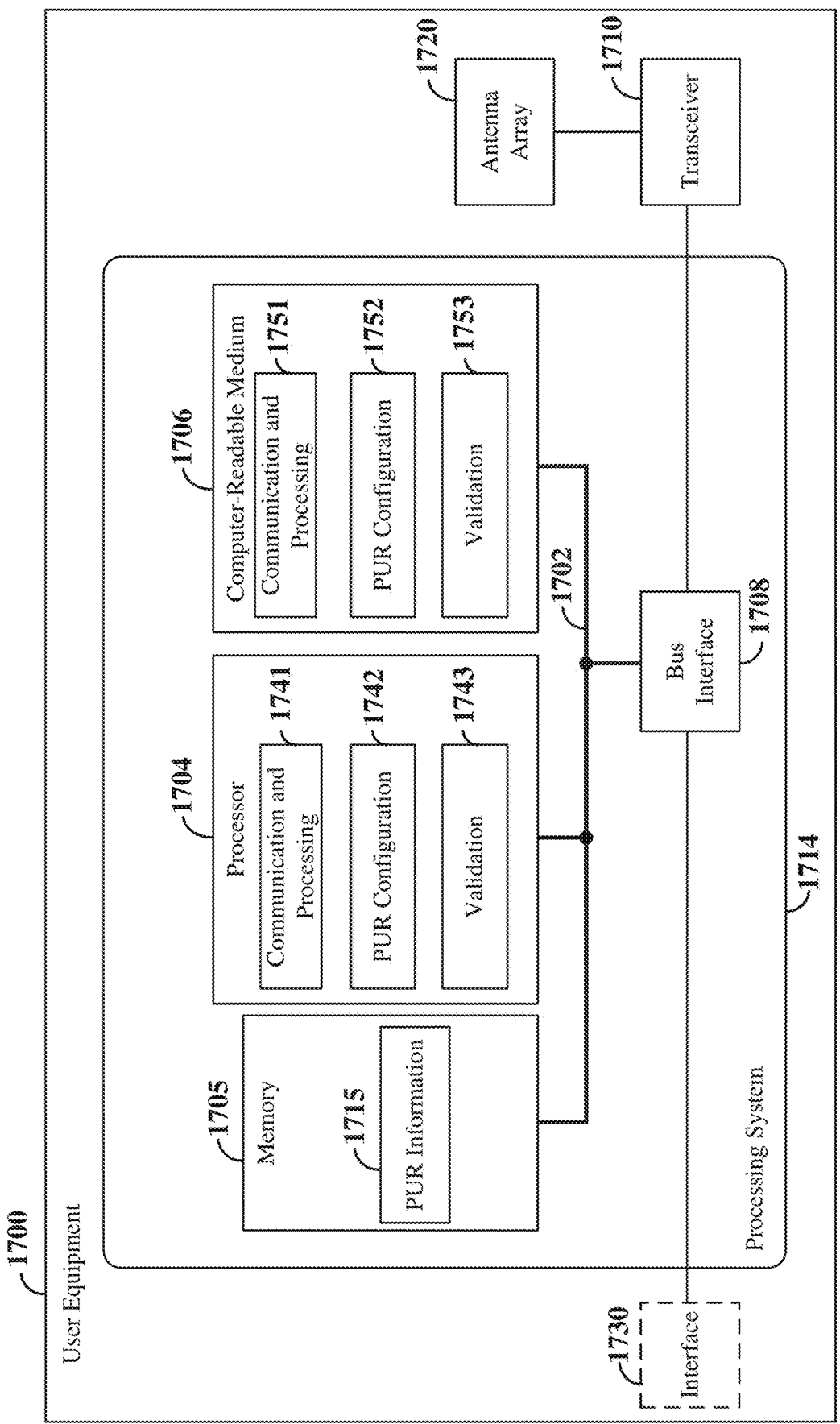
FIG. 17 is a block diagram illustrating an example of a hardware implementation for a user equipment employing a processing system according to some aspects.

FIG. 17 is a block diagram illustrating an example of a hardware implementation for a UE 1700 employing a processing system 1714. For example, the UE 1700 may be a device configured to wirelessly communicate with a base station, as discussed in any one or more of FIGS. 1-16. In some implementations, the UE 1700 may correspond to any of the UEs or scheduled entities shown in any of FIGS. 1, 2, and 6-10.

In accordance with various aspects of the disclosure, an element, or any portion of an element, or any combination of elements may be implemented with the processing system 1714. The processing system 1714 may include one or more processors 1704. Examples of processors 1704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1700 may be configured to perform any one or more of the functions described herein. That is, the processor 1704, as utilized in a UE 1700, may be used to implement any one or more of the processes and procedures described herein.

The processor 1704 may in some instances be implemented via a baseband or modem chip and in other implementations, the processor 1704 may itself comprise a number of devices distinct and different from a baseband or modem chip (e.g., in such scenarios as may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1714 may be implemented with a bus architecture, represented generally by the bus 1702. The bus 1702 may include any number of interconnecting buses and bridges depending on the specific application of the processing system 1714 and the overall design constraints. The bus 1702 communicatively couples together various circuits including one or more processors (represented generally by the processor 1704), a memory 1705, and computer-readable media (represented generally by the computer-readable medium 1706). The bus 1702 may also link various other circuits such as timing sources, peripherals, voltage regulators, and power management circuits, which are well known in the art, and therefore, will not be described any further. A bus interface 1708 provides an interface between the bus 1702 and a transceiver 1710 and between the bus 1702 and an interface 1730. The transceiver 1710 provides a communication interface or means for communicating with various other apparatus over a wireless transmission medium. In some examples, the UE may include two or more transceivers 1710, each configured to communicate with a respective network type (e.g., terrestrial or non-terrestrial). The interface 1730 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 1730 may include a user interface (e.g., keypad, display, speaker, microphone, joystick). Of course, such a user interface is optional, and may be omitted in some examples, such as an IoT device.

The processor 1704 is responsible for managing the bus 1702 and general processing, including the execution of software stored on the computer-readable medium 1706. The software, when executed by the processor 1704, causes the processing system 1714 to perform the various functions described below for any particular apparatus. The computer-readable medium 1706 and the memory 1705 may also be used for storing data that is manipulated by the processor 1704 when executing software. For example, the memory 1705 may include PUR information 1715 (e.g., a PUR configuration) that may be used by the processor 1704 for PUR-related operations as discussed herein.

One or more processors 1704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1706.

The computer-readable medium 1706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1706 may reside in the processing system 1714, external to the processing system 1714, or distributed across multiple entities including the processing system 1714. The computer-readable medium 1706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1700 may be configured to perform any one or more of the operations described herein (e.g., as described above in conjunction with FIGS. 1-16 and as described below in conjunction with FIGS. 18 and 19). In some aspects of the disclosure, the processor 1704, as utilized in the UE 1700, may include circuitry configured for various functions.

The processor 1704 may include communication and processing circuitry 1741. The communication and processing circuitry 1741 may be configured to communicate with a base station, such as a gNB. The communication and processing circuitry 1741 may include one or more hardware components that provide the physical structure that performs various processes related to wireless communication (e.g., signal reception and/or signal transmission) as described herein. The communication and processing circuitry 1741 may further include one or more hardware components that provide the physical structure that performs various processes related to signal processing (e.g., processing a received signal and/or processing a signal for transmission) as described herein. In some examples, the communication and processing circuitry 1741 may include two or more transmit/receive chains, each configured to process signals in a different RAT (or RAN) type. The communication and processing circuitry 1741 may further be configured to execute communication and processing software 1751 included on the computer-readable medium 1706 to implement one or more functions described herein. The communication and processing circuitry 1741 may further be configured to control the antenna array 1720 and the transceiver 1710.

The communication and processing circuitry 1741 may further be configured to generate and transmit a request to the base station. For example, the request may be included in a MAC-CE carried in a PUSCH, UCI in a PUCCH or PUSCH, a random access message, or an RRC message. The communication and processing circuitry 1741 may further be configured to generate and transmit a scheduling request (e.g., via UCI in a PUCCH) to the base station to receive an uplink grant for the PUSCH carrying the MAC-CE including the request for uplink beam refinement.

The communication and processing circuitry 1741 may further be configured to generate and transmit an uplink signal. The uplink signal may include, for example, a PUCCH, PUSCH, SRS, DMRS, or PRACH.

In some implementations where the communication involves receiving information, the communication and processing circuitry 1741 may obtain information from a component of the UE 1700 (e.g., from the transceiver 1710 that receives the information via radio frequency signaling or some other type of signaling suitable for the applicable communication medium), process (e.g., decode) the information, and output the processed information. For example, the communication and processing circuitry 1741 may output the information to another component of the processor 1704, to the memory 1705, or to the bus interface 1708. In some examples, the communication and processing circuitry 1741 may receive one or more of signals, messages, other information, or any combination thereof. In some examples, the communication and processing circuitry 1741 may receive information via one or more channels. In some examples, the communication and processing circuitry 1741 may include functionality for a means for receiving. In some examples, the communication and processing circuitry 1741 may include functionality for a means for decoding.

In some implementations where the communication involves sending (e.g., transmitting) information, the communication and processing circuitry 1741 may obtain information (e.g., from another component of the processor 1704, the memory 1705, or the bus interface 1708), process (e.g., encode) the information, and output the processed information. For example, the communication and processing circuitry 1741 may output the information to the transceiver 1710 (e.g., that transmits the information via radio frequency signaling or some other type of signaling suitable for the applicable communication medium). In some examples, the communication and processing circuitry 1741 may send one or more of signals, messages, other information, or any combination thereof. In some examples, the communication and processing circuitry 1741 may send information via one or more channels. In some examples, the communication and processing circuitry 1741 may include functionality for a means for sending (e.g., a means for transmitting). In some examples, the communication and processing circuitry 1741 may include functionality for a means for encoding.

According to some examples, the processor 1704 may include PUR configuration circuitry 1742 configured to perform PUR configuration-related operations as discussed herein (e.g., one or more of the operations described in conjunction with FIGS. 5-13). In addition, in some examples, the PUR configuration circuitry 1742 may be configured to execute PUR configuration software 1752 included on the computer-readable medium 1706 to implement one or more functions described herein.

The PUR configuration circuitry 1742 may include functionality for a means for transmitting capability information. For example, the PUR configuration circuitry 1742 may be configured to perform one of more of the operations described at 1006 of FIG. 10 including obtaining capability information of the UE 1700 that is to be sent to a gNB and cooperating with (e.g., instructing) the communication and processing circuitry 1741 to transmit a message including the capability information to the gNB.

The PUR configuration circuitry 1742 may include functionality for a means for transmitting a PUR configuration request. For example, the PUR configuration circuitry 1742 may be configured to perform one of more of the operations described at 1006 of FIG. 10 and/or at block 1902 of FIG. 19. In some examples, the PUR configuration circuitry 1742 may generate a request for a PUR and cooperate with (e.g., instruct) the communication and processing circuitry 1741 to transmit the request to a gNB via designated signaling.

The PUR configuration circuitry 1742 may include functionality for a means for receiving a PUR configuration. For example, the PUR configuration circuitry 1742 may be configured to perform one of more of the receive-related operations described at 1010 of FIG. 10 and/or at block 1802 of FIG. 18 and/or at block 1904 of FIG. 19. In some examples, the PUR configuration circuitry 1742 may cooperate with (e.g., instruct) the communication and processing circuitry 1741 to monitor a designated channel for a transmission by a gNB. In addition, the PUR configuration circuitry 1742 may process information received by the communication and processing circuitry 1741 during such a transmission (e.g., to determine one or more configuration parameters).

According to some examples, the processor 1704 may include validation circuitry 1743 configured to perform validation-related operations as discussed herein (e.g., one or more of the operations described in conjunction with FIGS. 5-16). In addition, in some examples, the validation circuitry 1743 may be configured to execute validation software 1753 included on the computer-readable medium 1706 to implement one or more functions described herein.

The validation circuitry 1743 may include functionality for a means for performing a validation procedure. For example, the validation circuitry 1743 may be configured to perform one of more of the operations described at 1012 of FIG. 10 and/or at block 1804 of FIG. 18 and/or at block 1906 of FIG. 19. In some examples, the PUR configuration circuitry 1742 may determine whether a TA is valid and whether timing of the first PUR occasion indicates that the first PUR is valid.

The validation circuitry 1743 may include functionality for a means for selectively transmitting an uplink transmission. For example, the validation circuitry 1743 may be configured to perform one of more of the transmit-related operations described at 1014 of FIG. 10 and/or at block 1806 of FIG. 18 and/or at block 1908 of FIG. 19. In some examples, the validation circuitry 1743 may generate a small data transmission (SDT) and cooperate with (e.g., instruct) the communication and processing circuitry 1741 to transmit the SDT to a gNB on the resource allocated for the first PUR occasion.

Figure 18:
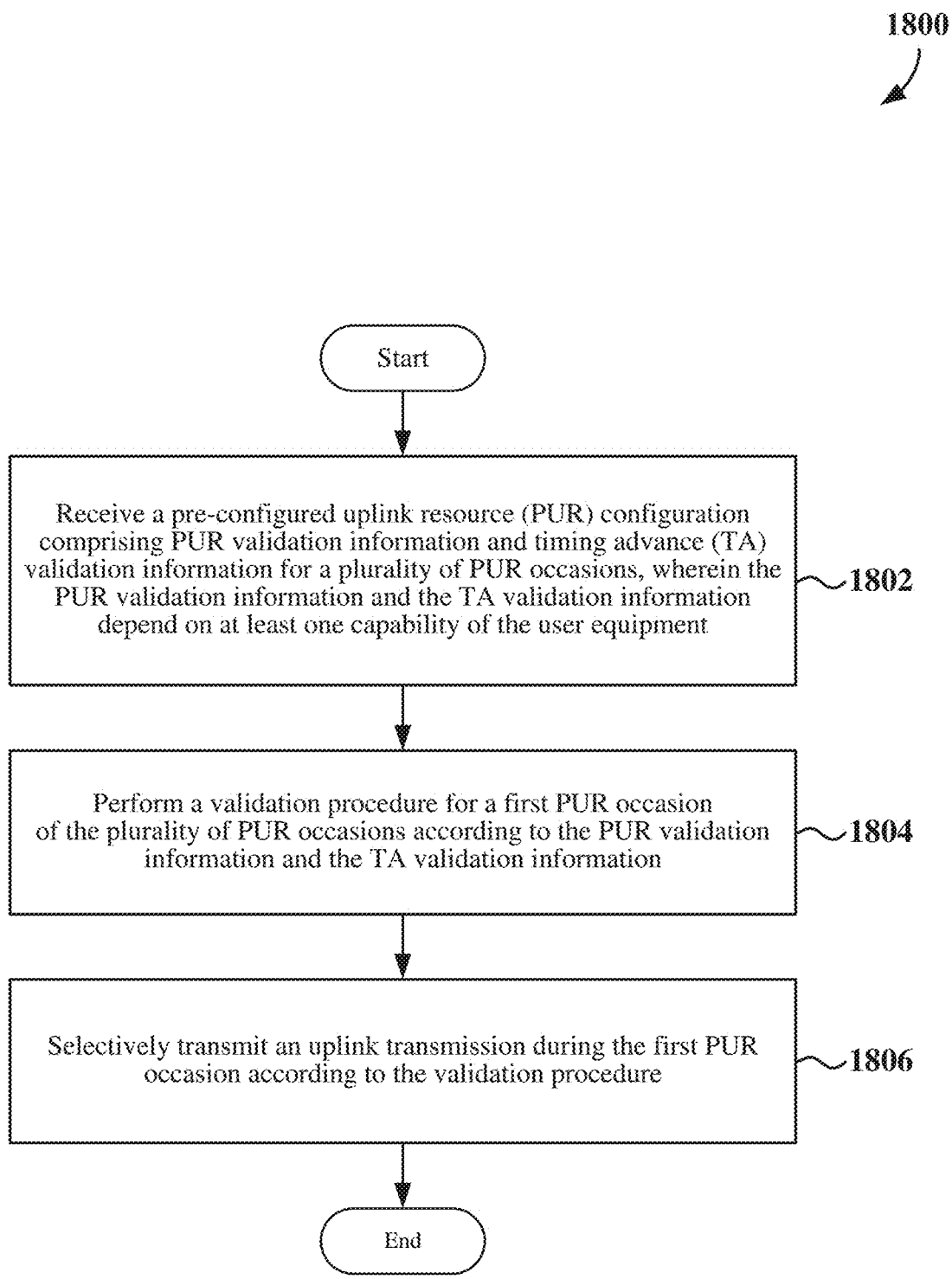
FIG. 18 is a flow chart of an example method for PUR validation according to some aspects.

FIG. 18 is a flow chart illustrating an example method 1800 for wireless communication in accordance with some aspects of the disclosure. As described below, some or all illustrated features may be omitted in a particular implementation within the scope of the present disclosure, and some illustrated features may not be required for implementation of all examples. In some examples, the method 1800 may be carried out by the UE 1700 illustrated in FIG. 17. In some examples, the method 1800 may be carried out by any suitable apparatus or means for carrying out the functions or algorithm described below.

At block 1802, the user equipment may receive a pre-configured uplink resource (PUR) configuration including PUR validation information and timing advance (TA) validation information for a plurality of PUR occasions, wherein the PUR validation information and the TA validation information depend on at least one capability of the user equipment. For example, the PUR configuration circuitry 1742 together with the communication and processing circuitry 1741 and the transceiver 1710 may provide a means to receive a pre-configured uplink resource (PUR) configuration including PUR validation information and timing advance (TA) validation information for a plurality of PUR occasions.

At block 1804, the UE may perform a validation procedure for a first PUR occasion of the plurality of PUR occasions according to the PUR validation information and the TA validation information. For example, the validation circuitry 1743 may provide a means to perform a validation procedure for a first PUR occasion of the plurality of PUR occasions according to the PUR validation information and the TA validation information.

At block 1806, the UE may selectively transmit an uplink transmission during the first PUR occasion according to the validation procedure. For example, the validation circuitry 1743 together with the communication and processing circuitry 1741 and the transceiver 1710, shown and described above in connection with FIG. 17, may provide a means to selectively transmit an uplink transmission during the first PUR occasion according to the validation procedure.

In some examples, the user equipment may transmit a PUR configuration request to a base station, wherein the PUR configuration is received from the base station (e.g., at block 1802) after the transmitting the PUR configuration request. In some examples, the PUR configuration request indicates the at least one capability of the user equipment, the PUR configuration includes an uplink bandwidth part configuration that is associated with at least one of PUR validation for the plurality of PUR occasions, TA validation for the plurality of PUR occasions, transmissions on the plurality of PUR occasions, or a combination thereof, the PUR configuration includes a downlink bandwidth part configuration that is associated with at least one of PUR validation for the plurality of PUR occasions, TA validation for the plurality of PUR occasions, transmissions on the plurality of PUR occasions, or a combination thereof.

In some examples, the plurality of PUR occasions are configured on an uplink bandwidth part indicated by the PUR configuration, and the selectively transmitting the uplink transmission during the first PUR occasion according to the validation procedure may include selectively transmitting the uplink transmission according to at least one transmission parameter associated with at least one valid PUR occasion of the plurality of PUR occasions.

In some examples, the PUR validation information may include at least one of a resource allocation associated with the plurality of PUR occasions, a transmission parameter associated with the plurality of PUR occasions, an uplink bandwidth part configured for PUR validation for the plurality of PUR occasions, a downlink bandwidth part configured for PUR validation for the plurality of PUR occasions, or a combination thereof.

In some examples, the receiving the PUR configuration may include receiving the PUR configuration via a radio resource control (RRC) message or a medium access control-control element (MAC-CE).

In some examples, the selectively transmitting the uplink transmission during the first PUR occasion according to the validation procedure may include determining that the first PUR occasion is valid according to a PUR occasion validation procedure of the validation procedure, determining that a TA is valid based on whether an uplink carrier configured with the plurality of PUR occasions is synchronized with a serving cell of the user equipment according to a TA validation procedure of the validation procedure, and transmitting the uplink transmission during the first PUR occasion after the determining that the first PUR occasion is valid and the TA is valid. In some examples, the PUR configuration indicates an uplink bandwidth part for the plurality of PUR occasions, whereby the first PUR occasion is in the uplink bandwidth part, the PUR configuration indicates a downlink bandwidth part for measurements associated with TA validation of the plurality of PUR occasions, and the determining that the TA is valid is further based on whether the user equipment conducted measurements for the TA validation procedure on the downlink bandwidth part prior to the first PUR occasion in the uplink bandwidth part.

In some examples, the selectively transmitting the uplink transmission during the first PUR occasion according to the validation procedure may include determining that the first PUR occasion is not valid according to the validation procedure, and abstaining from transmitting the uplink transmission during the first PUR occasion after the determining that the first PUR occasion is not valid. In some examples, the user equipment may after the determining that the first PUR occasion is not valid, determining whether a second PUR occasion of the plurality of PUR occasions is valid. In some examples, the user equipment may after the determining that the first PUR occasion is not valid, abstaining from transmitting the uplink transmission during at least one subsequent PUR occasion of the plurality of PUR occasions. In some examples, the abstaining from transmitting the uplink transmission during the at least one second PUR occasion may include suspending transmissions on the plurality of PUR occasions for a period of time. In some examples, the PUR validation information may include an indication of the period of time. In some examples, the abstaining from transmitting the uplink transmission during the at least one second PUR occasion may include suspending transmissions for a specified number of the plurality of PUR occasions. In some examples, the PUR validation information may include an indication of the specified number. In some examples, the user equipment may after the determining that the first PUR occasion is not valid, abstaining from transmitting the uplink transmission during any of the plurality of PUR occasions.

In some examples, the validation procedure may include determining that a TA validation for the first PUR occasion failed, and abstaining from validating the first PUR occasion after the determining that the TA validation for the first PUR occasion failed. In some examples, the user equipment may after the determining that the TA validation for the first PUR occasion failed, determining whether a second PUR occasion of the plurality of PUR occasions is valid. In some examples, the user equipment may after the determining that the TA validation for the first PUR occasion failed, abstaining from transmitting the uplink transmission during at least one second PUR occasion of the plurality of PUR occasions. In some examples, the abstaining from transmitting the uplink transmission during the at least one second PUR occasion may include suspending transmissions on the plurality of PUR occasions for a period of time. In some examples, the abstaining from transmitting the uplink transmission during the at least one second PUR occasion may include suspending transmissions for a specified number of the plurality of PUR occasions. In some examples, the user equipment may after the determining that the TA validation for the first PUR occasion failed, abstaining from transmitting the uplink transmission during any of the plurality of PUR occasions.

In some examples, the validation procedure may include determining that a TA validation for the first PUR occasion passed, and validating the first PUR occasion after the determining that the TA validation for the first PUR occasion passed. In some examples, the validation procedure may include determining that a PUR validation for the first PUR occasion failed, and abstaining from performing a TA validation for the first PUR occasion after the determining that the PUR validation for the first PUR occasion failed. In some examples, the validation procedure may include determining that a PUR validation for the first PUR occasion passed, and performing a TA validation for the first PUR occasion after the determining that the PUR validation for the first PUR occasion passed.

In some examples, the PUR validation information and the TA validation information may include a start time (e.g., the second time 1104 of FIG. 11) and a timer duration (e.g., the time period $T_{PUR}$ of FIG. 11) for validating at least one of the first PUR occasion, a TA for the first PUR occasion, or a combination thereof. In some examples, the PUR validation information and the TA validation information may include an end time (e.g., the third time 1106 of FIG. 11) and a timer duration (e.g., the time period $T_{PUR}$ of FIG. 11) for validating at least one of the first PUR occasion, a TA for the first PUR occasion, or a combination thereof. In some examples, the PUR validation information may include a start time (e.g., the second time 1104 of FIG. 11) and an end time (e.g., the third time 1106 of FIG. 11) for validating at least one of the first PUR occasion, a TA for the first PUR occasion, or a combination thereof. In some examples, the PUR validation information is defined for all user equipment under a cell of a base station.

In some examples, the user equipment performing the validation procedure may include determining that a switching gap between a first uplink transmission and a first downlink transmission (e.g., the UL/DL switching gap discussed above) is defined for the user equipment, and after the determining that the switching gap between the first uplink transmission and the first downlink transmission is defined for the user equipment, determining whether a time gap between the first PUR occasion and a last downlink symbol before the first PUR occasion is greater than or equal to a threshold, and determining whether the user equipment has conducted measurements for TA validation prior to the last downlink symbol. In some examples, the threshold depends on at least one of a duplex mode, a subcarrier spacing for the first PUR occasion, a capability of the user equipment, or a combination thereof. In some examples, the threshold is a standardized value or the user equipment receives the threshold from a base station. In some examples, determining whether the switching gap between the first uplink transmission and the first downlink transmission is defined for the user equipment may include determining whether the user equipment is operating in a time division duplex (TDD) mode, a full-duplex-frequency division duplex (FD-FDD) mode, or a half-duplex-frequency division duplex (HD-FDD) mode.

In some examples, the user equipment performing the validation procedure may include determining whether uplink symbols for the first PUR occasion align with a slot format for a time division duplex (TDD) mode of operation. In some examples, performing the validation procedure may include determining whether uplink symbols for the first PUR occasion align with an uplink resource configuration for a half-duplex-frequency division duplex (HD-FDD) mode of operation. In some examples, performing the validation procedure may include verifying that uplink symbols for the first PUR occasion do not share a slot with a first uplink transmission by the user equipment.

In some examples, the user equipment performing the validation procedure may include determining whether a transmission gap (e.g., a defined minimum gap between uplink transmissions) between a first uplink transmission and a PUR transmission is defined for the user equipment, and if the transmission gap is defined, determining whether a time gap between the first PUR occasion and a last uplink symbol before the first PUR occasion is greater than or equal to a threshold. In some examples, the threshold depends on at least one of a duplex mode, a subcarrier spacing for the first PUR occasion, a capability of the user equipment, or a combination thereof. In some examples, the threshold is a standardized value or the user equipment receives the threshold from a base station.

In some examples, the user equipment determining whether the transmission gap between the first uplink transmission and the PUR transmission is defined for the user equipment may include determining whether the user equipment is operating in a time division duplex (TDD) mode, a full-duplex-frequency division duplex (FD-FDD) mode, or a half-duplex-frequency division duplex (HD-FDD) mode.

Figure 19:
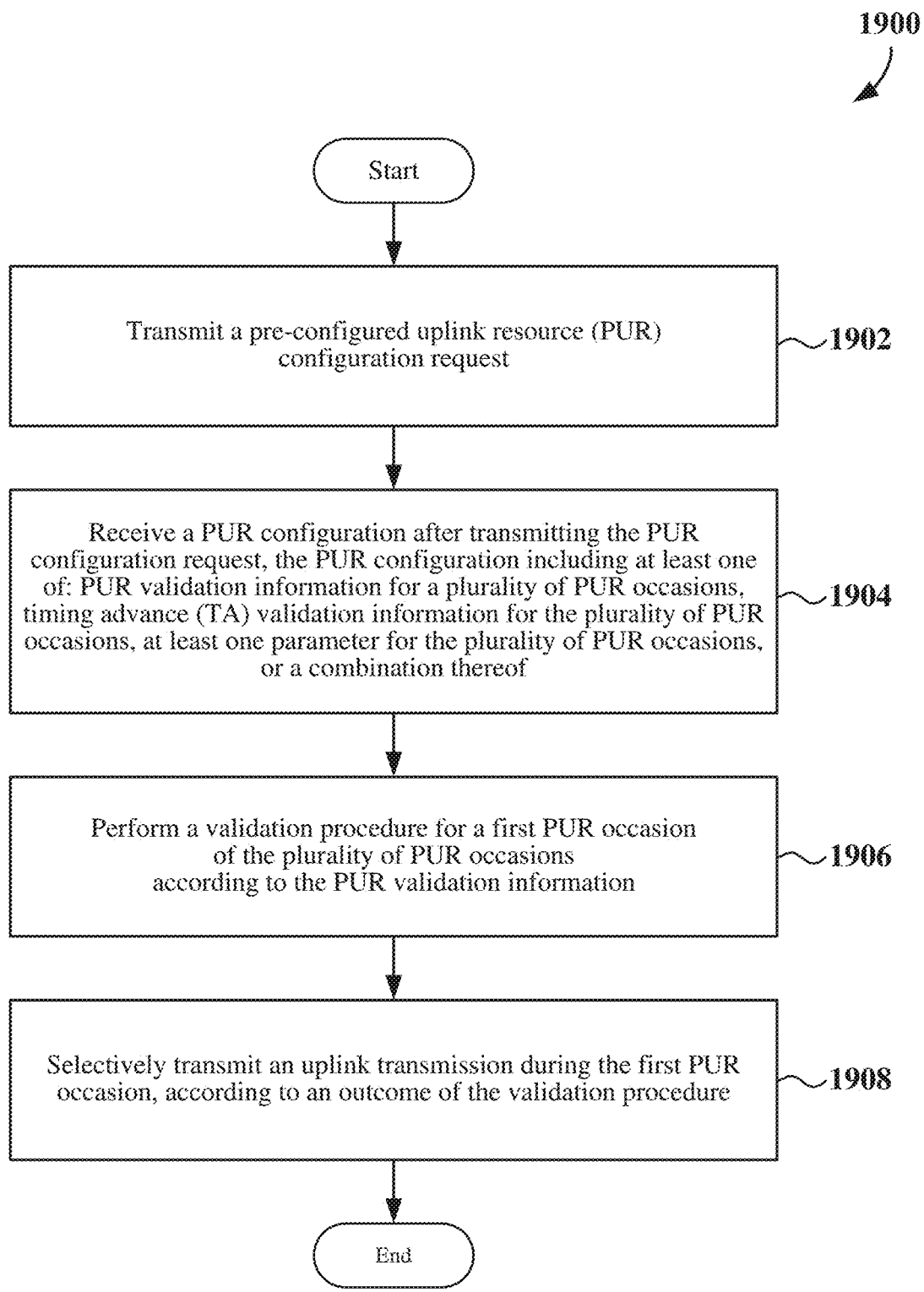
FIG. 19 is a flow chart of another example method for PUR validation according to some aspects.

FIG. 19 is a flow chart illustrating an example method 1900 for wireless communication in accordance with some aspects of the disclosure. As described below, some or all illustrated features may be omitted in a particular implementation within the scope of the present disclosure, and some illustrated features may not be required for implementation of all examples. In some examples, the method 1900 may be carried out by the UE 1700 illustrated in FIG. 17. In some examples, the method 1900 may be carried out by any suitable apparatus or means for carrying out the functions or algorithm described below.

At block 1902, a user equipment may transmit a preconfigured uplink resource (PUR) configuration request. For example, the PUR configuration circuitry 1742 together with the communication and processing circuitry 1741 and the transceiver 1710, shown and described above in connection with FIG. 17, may provide a means to transmit a preconfigured uplink resource (PUR) configuration request.

At block 1904, the user equipment may receive a PUR configuration after transmitting the PUR configuration request, the PUR configuration including at least one of: PUR validation information for a plurality of PUR occasions, timing advance (TA) validation information for the plurality of PUR occasions, at least one parameter for the plurality of PUR occasions, or a combination thereof. For example, the PUR configuration circuitry 1742 together with the communication and processing circuitry 1741 and the transceiver 1710 may provide a means to receive a PUR configuration after transmitting the PUR configuration request.

In some examples, the PUR validation information and the TA validation information may include a start time and a timer duration for validating at least one of: the first PUR occasion, a timing advance for the first PUR occasion, or a combination thereof. In some examples, the PUR validation information and the TA validation information may include an end time and a timer duration for validating at least one of: the first PUR occasion, a TA for the first PUR occasion, or a combination thereof. In some examples, the PUR validation information may include a start time and an end time for validating at least one of: the first PUR occasion, a TA for the first PUR occasion, or a combination thereof. In some examples, the at least one parameter may include at least one of: a resource allocation associated with the plurality of PUR occasions, a transmission parameter associated with the plurality of PUR occasions, or a combination thereof. In some examples, receiving the PUR configuration may include receiving the PUR configuration via a radio resource control (RRC) message or a medium access control-control element (MAC-CE).

In some examples, the PUR validation information is defined for all user equipment under a cell of a base station. In some examples, the PUR configuration request may indicate at least one capability of the user equipment and the PUR validation information and the TA validation information depends on the at least one capability of the user equipment.

At block 1906, the UE may perform a validation procedure for a first PUR occasion of the plurality of PUR occasions according to the PUR validation information. For example, the validation circuitry 1743 may provide a means to perform a validation procedure for a first PUR occasion of the plurality of PUR occasions according to the PUR validation information.

In some examples, the validation procedure may include determining that a TA validation for the first PUR occasion failed and abstaining from validating the first PUR occasion after determining that the TA validation for the first PUR occasion failed. In some examples, the validation procedure may include determining that a TA validation for the first PUR occasion passed and validating the first PUR occasion after determining that the TA validation for the first PUR occasion passed. In some examples, the validation procedure may include determining that a PUR validation for the first PUR occasion failed and abstaining from performing a TA validation for the first PUR occasion after determining that the PUR validation for the first PUR occasion failed. In some examples, the validation procedure may include determining that a PUR validation for the first PUR occasion passed and performing a TA validation for the first PUR occasion after determining that the PUR validation for the first PUR occasion passed.

In some examples, performing the validation procedure may include determining whether a switching gap between a first uplink transmission and a first downlink transmission is defined for the user equipment and, if the switching gap is defined, determining whether a time gap between the first PUR occasion and a last downlink symbol before the first PUR occasion is greater than or equal to a threshold. In some examples, the threshold depends on at least one of: a duplex mode, a subcarrier spacing for the first PUR occasion, a capability of the user equipment, or a combination thereof. In some examples, the threshold is a standardized value or the user equipment receives the threshold from a base station. In some examples, determining whether the switching gap between the first uplink transmission and the first downlink transmission is defined for the user equipment may include determining whether the user equipment is operating in a time division duplex (TDD) mode or a half-duplex-frequency division duplex (HD-FDD) mode.

In some examples, performing the validation procedure may include determining whether uplink symbols for the first PUR occasion align with a slot format for a time division duplex (TDD) mode of operation. In some examples, performing the validation procedure may include determining whether uplink symbols for the first PUR occasion align with an uplink resource configuration for a half-duplex-frequency division duplex (HD-FDD) mode of operation. In some examples, performing the validation procedure may include verifying that uplink symbols for the first PUR occasion do not share a slot with a first uplink transmission by the user equipment.

In some examples, performing the validation procedure may include determining whether a transmission gap between a first uplink transmission and a PUR transmission is defined for the user equipment and, if the transmission gap is defined, determining whether a time gap between the first PUR occasion and a last uplink symbol before the first PUR occasion is greater than or equal to a threshold. In some examples, the threshold depends on at least one of: a duplex mode, a subcarrier spacing for the first PUR occasion, a capability of the user equipment, or a combination thereof. In some examples, the threshold is a standardized value or the user equipment receives the threshold from a base station. In some examples, determining whether the transmission gap between the first uplink transmission and the PUR transmission is defined for the user equipment may include determining whether the user equipment is operating in a time division duplex (TDD) mode or a half-duplex-frequency division duplex (HD-FDD) mode.

At block 1908, the UE may selectively transmit an uplink transmission during the first PUR occasion, according to an outcome of the validation procedure. For example, the validation circuitry 1743 together with the communication and processing circuitry 1741 and the transceiver 1710, shown and described above in connection with FIG. 17, may provide a means to selectively transmit an uplink transmission during the first PUR occasion, according to an outcome of the validation procedure.

In some examples, selectively transmitting the uplink transmission during the first PUR occasion according to the validation procedure may include selectively transmitting the uplink transmission according to at least one transmission parameter associated with at least one valid PUR occasion of the plurality of PUR occasions. In some examples, selectively transmitting the uplink transmission during the first PUR occasion according to the validation procedure may include determining that the first PUR occasion is valid according to a PUR occasion validation procedure, determining that a TA is valid based on whether an uplink carrier configured with the plurality of PUR occasions is synchronized with a serving cell of the user equipment according to a TA validation procedure, and transmitting the uplink transmission during the first PUR occasion after determining that the first PUR occasion is valid and the TA is valid. In some examples, selectively transmitting the uplink transmission during the first PUR occasion according to the validation procedure may include determining that the first PUR occasion is not valid according to the validation procedure and abstaining from transmitting the uplink transmission during the first PUR occasion after determining that the first PUR occasion is not valid.

In some examples, a method of wireless communication at a user equipment may include transmitting a pre-configured uplink resource (PUR) configuration request and receiving a PUR configuration after transmitting the PUR configuration request. The PUR configuration may include at least one of PUR validation information for a plurality of PUR occasions, timing advance (TA) validation information for the plurality of PUR occasions, at least one parameter for the plurality of PUR occasions, or a combination thereof. The method may also include performing a validation procedure for a first PUR occasion of the plurality of PUR occasions according to the PUR validation information and selectively transmitting an uplink transmission during the first PUR occasion, according to an outcome of the validation procedure.

In some examples, a user equipment may include a transceiver, a memory, and a processor communicatively coupled to the transceiver and the memory. The processor may be configured to transmit a pre-configured uplink resource (PUR) configuration request via the transceiver and receive a PUR configuration via the transceiver after transmitting the PUR configuration request. The PUR configuration may include at least one of PUR validation information for a plurality of PUR occasions, timing advance (TA) validation information for the plurality of PUR occasions, at least one parameter for the plurality of PUR occasions, or a combination thereof. The processor may also be configured to perform a validation procedure for a first PUR occasion of the plurality of PUR occasions according to the PUR validation information and selectively transmit an uplink transmission during the first PUR occasion, according to an outcome of the validation procedure.

In some examples, a user equipment may include means for transmitting a pre-configured uplink resource (PUR) configuration request and means for receiving a PUR configuration after transmitting the PUR configuration request. The PUR configuration may include at least one of PUR validation information for a plurality of PUR occasions, timing advance (TA) validation information for the plurality of PUR occasions, at least one parameter for the plurality of PUR occasions, or a combination thereof. The user equipment may also include means for performing a validation procedure for a first PUR occasion of the plurality of PUR occasions according to the PUR validation information and means for selectively transmitting an uplink transmission during the first PUR occasion, according to an outcome of the validation procedure.

In some examples, an article of manufacture for use by a user equipment includes a computer-readable medium having stored therein instructions executable by one or more processors of the user equipment to transmit a pre-configured uplink resource (PUR) configuration request and receive a PUR configuration after transmitting the PUR configuration request. The PUR configuration may include at least one of PUR validation information for a plurality of PUR occasions, timing advance (TA) validation information for the plurality of PUR occasions, at least one parameter for the plurality of PUR occasions, or a combination thereof. The computer-readable medium may also have stored therein instructions executable by one or more processors of the user equipment to perform a validation procedure for a first PUR occasion of the plurality of PUR occasions according to the PUR validation information and selectively transmit an uplink transmission during the first PUR occasion, according to an outcome of the validation procedure.

In one configuration, the user equipment 1700 includes means for receiving a pre-configured uplink resource (PUR) configuration including PUR validation information and timing advance (TA) validation information for a plurality of PUR occasions, wherein the PUR validation information and the TA validation information depend on at least one capability of the user equipment, means for performing a validation procedure for a first PUR occasion of the plurality of PUR occasions according to the PUR validation information and the TA validation information, and means for selectively transmitting an uplink transmission during the first PUR occasion according to the validation procedure. In one aspect, the aforementioned means may be the processor 1704 shown in FIG. 17 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1704 is merely provided as an example, and other means for carrying out the described functions may be included within various aspects of the present disclosure, including but not limited to the instructions stored in the computer-readable medium 1706, or any other suitable apparatus or means described in any one or more of FIGS. 1, 2, 4, 6-10, and 17, and utilizing, for example, the methods and/or algorithms described herein in relation to FIGS. 18 and 19.

Figure 20:
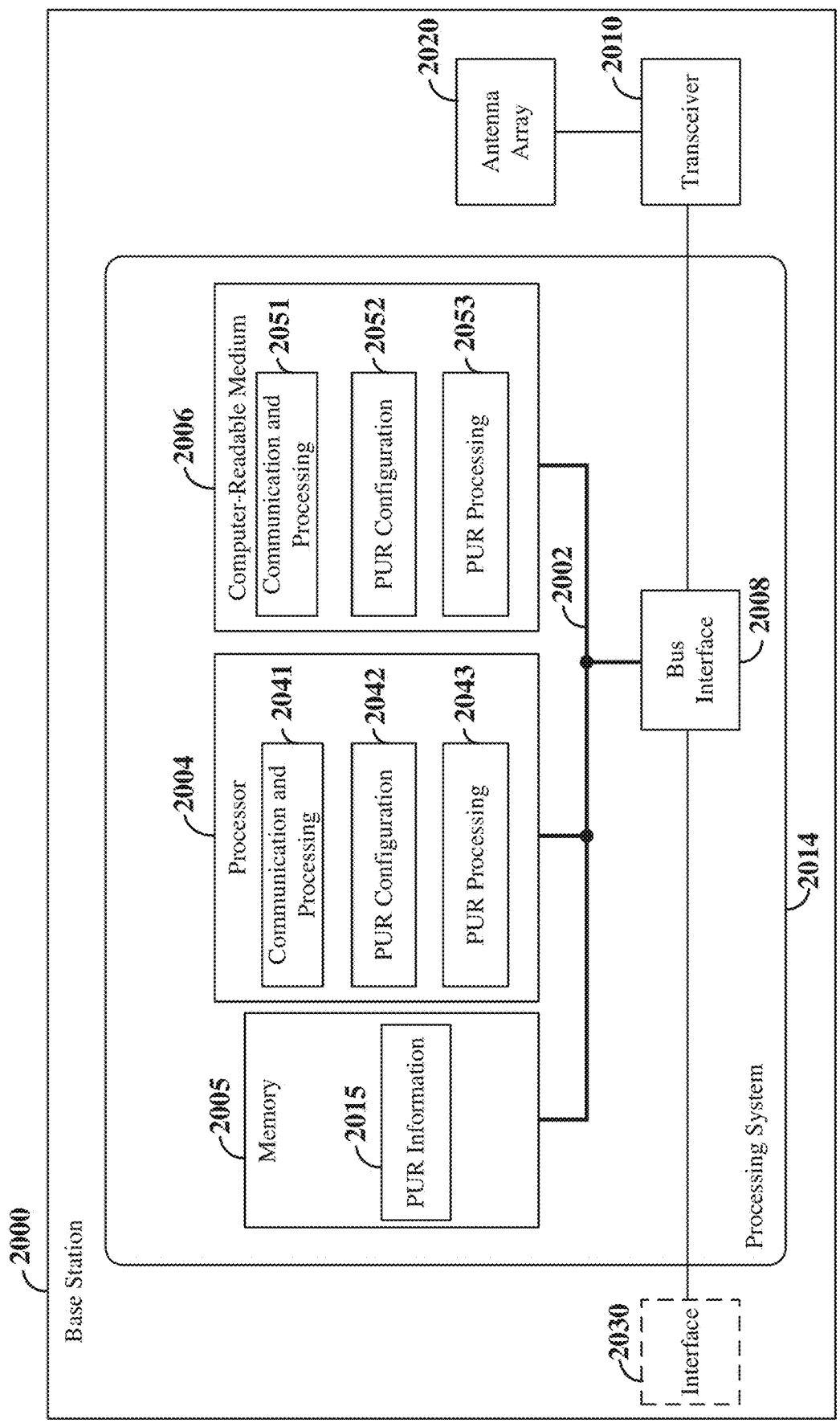
FIG. 20 is a block diagram illustrating an example of a hardware implementation for a base station employing a processing system according to some aspects.

FIG. 20 is a conceptual diagram illustrating an example of a hardware implementation for base station (BS) 2000 employing a processing system 2014. In some implementations, the BS 2000 may correspond to any of the BSs (e.g., gNBs) or scheduling entities shown in any of FIGS. 1, 2, and 6-10.

In accordance with various aspects of the disclosure, an element, or any portion of an element, or any combination of elements may be implemented with the processing system 2014. The processing system may include one or more processors 2004. The processing system 2014 may be substantially the same as the processing system 1714 illustrated in FIG. 17, including a bus interface 2008, a bus 2002, memory 2005, a processor 2004, and a computer-readable medium 2006. The memory 2005 may include PUR information 2015 (e.g., a PUR configuration) that may be used by the processor 2004 for PUR-related operations as discussed herein. Furthermore, the BS 2000 may include an interface 2030 (e.g., a network interface) that provides a means for communicating with at least one other apparatus within a core network and with at least one radio access network.

The BS 2000 may be configured to perform any one or more of the operations described herein (e.g., as described above in conjunction with FIGS. 1-16 and as described below in conjunction with FIGS. 21 and 22). In some aspects of the disclosure, the processor 2004, as utilized in the BS 2000, may include circuitry configured for various functions.

The processor 2004 may be configured to generate, schedule, and modify a resource assignment or grant of time-frequency resources (e.g., a set of one or more resource elements). For example, the processor 2004 may schedule time-frequency resources within a plurality of time division duplex (TDD) and/or frequency division duplex (FDD) subframes, slots, and/or mini-slots to carry user data traffic and/or control information to and/or from multiple UEs.

In some aspects of the disclosure, the processor 2004 may include communication and processing circuitry 2041. The communication and processing circuitry 2041 may be configured to communicate with a UE. The communication and processing circuitry 2041 may include one or more hardware components that provide the physical structure that performs various processes related to communication (e.g., signal reception and/or signal transmission) as described herein. The communication and processing circuitry 2041 may further include one or more hardware components that provide the physical structure that performs various processes related to signal processing (e.g., processing a received signal and/or processing a signal for transmission) as described herein. The communication and processing circuitry 2041 may further be configured to execute communication and processing software 2051 included on the computer-readable medium 2006 to implement one or more functions described herein.

The communication and processing circuitry 2041 may further be configured to receive a message from the UE. For example, the message may be included in a MAC-CE carried in a PUSCH, UCI in a PUCCH or PUSCH, a random access message, or an RRC message. The communication and processing circuitry 2041 may further be configured to receive a scheduling request (e.g., via UCI in a PUCCH) from the UE for an uplink grant for the PUSCH.

In some implementations wherein the communication involves receiving information, the communication and processing circuitry 2041 may obtain information from a component of the BS 2000 (e.g., from the transceiver 2010 that receives the information via radio frequency signaling or some other type of signaling suitable for the applicable communication medium), process (e.g., decode) the information, and output the processed information. For example, the communication and processing circuitry 2041 may output the information to another component of the processor 2004, to the memory 2005, or to the bus interface 2008. In some examples, the communication and processing circuitry 2041 may receive one or more of signals, messages, other information, or any combination thereof. In some examples, the communication and processing circuitry 2041 may receive information via one or more channels. In some examples, the communication and processing circuitry 2041 may include functionality for a means for receiving. In some examples, the communication and processing circuitry 2041 may include functionality for a means for decoding.

In some implementations wherein the communication involves sending (e.g., transmitting) information, the communication and processing circuitry 2041 may obtain information (e.g., from another component of the processor 2004, the memory 2005, or the bus interface 2008), process (e.g., encode) the information, and output the processed information. For example, the communication and processing circuitry 2041 may output the information to the transceiver 2010 (e.g., that transmits the information via radio frequency signaling or some other type of signaling suitable for the applicable communication medium). In some examples, the communication and processing circuitry 2041 may send one or more of signals, messages, other information, or any combination thereof. In some examples, the communication and processing circuitry 2041 may send information via one or more channels. In some examples, the communication and processing circuitry 2041 may include functionality for a means for sending (e.g., a means for transmitting). In some examples, the communication and processing circuitry 2041 may include functionality for a means for encoding.

According to some examples, the processor 2004 may include PUR configuration circuitry 2042 configured to perform PUR configuration-related operations as discussed herein (e.g., one or more of the operations described in conjunction with FIGS. 5-16). In addition, in some examples, the PUR configuration circuitry 2042 may be configured to execute PUR configuration software 2052 included on the computer-readable medium 2006 to implement one or more functions described herein.

The PUR configuration circuitry 2042 may include functionality for a means for receiving an indication of at least one capability of a UE. For example, the PUR configuration circuitry 2042 may be configured to perform one or more of the receive-related operations described at 1006 of FIG. 10 and/or at block 2202 of FIG. 22 including cooperating with (e.g., instructing) the communication and processing circuitry 2041 to monitor for capability message transmissions by UEs. In addition, the PUR configuration circuitry 2042 may process information received by the communication and processing circuitry 2041 during such a transmission (e.g., to determine one or more UE capability parameters).

The PUR configuration circuitry 2042 may include functionality for a means for receiving a PUR configuration request. For example, the PUR configuration circuitry 2042 may be configured to perform one or more of the operations described at 1006 of FIG. 10 and/or at block 2202 of FIG. 22. In some examples, the PUR configuration circuitry 2042 may cooperate with (e.g., instruct) the communication and processing circuitry 2041 to monitor for transmissions by idle and/or inactive UEs to receive requests for PURs. In addition, the PUR configuration circuitry 2042 may process information received by the communication and processing circuitry 2041 during such a transmission (e.g., to determine one or more request parameters).

The PUR configuration circuitry 2042 may include functionality for a means for generating a PUR configuration. For example, the PUR configuration circuitry 2042 may be configured to perform one or more of the operations described at 1008 of FIG. 10 and/or at block 2204 of FIG. 22. In some examples, the PUR configuration circuitry 2042 may allocate resources for a PUR for a UE and specify one or more parameters for the PUR.

The PUR configuration circuitry 2042 may include functionality for a means for transmitting a PUR configuration. For example, the PUR configuration circuitry 2042 may be configured to perform one or more of the operations described at 1010 of FIG. 10 and/or at block 2206 of FIG. 22. In some examples, the PUR configuration circuitry 2042 may encode a PUR configuration and cooperate with (e.g., instruct) the communication and processing circuitry 2041 to transmit the PUR configuration to a UE (e.g., a UE that requested the PUR configuration).

According to some examples, the processor 2004 may include PUR processing circuitry 2043 configured to perform PUR processing-related operations as discussed herein (e.g., one or more of the operations described in conjunction with FIGS. 5-16). In addition, in some examples, the PUR processing circuitry 2043 may be configured to execute PUR processing software 2053 included on the computer-readable medium 2006 to implement one or more functions described herein.

The PUR processing circuitry 2043 may include functionality for a means for receiving an uplink transmission during at least one PUR occasion. For example, the PUR processing circuitry 2043 may be configured to perform one or more of the operations described at step 1014 of FIG. 10 and/or at block 2208 of FIG. 22. In some examples, the PUR processing circuitry 2043 may cooperate with (e.g., instruct) the communication and processing circuitry 2041 to monitor the resource allocated for the first PUR occasion to receive a small data transmission (SDT) from a UE. In addition, the PUR processing circuitry 2043 may process information received by the communication and processing circuitry 2041 during such a transmission (e.g., to provide the SDT to a target application).

Figure 21:
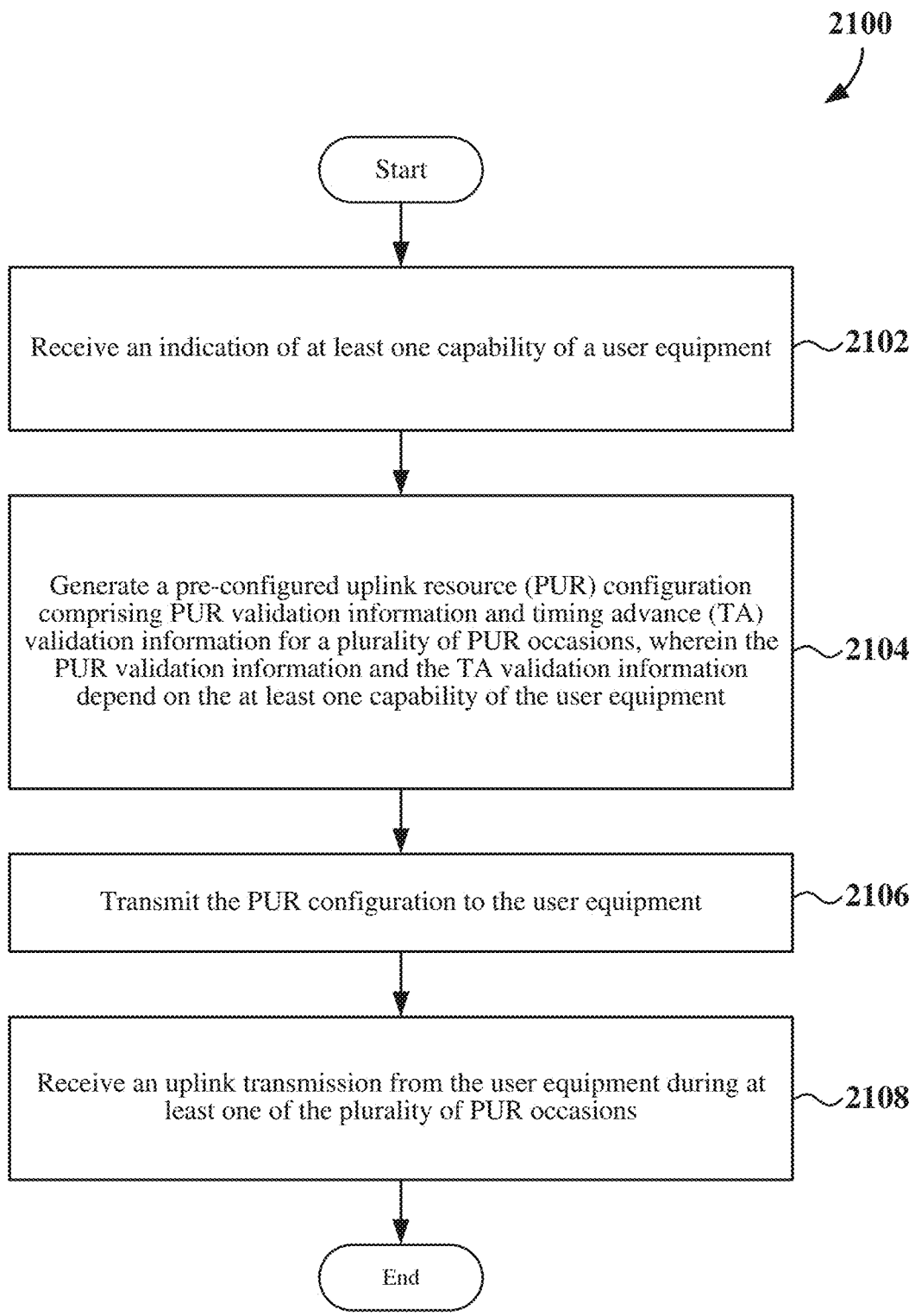
FIG. 21 is a flow chart of an example method for configuring PUR validation according to some aspects.

FIG. 21 is a flow chart illustrating an example method 2100 for wireless communication in accordance with some aspects of the present disclosure. As described below, some or all illustrated features may be omitted in a particular implementation within the scope of the present disclosure, and some illustrated features may not be required for implementation of all examples. In some examples, the method 2100 may be carried out by the BS 2000 illustrated in FIG. 20. In some examples, the method 2100 may be carried out by any suitable apparatus or means for carrying out the functions or algorithm described below.

At block 2102, a base station may receive an indication of at least one capability of a user equipment. For example, the PUR configuration circuitry 2042 together with the communication and processing circuitry 2041 and the transceiver 2010, shown and described above in connection with FIG. 20, may provide a means to receive an indication of at least one capability of a user equipment.

At block 2104, the base station may generate a pre-configured uplink resource (PUR) configuration including PUR validation information and timing advance (TA) validation information for a plurality of PUR occasions, wherein the PUR validation information and the TA validation information depend on the at least one capability of the user equipment. For example, the PUR configuration circuitry 2042, shown and described above in connection with FIG. 20, may provide a means to generate a pre-configured uplink resource (PUR) configuration including PUR validation information and timing advance (TA) validation information for a plurality of PUR occasions.

At block 2106, the BS may transmit the PUR configuration to the user equipment. For example, the PUR configuration circuitry 2042 together with the communication and processing circuitry 2041 and the transceiver 2010, shown and described above in connection with FIG. 20, may provide a means to transmit the PUR configuration to the user equipment. In some examples, transmitting the PUR configuration may include transmitting the PUR configuration via a radio resource control (RRC) message or a medium access control-control element (MAC-CE).

At block 2108, the BS may receive an uplink transmission from the user equipment during at least one of the plurality of PUR occasions. For example, the PUR processing circuitry 2043 together with the communication and processing circuitry 2041 and the transceiver 2010, shown and described above in connection with FIG. 20, may provide a means to receive an uplink transmission from the user equipment during at least one of the plurality of PUR occasions.

In some examples, the PUR validation information may include at least one of a resource allocation associated with the plurality of PUR occasions, a transmission parameter associated with the plurality of PUR occasions, or a combination thereof.

In some examples, the transmitting the PUR configuration may include transmitting the PUR configuration via a radio resource control (RRC) message or a medium access control-control element (MAC-CE).

In some examples, the PUR validation information may include a start time and a timer duration for validating at least one of the plurality of PUR occasions, a TA for the plurality of PUR occasions, or a combination thereof. In some examples, the at least one user equipment capability indicates a user equipment uplink to downlink switching time, and the generating the PUR configuration may include defining the start time based on the user equipment uplink to downlink switching time. In some examples, the at least one user equipment capability indicates a user equipment processing capability, and the generating the PUR configuration may include defining the timer duration based on the user equipment processing capability.

In some examples, the PUR validation information may include an end time and a timer duration for validating at least one of the plurality of PUR occasions, a TA for the plurality of PUR occasions, or a combination thereof. In some examples, the at least one user equipment capability indicates a user equipment downlink to uplink switching time, and the generating the PUR configuration may include defining the end time based on the user equipment downlink to uplink switching time.

In some examples, the PUR validation information may include a start time and an end time for validating at least one of the plurality of PUR occasions, a TA for the plurality of PUR occasions, or a combination thereof. In some examples, the PUR validation information is defined for all user equipment under a cell of the base station.

In some examples, the generating the PUR configuration may include defining the PUR validation information and the TA validation information based on the at least one capability of the user equipment. In some examples, the generating the PUR configuration may include defining a threshold for a time gap between a first PUR occasion of the plurality of PUR occasions and a last downlink symbol before the first PUR occasion. In some examples, the defining the threshold may include defining the threshold based on at least one of a duplex mode, a subcarrier spacing for the first PUR occasion, the at least one capability of the user equipment, or a combination thereof. In some examples, the PUR configuration may include an indication of the threshold.

In some examples, the generating the PUR configuration may include defining a threshold for a time gap between a first PUR occasion of the plurality of PUR occasions and a last uplink symbol before the first PUR occasion. In some examples, the defining the threshold may include defining the threshold based on at least one of a duplex mode, a subcarrier spacing for the first PUR occasion, a capability of a user equipment, or a combination thereof. In some examples, the PUR configuration may include an indication of the threshold.

In some examples, the base station may receive a PUR configuration request from the user equipment, wherein the PUR configuration is transmitted to the user equipment in response to the PUR configuration request. In some examples, the PUR configuration request and the indication of at least one capability of the user equipment may be received in the same message. In some examples, the PUR configuration request and the indication of at least one capability of the user equipment may be received in different messages.

In some examples, the PUR validation information may include an indication of a period of time for suspending transmissions on the plurality of PUR occasions in response to a PUR validation failure or a TA validation failure. In some examples, the PUR validation information may include an indication of a specified number of the plurality of PUR occasions to be suspended in response to a PUR validation failure or a TA validation failure.

Figure 22:
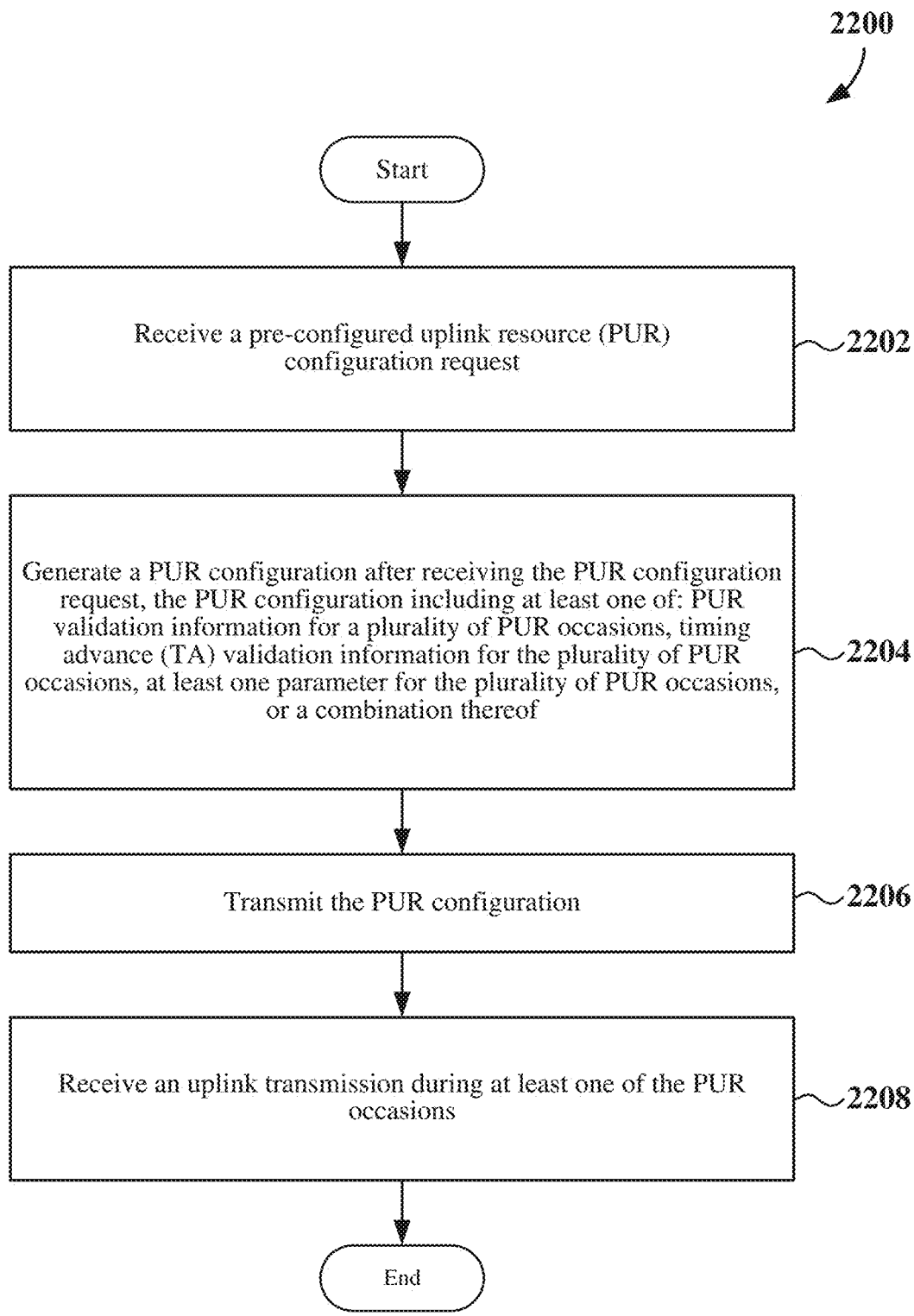
FIG. 22 is a flow chart of another example method for configuring PUR validation according to some aspects.

FIG. 22 is a flow chart illustrating an example method 2200 for wireless communication in accordance with some aspects of the present disclosure. As described below, some or all illustrated features may be omitted in a particular implementation within the scope of the present disclosure, and some illustrated features may not be required for implementation of all examples. In some examples, the method 2200 may be carried out by the BS 2000 illustrated in FIG. 20. In some examples, the method 2200 may be carried out by any suitable apparatus or means for carrying out the functions or algorithm described below.

At block 2202, a base station may receive a pre-configured uplink resource (PUR) configuration request. For example, the PUR configuration circuitry 2042 together with the communication and processing circuitry 2041 and the transceiver 2010, shown and described above in connection with FIG. 20, may provide a means to receive a pre-configured uplink resource (PUR) configuration request.

At block 2204, the base station may generate a PUR configuration after receiving the PUR configuration request, the PUR configuration including at least one of: PUR validation information for a plurality of PUR occasions, timing advance (TA) validation information for the plurality of PUR occasions, at least one parameter for the plurality of PUR occasions, or a combination thereof. For example, the PUR configuration circuitry 2042 may provide a means to generate a PUR configuration after receiving the PUR configuration request.

In some examples, the PUR validation information may include a start time and a timer duration for validating at least one of: the plurality of PUR occasions, a TA for the plurality of PUR occasions, or a combination thereof. In some examples, the PUR configuration request may include user equipment capability information indicative of a user equipment uplink to downlink switching time. In some examples, generating the PUR configuration may include defining the start time based on the user equipment uplink to downlink switching time. In some examples, the PUR configuration request may indicate a user equipment processing capability. In some examples, generating the PUR configuration may include defining the timer duration based on the user equipment processing capability. In some examples, the at least one parameter may include at least one of: a resource allocation associated with the plurality of PUR occasions, a transmission parameter associated with the plurality of PUR occasions, or a combination thereof.

In some examples, the PUR validation information may include an end time and a timer duration for validating at least one of: the plurality of PUR occasions, a TA for the plurality of PUR occasions, or a combination thereof. In some examples, the PUR configuration request may include user equipment capability information indicative of a user equipment downlink to uplink switching time. In some examples, generating the PUR configuration may include defining the end time based on the user equipment downlink to uplink switching time.

In some examples, the PUR validation information may include a start time and an end time for validating at least one of: the plurality of PUR occasions, a TA for the plurality of PUR occasions, or a combination thereof.

In some examples, the PUR validation information is defined for all user equipment under a cell of the base station. In some examples, the PUR configuration request may indicate at least one capability of a user equipment; and generating the PUR configuration and the TA validation information may include defining the PUR validation information based on the at least one capability of the user equipment.

In some examples, generating the PUR configuration may include defining a threshold for a time gap between a first PUR occasion of the plurality of PUR occasions and a last downlink symbol before the first PUR occasion. In some examples, defining the threshold may include defining the threshold based on at least one of: a duplex mode, a subcarrier spacing for the first PUR occasion, a capability of a user equipment, or a combination thereof. In some examples, the PUR configuration may include an indication of the threshold.

In some examples, generating the PUR configuration may include defining a threshold for a time gap between a first PUR occasion of the plurality of PUR occasions and a last uplink symbol before the first PUR occasion. In some examples, defining the threshold may include defining the threshold based on at least one of: a duplex mode, a subcarrier spacing for the first PUR occasion, a capability of a user equipment, or a combination thereof. In some examples, the PUR configuration may include an indication of the threshold.

At block 2206, the BS may transmit the PUR configuration (e.g., via an RRC message). In some examples, transmitting the PUR configuration may include transmitting the PUR configuration via a radio resource control (RRC) message or a medium access control-control element (MAC-CE). For example, the PUR configuration circuitry 2042 together with the communication and processing circuitry 2041 and the transceiver 2010 may provide a means to transmit the PUR configuration.

At block 2208, the BS may receive an uplink transmission (e.g., including a small data transmission) during at least one of the plurality of PUR occasions. For example, the PUR processing circuitry 2043 together with the communication and processing circuitry 2041 and the transceiver 2010, shown and described above in connection with FIG. 20, may provide a means to receive an uplink transmission during at least one of the plurality of PUR occasions.

In some examples, a method of wireless communication at a base station may include receiving a pre-configured uplink resource (PUR) configuration request and generating a PUR configuration after receiving the PUR configuration request. The PUR configuration may include at least one of PUR validation information for a plurality of PUR occasions, timing advance (TA) validation information for the plurality of PUR occasions, at least one parameter for the plurality of PUR occasions, or a combination thereof. The method may also include transmitting the PUR configuration and receiving an uplink transmission during at least one of the plurality of PUR occasions.

In some examples, a base station may include a transceiver, a memory, and a processor communicatively coupled to the transceiver and the memory. The processor may be configured to receive a pre-configured uplink resource (PUR) configuration request via the transceiver and generate a PUR configuration after receiving the PUR configuration request. The PUR configuration may include at least one of PUR validation information for a plurality of PUR occasions, timing advance (TA) validation information for the plurality of PUR occasions, at least one parameter for the plurality of PUR occasions, or a combination thereof. The processor may also be configured to transmit the PUR configuration via the transceiver and receive an uplink transmission via the transceiver during at least one of the plurality of PUR occasions.

In some examples, a base station may include means for receiving a pre-configured uplink resource (PUR) configuration request and means for generating a PUR configuration after receiving the PUR configuration request. The PUR configuration may include at least one of PUR validation information for a plurality of PUR occasions, timing advance (TA) validation information for the plurality of PUR occasions, at least one parameter for the plurality of PUR occasions, or a combination thereof. The base station may also include means for transmitting the PUR configuration and means for receiving an uplink transmission during at least one of the plurality of PUR occasions.

In some examples, an article of manufacture for use by a base station includes a computer-readable medium having stored therein instructions executable by one or more processors of the base station to receive a pre-configured uplink resource (PUR) configuration request and generate a PUR configuration after receiving the PUR configuration request. The PUR configuration may include at least one of PUR validation information for a plurality of PUR occasions, timing advance (TA) validation information for the plurality of PUR occasions, at least one parameter for the plurality of PUR occasions, or a combination thereof. The computer-readable medium may also have stored therein instructions executable by one or more processors of the base station to transmit the PUR configuration and receive an uplink transmission during at least one of the plurality of PUR occasions.

In one configuration, the base station 2000 includes means for receiving an indication of at least one capability of a user equipment, means for generating a pre-configured uplink resource (PUR) configuration including PUR validation information and timing advance (TA) validation information for a plurality of PUR occasions, wherein the PUR validation information and the TA validation information depend on the at least one capability of the user equipment, means for transmitting the PUR configuration to the user equipment, and means for receiving an uplink transmission from the user equipment during at least one of the plurality of PUR occasions. In one aspect, the aforementioned means may be the processor 2004 shown in FIG. 20 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 2004 is merely provided as an example, and other means for carrying out the described functions may be included within various aspects of the present disclosure, including but not limited to the instructions stored in the computer-readable medium 1206, or any other suitable apparatus or means described in any one or more of FIGS. 1, 2, 4, 6-10, and 20, and utilizing, for example, the methods and/or algorithms described herein in relation to FIGS. 21 and 22.

The methods shown in FIGS. 18-19 and 21-22 may include additional aspects, such as any single aspect or any combination of aspects described below and/or in connection with one or more other processes described elsewhere herein. The following provides an overview of several aspects of the present disclosure.

Aspect 1: A user equipment, comprising: a transceiver; a memory; and a processor coupled to the transceiver and the memory, wherein the processor is configured to: receive, via the transceiver, a pre-configured uplink resource (PUR) configuration comprising PUR validation information and timing advance (TA) validation information for a plurality of PUR occasions, wherein the PUR validation information and the TA validation information depend on at least one capability of the user equipment; perform a validation procedure for a first PUR occasion of the plurality of PUR occasions according to the PUR validation information and the TA validation information; and selectively transmit, via the transceiver, an uplink transmission during the first PUR occasion according to the validation procedure.

Aspect 2: The user equipment of aspect 1, wherein the processor is further configured to: transmit a PUR configuration request to a base station; and receive the PUR configuration from the base station after transmitting the PUR configuration request.

Aspect 3: The user equipment of aspect 2, wherein: the PUR configuration request indicates the at least one capability of the user equipment; the PUR configuration includes an uplink bandwidth part configuration that is associated with at least one of: first PUR validation for the plurality of PUR occasions, first TA validation for the plurality of PUR occasions, first transmissions on the plurality of PUR occasions, or a combination thereof, and the PUR configuration includes a downlink bandwidth part configuration that is associated with at least one of: second PUR validation for the plurality of PUR occasions, second TA validation for the plurality of PUR occasions, second transmissions on the plurality of PUR occasions, or a combination thereof.

Aspect 4: The user equipment of any of aspects 1 through 3, wherein: the plurality of PUR occasions are configured on an uplink bandwidth part indicated by the PUR configuration; and the processor is further configured to selectively transmit the uplink transmission according to at least one transmission parameter associated with at least one valid PUR occasion of the plurality of PUR occasions.

Aspect 5: The user equipment of any of aspects 1 through 4, wherein the PUR validation information comprises at least one of: a resource allocation associated with the plurality of PUR occasions, a transmission parameter associated with the plurality of PUR occasions, an uplink bandwidth part configured for PUR validation for the plurality of PUR occasions, a downlink bandwidth part configured for PUR validation for the plurality of PUR occasions, or a combination thereof.

Aspect 6: The user equipment of any of aspects 1 through 5, wherein the processor is further configured to: receive the PUR configuration via a radio resource control (RRC) message or a medium access control-control element (MAC-CE).

Aspect 7: The user equipment of any of aspects 1 through 6, wherein the processor is further configured to: determine that the first PUR occasion is valid according to a PUR occasion validation procedure of the validation procedure; determine that a TA is valid based on whether an uplink carrier configured with the plurality of PUR occasions is synchronized with a serving cell of the user equipment according to a TA validation procedure of the validation procedure; and transmit the uplink transmission during the first PUR occasion after determining that the first PUR occasion is valid and the TA is valid.

Aspect 8: The user equipment of aspect 7, wherein: the PUR configuration indicates an uplink bandwidth part for the plurality of PUR occasions, whereby the first PUR occasion is in the uplink bandwidth part; the PUR configuration indicates a downlink bandwidth part for measurements associated with TA validation of the plurality of PUR occasions; and the processor is further configured to determine that the TA is valid based on whether the user equipment conducted measurements for the TA validation procedure on the downlink bandwidth part prior to the first PUR occasion in the uplink bandwidth part.

Aspect 9: The user equipment of any of aspects 1 through 6, wherein the processor is further configured to: determine that the first PUR occasion is not valid according to the validation procedure; and abstain from transmitting the uplink transmission during the first PUR occasion after the determining that the first PUR occasion is not valid.

Aspect 10: The user equipment of aspect 9, wherein the processor is further configured to: after determining that the first PUR occasion is not valid, determine whether a second PUR occasion of the plurality of PUR occasions is valid.

Aspect 11: The user equipment of aspect 9, wherein the processor is further configured to: after determining that the first PUR occasion is not valid, abstain from transmitting the uplink transmission during at least one subsequent PUR occasion of the plurality of PUR occasions.

Aspect 12: The user equipment of aspect 11, wherein the processor is further configured to: suspend transmissions on the plurality of PUR occasions for a period of time.

Aspect 13: The user equipment of aspect 12, wherein the PUR validation information comprises an indication of the period of time.

Aspect 14: The user equipment of aspect 11, wherein the processor is further configured to: suspend transmissions for a specified number of the plurality of PUR occasions.

Aspect 15: The user equipment of aspect 14, wherein the PUR validation information comprises an indication of the specified number.

Aspect 16: The user equipment of aspect 9, wherein the processor is further configured to: after determining that the first PUR occasion is not valid, abstain from transmitting the uplink transmission during any of the plurality of PUR occasions.

Aspect 17: The user equipment of any of aspects 1 through 16, wherein the processor is further configured to: determine that a TA validation for the first PUR occasion failed; and abstain from validating the first PUR occasion after the determining that the TA validation for the first PUR occasion failed.

Aspect 18: The user equipment of aspect 17, wherein the processor is further configured to: after determining that the TA validation for the first PUR occasion failed, determine whether a second PUR occasion of the plurality of PUR occasions is valid.

Aspect 19: The user equipment of aspect 17, wherein the processor is further configured to: after determining that the TA validation for the first PUR occasion failed, abstain from transmitting the uplink transmission during at least one second PUR occasion of the plurality of PUR occasions.

Aspect 20: The user equipment of aspect 19, wherein the processor is further configured to: suspend transmissions on the plurality of PUR occasions for a period of time.

Aspect 21: The user equipment of aspect 19, wherein the processor is further configured to: suspend transmissions for a specified number of the plurality of PUR occasions.

Aspect 22: The user equipment of aspect 17, wherein the processor is further configured to: after determining that the TA validation for the first PUR occasion failed, abstain from transmitting the uplink transmission during any of the plurality of PUR occasions.

Aspect 23: The user equipment of any of aspects 1 through 22, wherein the processor is further configured to: determine that a TA validation for the first PUR occasion passed; and validate the first PUR occasion after the determining that the TA validation for the first PUR occasion passed.

Aspect 24: The user equipment of any of aspects 1 through 23, wherein the processor is further configured to: determine that a PUR validation for the first PUR occasion failed; and abstain from performing a TA validation for the first PUR occasion after the determining that the PUR validation for the first PUR occasion failed.

Aspect 25: The user equipment of any of aspects 1 through 23, wherein the processor is further configured to: determine that a PUR validation for the first PUR occasion passed; and perform a TA validation for the first PUR occasion after the determining that the PUR validation for the first PUR occasion passed.

Aspect 26: The user equipment of any of aspects 1 through 25, wherein the PUR validation information and the TA validation information comprise a start time and a timer duration for validating at least one of: the first PUR occasion, a TA for the first PUR occasion, or a combination thereof.

Aspect 27: The user equipment of any of aspects 1 through 25, wherein the PUR validation information and the TA validation information comprises an end time and a timer duration for validating at least one of: the first PUR occasion, a TA for the first PUR occasion, or a combination thereof.

Aspect 28: The user equipment of any of aspects 1 through 25, wherein the PUR validation information comprises a start time and an end time for validating at least one of: the first PUR occasion, a TA for the first PUR occasion, or a combination thereof.

Aspect 29: The user equipment of any of aspects 1 through 28, wherein the PUR validation information is defined for all user equipment under a cell of a base station.

Aspect 30: The user equipment of any of aspects 1 through 29, wherein the processor is further configured to: determine that a switching gap between a first uplink transmission and a first downlink transmission is defined for the user equipment; and after determining that the switching gap between the first uplink transmission and the first downlink transmission is defined for the user equipment, determine whether a time gap between the first PUR occasion and a last downlink symbol before the first PUR occasion is greater than or equal to a threshold, and determine whether the user equipment has conducted measurements for TA validation prior to the last downlink symbol.

Aspect 31: The user equipment of aspect 30, wherein the threshold depends on at least one of: a duplex mode, a subcarrier spacing for the first PUR occasion, a capability of the user equipment, or a combination thereof.

Aspect 32: The user equipment of aspect 30, wherein the threshold is a standardized value or the user equipment receives the threshold from a base station.

Aspect 33: The user equipment of any of aspects 30 through 32, wherein the processor is further configured to: determine whether the user equipment is operating in a time division duplex (TDD) mode, a full-duplex-frequency division duplex (FD-FDD) mode, or a half-duplex-frequency division duplex (HD-FDD) mode.

Aspect 34: The user equipment of any of aspects 1 through 33, wherein the processor is further configured to: determine whether uplink symbols for the first PUR occasion align with a slot format for a time division duplex (TDD) mode of operation.

Aspect 35: The user equipment of any of aspects 1 through 33, wherein the processor is further configured to: determine whether uplink symbols for the first PUR occasion align with an uplink resource configuration for a half-duplex-frequency division duplex (HD-FDD) mode of operation.

Aspect 36: The user equipment of any of aspects 1 through 33, wherein the processor is further configured to: verify that uplink symbols for the first PUR occasion do not share a slot with a first uplink transmission by the user equipment.

Aspect 37: The user equipment of any of aspects 1 through 36, wherein the processor is further configured to: determine whether a transmission gap between a first uplink transmission and a PUR transmission is defined for the user equipment; and if the transmission gap is defined, determine whether a time gap between the first PUR occasion and a last uplink symbol before the first PUR occasion is greater than or equal to a threshold.

Aspect 38: The user equipment of aspect 37, wherein the threshold depends on at least one of: a duplex mode, a subcarrier spacing for the first PUR occasion, the at least one capability of the user equipment, or a combination thereof.

Aspect 39: The user equipment of aspect 37, wherein the threshold is a standardized value or the user equipment receives the threshold from a base station.

Aspect 40: The user equipment of aspect 37, wherein the processor is further configured to: determine whether the user equipment is operating in a time division duplex (TDD) mode, a full-duplex-frequency division duplex (FD-FDD) mode, or a half-duplex-frequency division duplex (HD-FDD) mode.

Aspect 41: A method for wireless communication at a user equipment, the method comprising: receiving a pre-configured uplink resource (PUR) configuration comprising PUR validation information and timing advance (TA) validation information for a plurality of PUR occasions, wherein the PUR validation information and the TA validation information depend on at least one capability of the user equipment; performing a validation procedure for a first PUR occasion of the plurality of PUR occasions according to the PUR validation information and the TA validation information; and selectively transmitting an uplink transmission during the first PUR occasion according to the validation procedure.

Aspect 42: The method of aspect 41, further comprising: transmitting a PUR configuration request to a base station, wherein the PUR configuration is received from the base station after the transmitting the PUR configuration request.

Aspect 43: The method of aspect 42, wherein: the PUR configuration request indicates the at least one capability of the user equipment; the PUR configuration includes an uplink bandwidth part configuration that is associated with at least one of: first PUR validation for the plurality of PUR occasions, first TA validation for the plurality of PUR occasions, first transmissions on the plurality of PUR occasions, or a combination thereof, and the PUR configuration includes a downlink bandwidth part configuration that is associated with at least one of: second PUR validation for the plurality of PUR occasions, second TA validation for the plurality of PUR occasions, second transmissions on the plurality of PUR occasions, or a combination thereof.

Aspect 44: The method of any of aspects 41 through 43, wherein: the plurality of PUR occasions are configured on an uplink bandwidth part indicated by the PUR configuration; and the selectively transmitting the uplink transmission during the first PUR occasion according to the validation procedure comprises selectively transmitting the uplink transmission according to at least one transmission parameter associated with at least one valid PUR occasion of the plurality of PUR occasions.

Aspect 45: The method of any of aspects 41 through 44, wherein the PUR validation information comprises at least one of: a resource allocation associated with the plurality of PUR occasions, a transmission parameter associated with the plurality of PUR occasions, an uplink bandwidth part configured for PUR validation for the plurality of PUR occasions, a downlink bandwidth part configured for PUR validation for the plurality of PUR occasions, or a combination thereof.

Aspect 46: The method of any of aspects 41 through 45, wherein the receiving the PUR configuration comprises: receiving the PUR configuration via a radio resource control (RRC) message or a medium access control-control element (MAC-CE).

Aspect 47: The method of any of aspects 41 through 46, wherein the selectively transmitting the uplink transmission during the first PUR occasion according to the validation procedure comprises: determining that the first PUR occasion is valid according to a PUR occasion validation procedure of the validation procedure; determining that a TA is valid based on whether an uplink carrier configured with the plurality of PUR occasions is synchronized with a serving cell of the user equipment according to a TA validation procedure of the validation procedure; and transmitting the uplink transmission during the first PUR occasion after the determining that the first PUR occasion is valid and the TA is valid.

Aspect 48: The method of aspect 47, wherein: the PUR configuration indicates an uplink bandwidth part for the plurality of PUR occasions, whereby the first PUR occasion is in the uplink bandwidth part; the PUR configuration indicates a downlink bandwidth part for measurements associated with TA validation of the plurality of PUR occasions; and the determining that the TA is valid is further based on whether the user equipment conducted measurements for the TA validation procedure on the downlink bandwidth part prior to the first PUR occasion in the uplink bandwidth part.

Aspect 49: The method of any of aspects 41 through 46, wherein the selectively transmitting the uplink transmission during the first PUR occasion according to the validation procedure comprises: determining that the first PUR occasion is not valid according to the validation procedure; and abstaining from transmitting the uplink transmission during the first PUR occasion after the determining that the first PUR occasion is not valid.

Aspect 50: The method of aspect 49, further comprising: after the determining that the first PUR occasion is not valid, determining whether a second PUR occasion of the plurality of PUR occasions is valid.

Aspect 51: The method of aspect 49, further comprising: after the determining that the first PUR occasion is not valid, abstaining from transmitting the uplink transmission during at least one subsequent PUR occasion of the plurality of PUR occasions.

Aspect 52: The method of aspect 51, wherein the abstaining from transmitting the uplink transmission during the at least one second PUR occasion comprises: suspending transmissions on the plurality of PUR occasions for a period of time.

Aspect 53: The method of aspect 52, wherein the PUR validation information comprises an indication of the period of time.

Aspect 54: The method of aspect 51, wherein the abstaining from transmitting the uplink transmission during the at least one second PUR occasion comprises: suspending transmissions for a specified number of the plurality of PUR occasions.

Aspect 55: The method of aspect 54, wherein the PUR validation information comprises an indication of the specified number.

Aspect 56: The method of aspect 49, further comprising: after the determining that the first PUR occasion is not valid, abstaining from transmitting the uplink transmission during any of the plurality of PUR occasions.

Aspect 57: The method of any of aspects 41 through 56, wherein the validation procedure comprises: determining that a TA validation for the first PUR occasion failed; and abstaining from validating the first PUR occasion after the determining that the TA validation for the first PUR occasion failed.

Aspect 58: The method of aspect 57, further comprising: after the determining that the TA validation for the first PUR occasion failed, determining whether a second PUR occasion of the plurality of PUR occasions is valid.

Aspect 59: The method of aspect 57, further comprising: after the determining that the TA validation for the first PUR occasion failed, abstaining from transmitting the uplink transmission during at least one second PUR occasion of the plurality of PUR occasions.

Aspect 60: The method of aspect 59, wherein the abstaining from transmitting the uplink transmission during the at least one second PUR occasion comprises: suspending transmissions on the plurality of PUR occasions for a period of time.

Aspect 61: The method of aspect 59, wherein the abstaining from transmitting the uplink transmission during the at least one second PUR occasion comprises: suspending transmissions for a specified number of the plurality of PUR occasions.

Aspect 62: The method of aspect 57, further comprising: after the determining that the TA validation for the first PUR occasion failed, abstaining from transmitting the uplink transmission during any of the plurality of PUR occasions.

Aspect 63: The method of any of aspects 41 through 62, wherein the validation procedure comprises: determining that a TA validation for the first PUR occasion passed; and validating the first PUR occasion after the determining that the TA validation for the first PUR occasion passed.

Aspect 64: The method of any of aspects 41 through 63, wherein the validation procedure comprises: determining that a PUR validation for the first PUR occasion failed; and abstaining from performing a TA validation for the first PUR occasion after the determining that the PUR validation for the first PUR occasion failed.

Aspect 65: The method of any of aspects 41 through 63, wherein the validation procedure comprises: determining that a PUR validation for the first PUR occasion passed; and performing a TA validation for the first PUR occasion after the determining that the PUR validation for the first PUR occasion passed.

Aspect 66: The method of any of aspects 41 through 65, wherein the PUR validation information and the TA validation information comprise a start time and a timer duration for validating at least one of: the first PUR occasion, a TA for the first PUR occasion, or a combination thereof.

Aspect 67: The method of any of aspects 41 through 65, wherein the PUR validation information and the TA validation information comprises an end time and a timer duration for validating at least one of: the first PUR occasion, a TA for the first PUR occasion, or a combination thereof.

Aspect 68: The method of any of aspects 41 through 65, wherein the PUR validation information comprises a start time and an end time for validating at least one of: the first PUR occasion, a TA for the first PUR occasion, or a combination thereof.

Aspect 69: The method of any of aspects 41 through 68, wherein the PUR validation information is defined for all user equipment under a cell of a base station.

Aspect 70: The method of any of aspects 41 through 69, wherein the performing the validation procedure comprises: determining that a switching gap between a first uplink transmission and a first downlink transmission is defined for the user equipment; and after the determining that the switching gap between the first uplink transmission and the first downlink transmission is defined for the user equipment, determining whether a time gap between the first PUR occasion and a last downlink symbol before the first PUR occasion is greater than or equal to a threshold, and determining whether the user equipment has conducted measurements for TA validation prior to the last downlink symbol.

Aspect 71: The method of aspect 70, wherein the threshold depends on at least one of: a duplex mode, a subcarrier spacing for the first PUR occasion, the at least one capability of the user equipment, or a combination thereof.

Aspect 72: The method of aspect 70, wherein the threshold is a standardized value or the user equipment receives the threshold from a base station.

Aspect 73: The method of any of aspects 70 through 72, wherein determining whether the switching gap between the first uplink transmission and the first downlink transmission is defined for the user equipment comprises: determining whether the user equipment is operating in a time division duplex (TDD) mode, a full-duplex-frequency division duplex (FD-FDD) mode, or a half-duplex-frequency division duplex (HD-FDD) mode.

Aspect 74: The method of any of aspects 41 through 73, wherein the performing the validation procedure comprises: determining whether uplink symbols for the first PUR occasion align with a slot format for a time division duplex (TDD) mode of operation.

Aspect 75: The method of any of aspects 41 through 73, wherein the performing the validation procedure comprises: determining whether uplink symbols for the first PUR occasion align with an uplink resource configuration for a half-duplex-frequency division duplex (HD-FDD) mode of operation.

Aspect 76: The method of any of aspects 41 through 73, wherein the performing the validation procedure comprises: verifying that uplink symbols for the first PUR occasion do not share a slot with a first uplink transmission by the user equipment.

Aspect 77: The method of any of aspects 41 through 76, wherein the performing the validation procedure comprises: determining whether a transmission gap between a first uplink transmission and a PUR transmission is defined for the user equipment; and if the transmission gap is defined, determining whether a time gap between the first PUR occasion and a last uplink symbol before the first PUR occasion is greater than or equal to a threshold.

Aspect 78: The method of aspect 77, wherein the threshold depends on at least one of: a duplex mode, a subcarrier spacing for the first PUR occasion, the at least one capability of the user equipment, or a combination thereof.

Aspect 79: The method of aspect 77, wherein the threshold is a standardized value or the user equipment receives the threshold from a base station.

Aspect 80: The method of aspect 77, wherein the determining whether the transmission gap between the first uplink transmission and the PUR transmission is defined for the user equipment comprises: determining whether the user equipment is operating in a time division duplex (TDD) mode, a full-duplex-frequency division duplex (FD-FDD) mode, or a half-duplex-frequency division duplex (HD-FDD) mode.

Aspect 81: A base station, comprising: a transceiver; a memory; and a processor coupled to the transceiver and the memory, wherein the processor is configured to: receive, via the transceiver, an indication of at least one capability of a user equipment; generate a pre-configured uplink resource (PUR) configuration comprising PUR validation information and timing advance (TA) validation information for a plurality of PUR occasions, wherein the PUR validation information and the TA validation information depend on the at least one capability of the user equipment; transmit, via the transceiver, the PUR configuration to the user equipment; and receive, via the transceiver, an uplink transmission from the user equipment during at least one of the plurality of PUR occasions.

Aspect 82: The base station of aspect 81, wherein the PUR validation information comprises at least one of: a resource allocation associated with the plurality of PUR occasions, a transmission parameter associated with the plurality of PUR occasions, or a combination thereof.

Aspect 83: The base station of any of aspects 81 through 82, wherein the processor is further configured to: transmit the PUR configuration via a radio resource control (RRC) message or a medium access control-control element (MAC-CE).

Aspect 84: The base station of any of aspects 81 through 83, wherein the PUR validation information comprises a start time and a timer duration for validating at least one of: the plurality of PUR occasions, a TA for the plurality of PUR occasions, or a combination thereof.

Aspect 85: The base station of aspect 84, wherein: the at least one capability of the user equipment indicates a user equipment uplink to downlink switching time; and the processor is further configured to define the start time based on the user equipment uplink to downlink switching time.

Aspect 86: The base station of aspect 84, wherein: the at least one capability of the user equipment indicates a user equipment processing capability; and the processor is further configured to define the timer duration based on the user equipment processing capability.

Aspect 87: The base station of any of aspects 81 through 83, wherein the PUR validation information comprises an end time and a timer duration for validating at least one of: the plurality of PUR occasions, a TA for the plurality of PUR occasions, or a combination thereof.

Aspect 88: The base station of aspect 87, wherein: the at least one capability of the user equipment indicates a user equipment downlink to uplink switching time; and the processor is further configured to define the end time based on the user equipment downlink to uplink switching time.

Aspect 89: The base station of any of aspects 81 through 83, wherein the PUR validation information comprises a start time and an end time for validating at least one of: the plurality of PUR occasions, a TA for the plurality of PUR occasions, or a combination thereof.

Aspect 90: The base station of any of aspects 81 through 89, wherein the PUR validation information is defined for all user equipment under a cell of the base station.

Aspect 91: The base station of any of aspects 81 through 90, wherein the processor is further configured to: define the PUR validation information and the TA validation information based on the at least one capability of the user equipment.

Aspect 92: The base station of any of aspects 81 through 91, wherein the processor is further configured to: define a threshold for a time gap between a first PUR occasion of the plurality of PUR occasions and a last downlink symbol before the first PUR occasion.

Aspect 93: The base station of aspect 92, wherein the processor is further configured to: define the threshold based on at least one of: a duplex mode, a subcarrier spacing for the first PUR occasion, the at least one capability of the user equipment, or a combination thereof.

Aspect 94: The base station of any of aspects 92 through 93, wherein the PUR configuration comprises an indication of the threshold.

Aspect 95: The base station of any of aspects 81 through 94, wherein the processor is further configured to: define a threshold for a time gap between a first PUR occasion of the plurality of PUR occasions and a last uplink symbol before the first PUR occasion.

Aspect 96: The base station of aspect 95, wherein the processor is further configured to: define the threshold based on at least one of: a duplex mode, a subcarrier spacing for the first PUR occasion, the at least one capability of the user equipment, or a combination thereof.

Aspect 97: The base station of aspect 95, wherein the PUR configuration comprises an indication of the threshold.

Aspect 98: The base station of any of aspects 81 through 97, wherein the processor is further configured to: receive a PUR configuration request from the user equipment; and transmit the PUR configuration to the user equipment in response to the PUR configuration request.

Aspect 99: The base station of any of aspects 81 through 98, wherein the PUR validation information comprises an indication of a period of time for suspending transmissions on the plurality of PUR occasions in response to a PUR validation failure or a TA validation failure.

Aspect 100: The base station of any of aspects 81 through 98, wherein the PUR validation information comprises an indication of a specified number of the plurality of PUR occasions to be suspended in response to a PUR validation failure or a TA validation failure.

Aspect 101: A method for wireless communication at a base station, the method comprising: receiving an indication of at least one capability of a user equipment; generating a pre-configured uplink resource (PUR) configuration comprising PUR validation information and timing advance (TA) validation information for a plurality of PUR occasions, wherein the PUR validation information and the TA validation information depend on the at least one capability of the user equipment; transmitting the PUR configuration to the user equipment; and receiving an uplink transmission from the user equipment during at least one of the plurality of PUR occasions.

Aspect 102: The method of aspect 101, wherein the PUR validation information comprises at least one of: a resource allocation associated with the plurality of PUR occasions, a transmission parameter associated with the plurality of PUR occasions, or a combination thereof.

Aspect 103: The method of any of aspects 101 through 102, wherein the transmitting the PUR configuration comprises: transmitting the PUR configuration via a radio resource control (RRC) message or a medium access control-control element (MAC-CE).

Aspect 104: The method of any of aspects 101 through 103, wherein the PUR validation information comprises a start time and a timer duration for validating at least one of: the plurality of PUR occasions, a TA for the plurality of PUR occasions, or a combination thereof.

Aspect 105: The method of aspect 104, wherein: the at least one capability of the user equipment indicates a user equipment uplink to downlink switching time; and the generating the PUR configuration comprises defining the start time based on the user equipment uplink to downlink switching time.

Aspect 106: The method of aspect 105, wherein: the at least one capability of the user equipment indicates a user equipment processing capability; and the generating the PUR configuration comprises defining the timer duration based on the user equipment processing capability.

Aspect 107: The method of any of aspects 101 through 106, wherein the PUR validation information comprises an end time and a timer duration for validating at least one of: the plurality of PUR occasions, a TA for the plurality of PUR occasions, or a combination thereof.

Aspect 108: The method of aspect 107, wherein: the at least one user equipment capability indicates a user equipment downlink to uplink switching time; and the generating the PUR configuration comprises defining the end time based on the user equipment downlink to uplink switching time.

Aspect 109: The method of any of aspects 101 through 108, wherein the PUR validation information comprises a start time and an end time for validating at least one of: the plurality of PUR occasions, a TA for the plurality of PUR occasions, or a combination thereof.

Aspect 110: The method of any of aspects 101 through 109, wherein the PUR validation information is defined for all user equipment under a cell of the base station.

Aspect 111: The method of any of aspects 101 through 110, wherein the generating the PUR configuration comprises: defining the PUR validation information and the TA validation information based on the at least one capability of the user equipment.

Aspect 112: The method of any of aspects 101 through 111, wherein the generating the PUR configuration comprises: defining a threshold for a time gap between a first PUR occasion of the plurality of PUR occasions and a last downlink symbol before the first PUR occasion.

Aspect 113: The method of aspect 112, wherein the defining the threshold comprises: defining the threshold based on at least one of: a duplex mode, a subcarrier spacing for the first PUR occasion, the at least one capability of the user equipment, or a combination thereof.

Aspect 114: The method of aspect 112, wherein the PUR configuration comprises an indication of the threshold.

Aspect 115: The method of any of aspects 101 through 114, wherein the generating the PUR configuration comprises: defining a threshold for a time gap between a first PUR occasion of the plurality of PUR occasions and a last uplink symbol before the first PUR occasion.

Aspect 116: The method of aspect 115, wherein the defining the threshold comprises: defining the threshold based on at least one of: a duplex mode, a subcarrier spacing for the first PUR occasion, the at least one capability of the user equipment, or a combination thereof.

Aspect 117: The method of aspect 115, wherein the PUR configuration comprises an indication of the threshold.

Aspect 118: The method of any of aspects 101 through 117, further comprising: receiving a PUR configuration request from the user equipment, wherein the PUR configuration is transmitted to the user equipment in response to the PUR configuration request.

Aspect 119: The method of any of aspects 101 through 118, wherein the PUR validation information comprises an indication of a period of time for suspending transmissions on the plurality of PUR occasions in response to a PUR validation failure or a TA validation failure.

Aspect 120: The method of any of aspects 101 through 119, wherein the PUR validation information comprises an indication of a specified number of the plurality of PUR occasions to be suspended in response to a PUR validation failure or a TA validation failure.

Aspect 121: A user equipment comprising: means for receiving a pre-configured uplink resource (PUR) configuration comprising PUR validation information and timing advance (TA) validation information for a plurality of PUR occasions, wherein the PUR validation information and the TA validation information depend on at least one capability of the user equipment; means for performing a validation procedure for a first PUR occasion of the plurality of PUR occasions according to the PUR validation information and the TA validation information; and means for selectively transmitting an uplink transmission during the first PUR occasion according to the validation procedure.

Aspect 122: A base station comprising: means for receiving an indication of at least one capability of a user equipment; means for generating a pre-configured uplink resource (PUR) configuration comprising PUR validation information and timing advance (TA) validation information for a plurality of PUR occasions, wherein the PUR validation information and the TA validation information depend on the at least one capability of the user equipment; means for transmitting the PUR configuration to the user equipment; and means for receiving an uplink transmission from the user equipment during at least one of the plurality of PUR occasions.

Aspect 123: A computer program comprising instructions which, when the program is executed by a computer of a user equipment, UE, cause the computer to carry out the steps of the method of aspects 41 to 80.

Aspect 124: A computer program comprising instructions which, when the program is executed by a computer of a base station, cause the computer to carry out the steps of the method of claims 101 to 120.

Aspect 125: An apparatus configured for wireless communication comprising at least one means for performing any one of aspects 41 through 80.

Aspect 126: A non-transitory computer-readable medium storing computer-executable code, comprising code for causing an apparatus to perform any one of aspects 41 through 80.

Aspect 127: An apparatus configured for wireless communication comprising at least one means for performing any one of aspects 101 through 120.

Aspect 128: A non-transitory computer-readable medium storing computer-executable code, comprising code for causing an apparatus to perform any one of aspects 101 through 120.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2(3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects.

For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-22 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in any of FIGS. 1, 2, 4, 6-10, 17, and 20 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment, comprising:
   one or more memories that store processor-executable code; and
   one or more processors coupled to the one or more memories and configured to execute the processor-executable code and cause the user equipment to:
   receive a pre-configured uplink resource (PUR) configuration comprising PUR validation information and timing advance (TA) validation information for a plurality of PUR occasions, wherein the PUR validation information and the TA validation information depend on at least one capability of the user equipment;
   perform a validation procedure for a first PUR occasion of the plurality of PUR occasions according to the PUR validation information and the TA validation information,
   the validation procedure comprising:
     a determination that a switching gap between a first uplink transmission and a first downlink transmission is defined for the user equipment,
     a determination whether a first time gap between the first PUR occasion and a last downlink symbol before the first PUR occasion is greater than or equal to a first threshold, and
     a determination whether the user equipment has conducted measurements for TA validation prior to the last downlink symbol; and
   selectively transmit an uplink transmission during the first PUR occasion according to the validation procedure.

2. The user equipment of claim 1, wherein the one or more processors are further configured to execute the processor-executable code and cause the user equipment to:
   transmit a PUR configuration request to a network entity; and
   receive the PUR configuration from the network entity after transmitting the PUR configuration request.

3. The user equipment of claim 2, wherein:
   the PUR configuration request indicates the at least one capability of the user equipment;
   the PUR configuration includes an uplink bandwidth part configuration that is associated with at least one of: first PUR validation for the plurality of PUR occasions, first TA validation for the plurality of PUR occasions, first transmissions on the plurality of PUR occasions, or a combination thereof; and
   the PUR configuration includes a downlink bandwidth part configuration that is associated with at least one of: second PUR validation for the plurality of PUR occasions, second TA validation for the plurality of PUR occasions, second transmissions on the plurality of PUR occasions, or a combination thereof.

4. The user equipment of claim 1, wherein:
   the plurality of PUR occasions are configured on an uplink bandwidth part indicated by the PUR configuration; and
   the one or more processors are further configured to execute the processor-executable code and cause the user equipment to selectively transmit the uplink transmission according to at least one transmission parameter associated with at least one valid PUR occasion of the plurality of PUR occasions.

5. The user equipment of claim 1, wherein the PUR validation information comprises at least one of: a resource allocation associated with the plurality of PUR occasions, a transmission parameter associated with the plurality of PUR occasions, an uplink bandwidth part configured for PUR validation for the plurality of PUR occasions, a downlink bandwidth part configured for PUR validation for the plurality of PUR occasions, or a combination thereof.

6. The user equipment of claim 1, wherein the one or more processors are further configured to execute the processor-executable code and cause the user equipment to:

receive the PUR configuration via a radio resource control (RRC) message or a medium access control-control element (MAC-CE).

7. The user equipment of claim 1, wherein:
the PUR configuration indicates an uplink bandwidth part for the plurality of PUR occasions, whereby the first PUR occasion is in the uplink bandwidth part;
the PUR configuration indicates a downlink bandwidth part for measurements associated with TA validation of the plurality of PUR occasions; and
the one or more processors are further configured to execute the processor-executable code and cause the user equipment to determine that a TA is valid based on whether the user equipment conducted measurements for a TA validation procedure of the validation procedure on the downlink bandwidth part prior to the first PUR occasion in the uplink bandwidth part.

8. The user equipment of claim 1, wherein the one or more processors are further configured to execute the processor-executable code and cause the user equipment to:
determine that the first PUR occasion is not valid according to the validation procedure; and
abstain from transmitting the uplink transmission during the first PUR occasion after the determination that the first PUR occasion is not valid.

9. The user equipment of claim 8, wherein the one or more processors are further configured to execute the processor-executable code and cause the user equipment to:
after the determination that the first PUR occasion is not valid, determine whether a second PUR occasion of the plurality of PUR occasions is valid.

10. The user equipment of claim 8, wherein the one or more processors are further configured to execute the processor-executable code and cause the user equipment to:
after the determination that the first PUR occasion is not valid, abstain from transmitting the uplink transmission during at least one subsequent PUR occasion of the plurality of PUR occasions.

11. The user equipment of claim 1, wherein the PUR validation information comprises an indication of a period of time.

12. The user equipment of claim 1, wherein the one or more processors are further configured to execute the processor-executable code and cause the user equipment to:
determine that a TA validation for the first PUR occasion failed; and
abstain from validating the first PUR occasion after the determination that the TA validation for the first PUR occasion failed.

13. The user equipment of claim 12, wherein the one or more processors are further configured to execute the processor-executable code and cause the user equipment to:
suspend transmissions on the plurality of PUR occasions for a period of time.

14. The user equipment of claim 1, wherein the one or more processors are further configured to execute the processor-executable code and cause the user equipment to:
determine that a TA validation for the first PUR occasion passed; and
validate the first PUR occasion after the determination that the TA validation for the first PUR occasion passed.

15. The user equipment of claim 1, wherein the one or more processors are further configured to execute the processor-executable code and cause the user equipment to:
determine that a PUR validation for the first PUR occasion failed; and
abstain from performing a TA validation for the first PUR occasion after the determination that the PUR validation for the first PUR occasion failed.

16. The user equipment of claim 1, wherein the one or more processors are further configured to execute the processor-executable code and cause the user equipment to:
determine that a PUR validation for the first PUR occasion passed; and
perform a TA validation for the first PUR occasion after the determination that the PUR validation for the first PUR occasion passed.

17. The user equipment of claim 1, wherein the PUR validation information is defined for all user equipment under a cell of a network entity.

18. The user equipment of claim 1, wherein the first threshold depends on at least one of: a duplex mode, a subcarrier spacing for the first PUR occasion, a capability of the user equipment, or a combination thereof.

19. The user equipment of claim 1, wherein the first threshold is a standardized value or the user equipment receives the first threshold from a network entity.

20. The user equipment of claim 1, wherein the one or more processors are further configured to execute the processor-executable code and cause the user equipment to:
determine whether the user equipment is operating in a time division duplex (TDD) mode, a full-duplex-frequency division duplex (FD-FDD) mode, or a half-duplex-frequency division duplex (HD-FDD) mode.

21. The user equipment of claim 1, wherein the one or more processors are further configured to execute the processor-executable code and cause the user equipment to:
determine whether uplink symbols for the first PUR occasion align with a slot format for a time division duplex (TDD) mode of operation.

22. The user equipment of claim 1, wherein the one or more processors are further configured to execute the processor-executable code and cause the user equipment to:
determine whether uplink symbols for the first PUR occasion align with an uplink resource configuration for a half-duplex-frequency division duplex (HD-FDD) mode of operation.

23. The user equipment of claim 1, wherein the one or more processors are further configured to execute the processor-executable code and cause the user equipment to:
determine whether a transmission gap between a first-second uplink transmission and a PUR transmission is defined for the user equipment; and
if the transmission gap is defined, determine whether a second time gap between the first PUR occasion and a last uplink symbol before the first PUR occasion is greater than or equal to a second threshold.

24. The user equipment of claim 23, wherein the second threshold depends on at least one of: a duplex mode, a subcarrier spacing for the first PUR occasion, the at least one capability of the user equipment, or a combination thereof.

25. The user equipment of claim 23, wherein the second threshold is a standardized value or the user equipment receives the second threshold from a network entity.

26. The user equipment of claim 23, wherein the one or more processors are further configured to execute the processor-executable code and cause the user equipment to:
determine whether the user equipment is operating in a time division duplex (TDD) mode, a full-duplex-frequency division duplex (FD-FDD) mode, or a half-duplex-frequency division duplex (HD-FDD) mode.

27. A method for wireless communication at a user equipment, the method comprising:

receiving a pre-configured uplink resource (PUR) configuration comprising PUR validation information and timing advance (TA) validation information for a plurality of PUR occasions, wherein the PUR validation information and the TA validation information depend on at least one capability of the user equipment;

performing a validation procedure for a first PUR occasion of the plurality of PUR occasions according to the PUR validation information and the TA validation information, the validation procedure comprising:
- determining that a switching gap between a first uplink transmission and a first downlink transmission is defined for the user equipment,
- determining whether a first time gap between the first PUR occasion and a last downlink symbol before the first PUR occasion is greater than or equal to a first threshold, and
- determining whether the user equipment has conducted measurements for TA validation prior to the last downlink symbol; and selectively transmitting an uplink transmission during the first PUR occasion according to the validation procedure.

28. The method of claim 27, further comprising:

transmitting a PUR configuration request to a network entity; and receiving the PUR configuration from the network entity after transmitting the PUR configuration request.

29. The method of claim 27, further comprising:

determining that the first PUR occasion is not valid according to the validation procedure; and abstaining from transmitting the uplink transmission during the first PUR occasion after the determining that the first PUR occasion is not valid.

30. A user equipment, comprising:

means for receiving a pre-configured uplink resource (PUR) configuration comprising PUR validation information and timing advance (TA) validation information for a plurality of PUR occasions, wherein the PUR validation information and the TA validation information depend on at least one capability of the user equipment;

means for performing a validation procedure for a first PUR occasion of the plurality of PUR occasions according to the PUR validation information and the TA validation information, the validation procedure comprising:
- determining that a switching gap between a first uplink transmission and a first downlink transmission is defined for the user equipment,
- determining whether a first time gap between the first PUR occasion and a last downlink symbol before the first PUR occasion is greater than or equal to a first threshold, and
- determining whether the user equipment has conducted measurements for TA validation prior to the last downlink symbol; and means for selectively transmitting an uplink transmission during the first PUR occasion according to the validation procedure.

\* \* \* \* \*